(12) United States Patent
Habib et al.

(10) Patent No.: US 12,033,249 B2
(45) Date of Patent: Jul. 9, 2024

(54) AGGREGATING AND VISUALIZING VIEWER INTERACTIONS WITH GRAPHICAL ELEMENTS WITHIN STREAMED VIDEO CONTENT

(71) Applicant: Adobe Inc., San Jose, CA (US)

(72) Inventors: Kazi Rubaiat Habib, Seattle, WA (US); John Chung, Ann Arbor, MI (US); Li-Yi Wei, Redwood City, CA (US); Hijung Shin, Arlington, MA (US)

(73) Assignee: Adobe Inc., San Jose, CA (US)

( * ) Notice: Subject to any disclaimer, the term of this patent is extended or adjusted under 35 U.S.C. 154(b) by 279 days.

(21) Appl. No.: 17/158,866

(22) Filed: Jan. 26, 2021

(65) Prior Publication Data

US 2022/0237836 A1 Jul. 28, 2022

(51) Int. Cl.
*G06F 3/14* (2006.01)
*G06F 3/04845* (2022.01)
*G06T 11/20* (2006.01)
*H04L 65/60* (2022.01)
*G09B 5/06* (2006.01)

(52) U.S. Cl.
CPC ........ *G06T 11/206* (2013.01); *G06F 3/04845* (2013.01); *G06F 3/1462* (2013.01); *H04L 65/60* (2013.01); *G09B 5/065* (2013.01)

(58) Field of Classification Search
CPC .. G06T 11/206; G06F 3/04845; G06F 3/1462; H04L 65/60; G09B 5/065
See application file for complete search history.

(56) References Cited

U.S. PATENT DOCUMENTS

| | | | | |
|---|---|---|---|---|
| 9,307,216 | B2* | 4/2016 | Nakamura | G06T 1/60 |
| 11,079,995 | B1* | 8/2021 | Hulbert | G06F 3/0485 |
| 2019/0124403 | A1* | 4/2019 | Favicchio | H04N 21/431 |
| 2020/0201501 | A1* | 6/2020 | Rho | G06F 3/04883 |
| 2021/0349611 | A1* | 11/2021 | Chen | G06F 3/0487 |

(Continued)

OTHER PUBLICATIONS

Rita Borgo, Johannes Kehrer, David HS Chung, Eamonn Maguire, Robert S Laramee, Helwig Hauser, Matthew Ward, and Min Chen. 2013. Glyph-based Visualization: Foundations, Design Guidelines, Techniques and Applications.. In Eurographics (STARs). 39-63.

(Continued)

*Primary Examiner* — David E Choi
(74) *Attorney, Agent, or Firm* — Keller Preece PLLC

(57) ABSTRACT

The present disclosure relates to method, systems, and non-transitory computer-readable media for generating and configuring a digital stream of video content from a stream-transmitting computing device to include interactive graphical elements that are adjustable by viewer computing devices participating in the digital stream. For example, in one or more embodiments, the disclosed systems receive user input from the stream-transmitting computing device that identifies visual attributes of a graphical element that are adjustable via viewer inputs. In one or more embodiments, the disclosed systems provide the graphical elements within the video content and collect the viewer inputs that adjust the graphical element in accordance with the identified visual attributes. Further, the disclosed systems aggregate and visualize the collected viewer inputs in a graphical presentation.

20 Claims, 33 Drawing Sheets

(56) References Cited

U.S. PATENT DOCUMENTS

2022/0237836 A1* 7/2022 Habib .................. G06F 3/0482
2022/0335974 A1* 10/2022 Butera .................... G10H 1/38

OTHER PUBLICATIONS

Harald Bosch, Dennis Thom, Florian Heimerl, Edwin Püttmann, Steffen Koch, Robert Krüger, Michael Wörner, and Thomas Ertl. 2013. ScatterBlogs2: Real-Time Monitoring of Microblog Messages through User-Guided Filtering. IEEE Transactions on Visualization and Computer Graphics 19, 12 (Dec. 2013), 2022-2031. https://doi.org/10.1109/TVCG.2013.186.

Michael Bostock, Vadim Ogievetsky, and Jeffrey Heer. 2011. D3 Data-Driven Documents. IEEE Transactions on Visualization and Computer Graphics 17, 12 (Dec. 2011), 2301-2309. https://doi.org/10.1109/TVCG.2011.185.

N. Cao, Y. Lin, X. Sun, D. Lazer, S. Liu, and H. Qu. 2012. Whisper: Tracing the Spatiotemporal Process of Information Diffusion in Real Time. IEEE Transactions on Visualization and Computer Graphics 18, 12 (2012), 2649-2658.

Di (Laura) Chen, Dustin Freeman, and Ravin Balakrishnan. 2019. Integrating Multimedia Tools to Enrich Interactions in Live Streaming for Language Learning. In Proceedings of the 2019 CHI Conference on Human Factors in Computing Systems (CHI '19). Association for Computing Machinery, New York, NY, USA, 1-14. https://doi.org/10.1145/3290605.3300668.

Richard Cox. 1999. Representation construction, externalised cognition and individual differences. Learning and Instruction 9, 4 (1999), 343-363. https://doi.org/10.1016/S0959-4752(98)00051-6.

ExMachina. 2017. Smart Click Maps. https://dashboard.twitch.tv/extensions/c8okel68mmobvnso7ty0cygj8easam-0.1.5 Accessed: Sep. 2020.

Travis Faas, Lynn Dombrowski, Alyson Young, and Andrew D. Miller. 2018. Watch Me Code: Programming Mentorship Communities on Twitch.Tv. Proc.ACMHum.-Comput.Interact. 2,CSCW,Article50(Nov. 2018),18pages. https://doi.org/10.1145/3274319.

Google Forms. 2020. Google Forms. https://www.google.com/forms/about/ Accessed: Jul. 2020.

C. Ailie Fraser, Joy O. Kim, Alison Thornsberry, Scott Klemmer, and Mira Dontcheva. 2019. Sharing the Studio: How Creative Livestreaming Can Inspire, Educate, and Engage. In Proceedings of the 2019 on Creativity and Cognition (C&C '19). Association for Computing Machinery, New York, NY, USA, 144-155. https://doi.org/10.1145/3325480.3325485.

Elena L. Glassman, Juho Kim, Andrés Monroy-Hernández, and Meredith Ringel Morris. 2015. Mudslide: A Spatially Anchored Census of Student Confusion for Online Lecture Videos. In Proceedings of the 33rd Annual ACM Conference on Human Factors in Computing Systems (CHI '15). Association for Computing Machinery, New York, NY, USA, 1555-1564. https://doi.org/10.1145/2702123.2702304.

Seth Glickman, Nathan Mckenzie, Joseph Seering, Rachel Moeller, and Jessica Hammer. 2018. Design Challenges for Livestreamed Audience Participation Games. In Proceedings of the 2018 Annual Symposium on Computer-Human Interaction in Play (CHI PLAY '18). Association for Computing Machinery, New York, NY, USA, 187-199. https://doi.org/10.1145/3242671.3242708.

Philip J. Guo. 2015. Codeopticon: Real-Time, One-to-Many Human Tutoring for Computer Programming. In Proceedings of the 28th Annual ACM Symposium on User Interface Software & Technology (UIST '15). Association for Computing Machinery, New York, NY, USA, 599-608. https://doi.org/10.1145/2807442.2807469.

David Ha and Douglas Eck. 2017. A Neural Representation of Sketch Drawings. CoRR abs/1704.03477 (2017). arXiv:1704.03477 http://arxiv.org/abs/ 1704.03477.

William A. Hamilton, Oliver Garretson, and Andruid Kerne. 2014. Streaming on Twitch: Fostering Participatory Communities of Play within Live Mixed Media. In Proceedings of the SIGCHI Conference on Human Factors in Computing Systems (CHI '14). Association for Computing Machinery, New York, NY, USA, 1315-1324. https://doi.org/10.1145/2556288.2557048.

William A. Hamilton, John Tang, Gina Venolia, Kori Inkpen, Jakob Zillner, and Derek Huang. 2016. Rivulet: Exploring Participation in Live Events through Multi-Stream Experiences. In Proceedings of the ACM International Conference on Interactive Experiences for TV and Online Video (TVX '16). Association for Computing Machinery, New York, NY, USA, 31-42. https://doi.org/10.1145/2932206.2932211.

Brian Hempel, Justin Lubin, and Ravi Chugh. 2019. Sketch-n-Sketch: Output-Directed Programming for SVG. In Proceedings of the 32nd Annual ACM Symposium on User Interface Software and Technology (UIST '19). Association for Computing Machinery, New York, NY, USA, 281-292. https://doi.org/10.1145/3332165.3347925.

IClicker. 2020. iClicker. https://www.iclicker.com/ Accessed: Jul. 2020.

Ellen A. Isaacs, Trevor Morris, and Thomas K. Rodriguez. 1994. A Forum for Supporting Interactive Presentations to Distributed Audiences. In Proceedings of the 1994 ACM Conference on Computer Supported Cooperative Work (CSCW '94). Association for Computing Machinery, New York, NY, USA, 405-416. https://doi.org/10.1145/192844.193060.

Hiroshi Ishii and Minoru Kobayashi. 1992. ClearBoard: A Seamless Medium for Shared Drawing and Conversation with Eye Contact. In Proceedings of the SIGCHI Conference on Human Factors in Computing Systems (CHI '92). Association for Computing Machinery, New York, Ny, USA, 525-532. https://doi.org/10.1145/142750.142977.

Stephen C. Johnson. 1967. Hierarchical clustering schemes. Psychometrika 32, 3 (1967), 241-254.

Daniel Jurafsky and James H. Martin. 2000. Speech and Language Processing: An Introduction to Natural Language Processing, Computational Linguistics, and Speech Recognition (1st ed.). Prentice Hall PTR, USA.

Kahoot! 2020. Kahoot !. https://kahoot.com/ Accessed: Jul. 2020.

Rubaiat Habib Kazi, Fanny Chevalier, Tovi Grossman, and George Fitzmaurice. 2014. Kitty: Sketching Dynamic and Interactive Illustrations. In Proceedings of the 27th Annual ACM Symposium on User Interface Software and Technology (UIST'14). Association for Computing Machinery, New York, NY, USA, 395-405. https://doi.org/10.1145/2642918.2647375.

Nam Wook Kim, Hyejin Im, Nathalie Henry Riche, Alicia Wang, Krzysztof Gajos, and Hanspeter Pfister. 2019. DataSelfie: Empowering People to Design Personalized Visuals to Represent Their Data. In Proceedings of the 2019 CHI Conference on Human Factors in Computing Systems (CHI '19). Association for Computing Machinery, New York, NY, USA, 1-12. https://doi.org/10.1145/3290605.3300309.

Nam Wook Kim, Eston Schweickart, Zhicheng Liu, Mira Dontcheva, Wilmot Li, Jovan Popovic, and Hanspeter Pfister. 2017. Data-Driven Guides: SupportingExpressiveDesignforInformationGraphics. IEEETrans.Vis.Comput.Graph.23,1(2017),491-500. https://doi.org/10.1109/TVCG.2016. 2598620.

Yea-Seul Kim, Katharina Reinecke, and Jessica Hullman. 2017. ExplainingtheGap: Visualizing One's Predictions Improves Recall and Comprehension of Data. In Proceedings of the 2017 CHI Conference on Human Factors in Computing Systems. 1375-1386. https://doi.org/10.1145/3025453.3025592.

Pascal Lessel, Alexander Vielhauer, and Antonio Krüger. 2017. CrowdChess: A System to Investigate Shared Game Control in Live-Streams. In Proceedings of the Annual Symposium on Computer-Human Interaction in Play (CHI PLAY '17). Association for Computing Machinery, New York, NY, USA, 389-400. https://doi.org/10.1145/3116595.3116597.

Pascal Lessel, Alexander Vielhauer, and Antonio Krüger. 2017. Expanding Video Game Live-Streams with Enhanced Communication Channels: A Case Study. In Proceedings of the 2017 CHI Conference on Human Factors in Computing Systems (CHI '17). Association for Computing Machinery, New York, NY, USA, 1571-1576. https://doi.org/10.1145/3025453.3025708.

(56) References Cited

OTHER PUBLICATIONS

Cathy Li and Farah Lalani. 2020. The COVID-19 pandemic has changed education forever. This is how. https://www.weforum.org/agenda/2020/04/coronavirus-education-global-covid19-online-digital-learning/ Accessed: Jul. 2020.

Jie Li, Xinning Gui, Yubo Kou, and Yukun Li. 2019. Live Streaming as Co-Performance: Dynamics between Center and Periphery in Theatrical Engagement.Proc.ACMHum.-Comput.Interact. 3,CSCW,Article64(Nov. 2019),22pages. https://doi.org/10.1145/3359166.

Ching Liu, Juho Kim, and Hao-Chuan Wang. 2018. ConceptScape: Collaborative Concept Mapping for Video Learning. In Proceedings of the 2018 CHI Conference on Human Factors in Computing Systems (CHI '18). Association for Computing Machinery, New York, NY, USA, 1-12. https://doi.org/10.1145/3173574.3173961.

Zhicheng Liu, John Thompson, Alan Wilson, Mira Dontcheva, James Delorey, Sam Grigg, Bernard Kerr, and John Stasko. 2018. Data Illustrator: Augmenting Vector Design Tools with Lazy Data Binding for Expressive Visualization Authoring. In Proceedings of the 2018 CHI Conference on Human Factors in Computing Systems (CHI '18). Association for Computing Machinery, New York, NY, USA, 1-13. https://doi.org/10.1145/3173574.3173697.

Zhicong Lu, Seongkook Heo, and Daniel J. Wigdor. 2018. StreamWiki: Enabling Viewers of Knowledge Sharing Live Streams to Collaboratively Generate Archival Documentation for Effective In-Stream and Post Hoc Learning. Proc. ACM Hum.-Comput. Interact. 2, CSCW, Article 112 (Nov. 2018),26pages. https://doi.org/10.1145/3274381.

Zhicong Lu, Haijun Xia, Seongkook Heo, and Daniel Wigdor. 2018. You Watch, You Give, and You Engage: A Study of Live Streaming Practices in China. In Proceedings of the 2018 CHI Conference on Human Factors in Computing Systems (CHI '18). Association for Computing Machinery, New York, NY, USA, 1-13. https://doi.org/10.1145/3173574.3174040.

Adam Marcus, Michael S. Bernstein, Osama Badar, David R. Karger, Samuel Madden, and Robert C. Miller. 2011. Twitinfo: Aggregating and Visualizing Microblogs for Event Exploration. In Proceedings of the SIGCHI Conference on Human Factors in Computing Systems (CHI '11). Association for Computing Machinery, New York, NY, USA, 227-236. https://doi.org/10.1145/1978942.1978975.

T. Munzner. 2015. Visualization Analysis and Design. CRC Press. https://books.google.de/books?id=NfkYCwAAQBAJ.

Qualtrics. 2020. Qualtrics. https://www.qualtrics.com/ Accessed: Jul. 2020.

Quizizz. 2020. Quizizz. https://quizizz.com/ Accessed: Jul. 2020.

Jeffrey Rzeszotarski and Aniket Kittur. 2012. CrowdScape: Interactively Visualizing User Behavior and Output. In Proceedings of the 25th Annual ACM Symposium on User Interface Software and Technology (UIST '12). Association for Computing Machinery, New York, NY, USA, 55-62. https://doi.org/10.1145/2380116.2380125.

Arvind Satyanarayan and Jeffrey Heer. 2014. Lyra: An Interactive Visualization Design Environment. In Proceedings of the 16th Eurographics Conference on Visualization (EuroVis '14). Eurographics Association, Goslar, DEU, 351-360.

A. Satyanarayan, R. Russell, J. Hoffswell, and J. Heer. 2016. Reactive Vega: A Streaming Dataflow Architecture for Declarative Interactive Visualization. IEEE Transactions on Visualization and Computer Graphics 22, 1 (2016), 659-668.

Joseph Seering, Saiph Savage, Michael Eagle, Joshua Churchin, Rachel Moeller, Jeffrey P. Bigham, and Jessica Hammer. 2017. Audience Participation Games: Blurring the Line Between Player and Spectator. In Proceedings of the 2017 Conference on Designing Interactive Systems (DIS '17). Association for Computing Machinery, New York, NY, USA, 429-440. https://doi.org/10.1145/3064663.3064732.

Elsbeth Stern, Carmela Aprea, and Hermann G. Ebner. 2003. Improving cross-content transfer in text processing by means of active graphical representation. Learning and Instruction 13, 2 (2003), 191-203. https://doi.org/10.1016/S0959-4752(02)00020-8 External and Internal Representations in Multimedia Learning.

Streamlabs.2020.MediaShare+MediaRequestOverlay:ViewersTipto ShareVideos&Songs.YouPlayThemOn-Stream. https://streamlabs.com/obs-widgets/media-share Accessed: Jun. 2020.

SurveyMonkey. 2020. SurveyMonkey. https://www.surveymonkey.com/ Accessed: Jul. 2020.

Ryo Suzuki, Rubaiat Habib Kazi, Li-Yi Wei, Stephen DiVerdi, WilmotLi, and Daniel Leithinger.2020.RealitySketch: Embedding Responsive Graphics and Visualizations in AR through Dynamic Sketching. arXiv:cs.HC/2008.08688.

Tableau Software. 2020. Tableau. https://www.tableau.com/products/desktop Accessed: Jul. 2020.

Twitch. 2020. How to Use Polls. https://help.twitch.tv/s/article/how-to-use-polls?language=es&sf222407025=1 Accessed: Jul. 2020.

Hadley Wickham. 2016. ggplot2: Elegant Graphics for Data Analysis. Springer-Verlag New York. https://ggplot2.tidyverse.org.

W. Willett, Y. Jansen, and P. Dragicevic. 2017. Embedded Data Representations. IEEE Transactions on Visualization and Computer Graphics 23, 1 (2017), 461-470.

Y. Wu, J. Lim, and M. Yang. 2013. Online Object Tracking: A Benchmark. In 2013 IEEE Conference on Computer Vision and Pattern Recognition. 2411-2418.

Haijun Xia, Bruno Araujo, and Daniel Wigdor. 2017. Collection Objects: Enabling Fluid Formation and Manipulation of Aggregate Selections. In Proceedings of the 2017 CHI Conference on Human Factors in Computing Systems (CHI '17). Association for Computing Machinery, New York, NY, USA, 5592-5604. https://doi.org/10.1145/3025453.3025554.

Haijun Xia, Nathalie Henry Riche, Fanny Chevalier, Bruno De Araujo, and Daniel Wigdor. 2018. Datalnk: Direct and Creative Data-Oriented Drawing. In CHI '18. 1-13. https://doi.org/10.1145/3173574.3173797.

Saelyne Yang, Changyoon Lee, Hijung Valentina Shin, and Juho Kim. 2020. Snapstream: Snapshot-Based Interaction in Live Streaming for Visual Art. In Proceedings of the 2020 CHI Conference on Human Factors in Computing Systems (CHI '20). Association for Computing Machinery, New York, NY, USA, 1-12. https://doi.org/10.1145/3313831.3376390.

Jiayi Eris Zhang, Nicole Sultanum, Anastasia Bezerianos, and Fanny Chevalier. 2020. DataQuilt: Extracting Visual Elements from Images to Craft Pictorial Visualizations. In Proceedings of the 2020 CHI Conference on Human Factors in Computing Systems (CHI '20). Association for Computing Machinery, New York, NY, USA, 1-13. https://doi.org/10.1145/3313831.3376172.

T. Jolliffe et al.; "Principal component analysis: a review and recent developments"; Apr. 13, 2016; https://royalsocietypublishing.org/doi/10.1098/rsta.2015.0202.

* cited by examiner

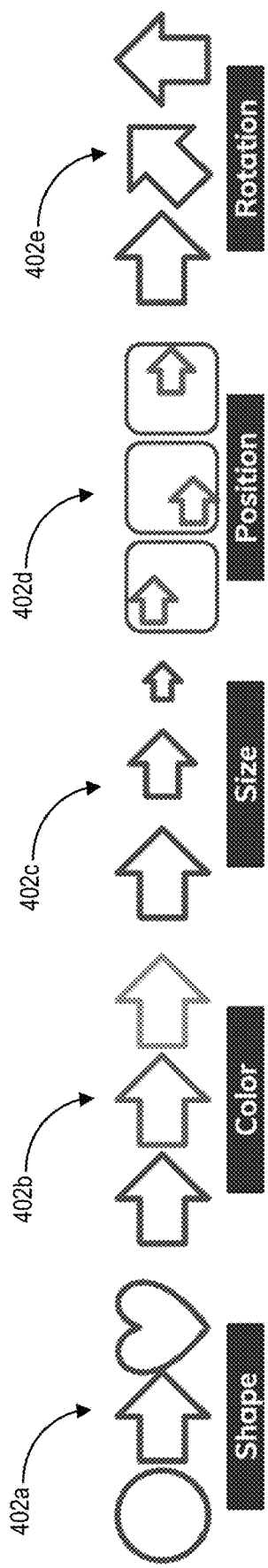
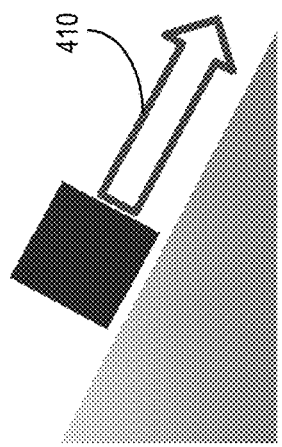
Fig. 4A
Fig. 4B

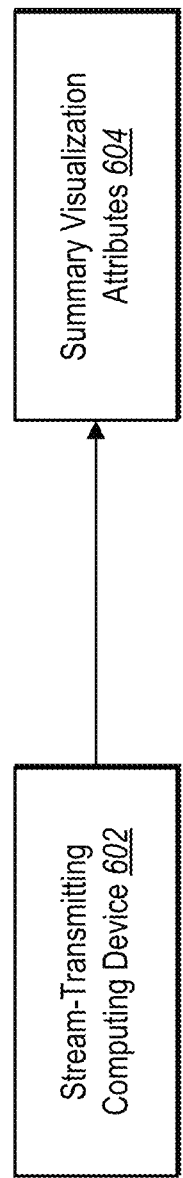

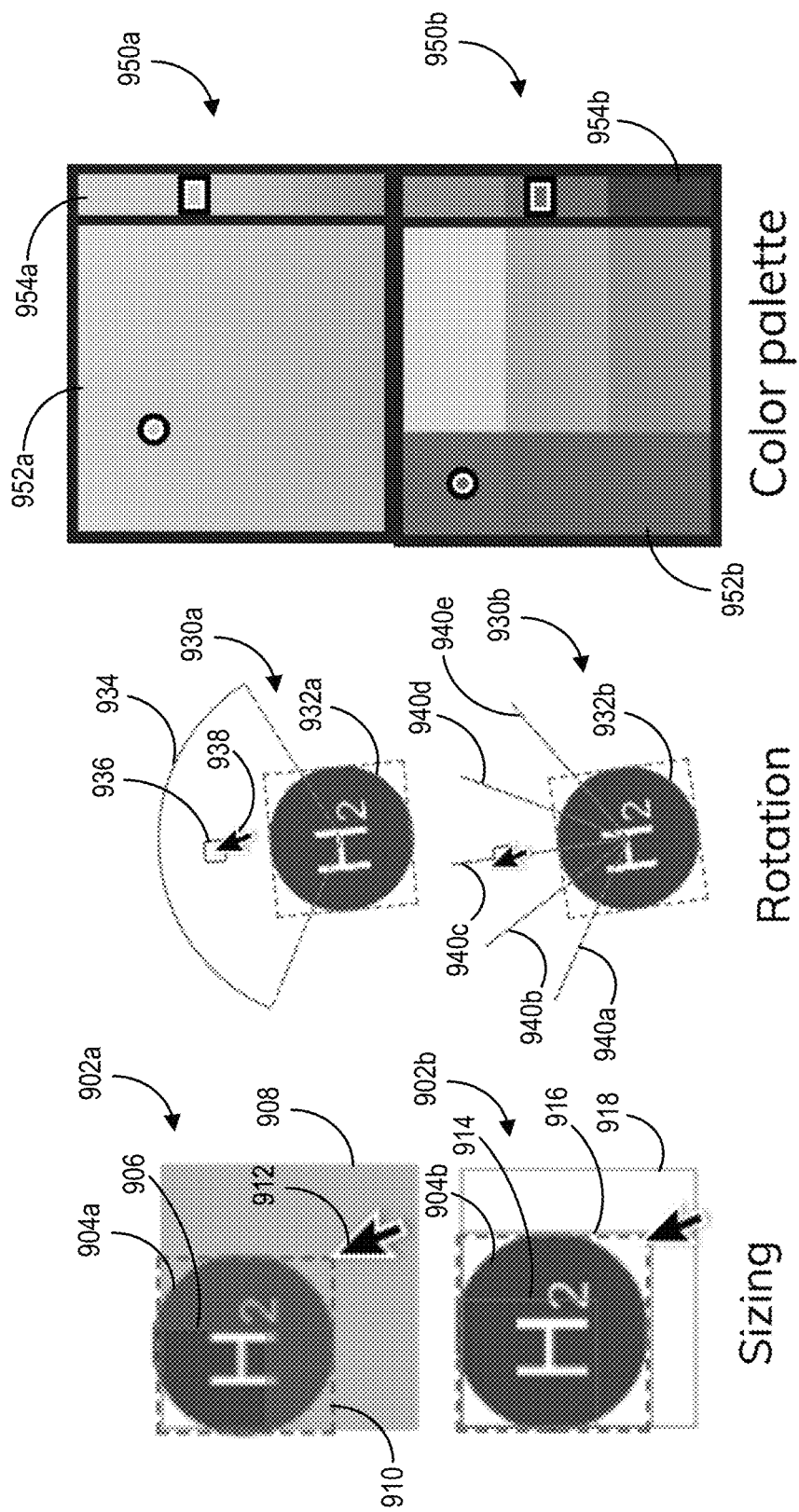

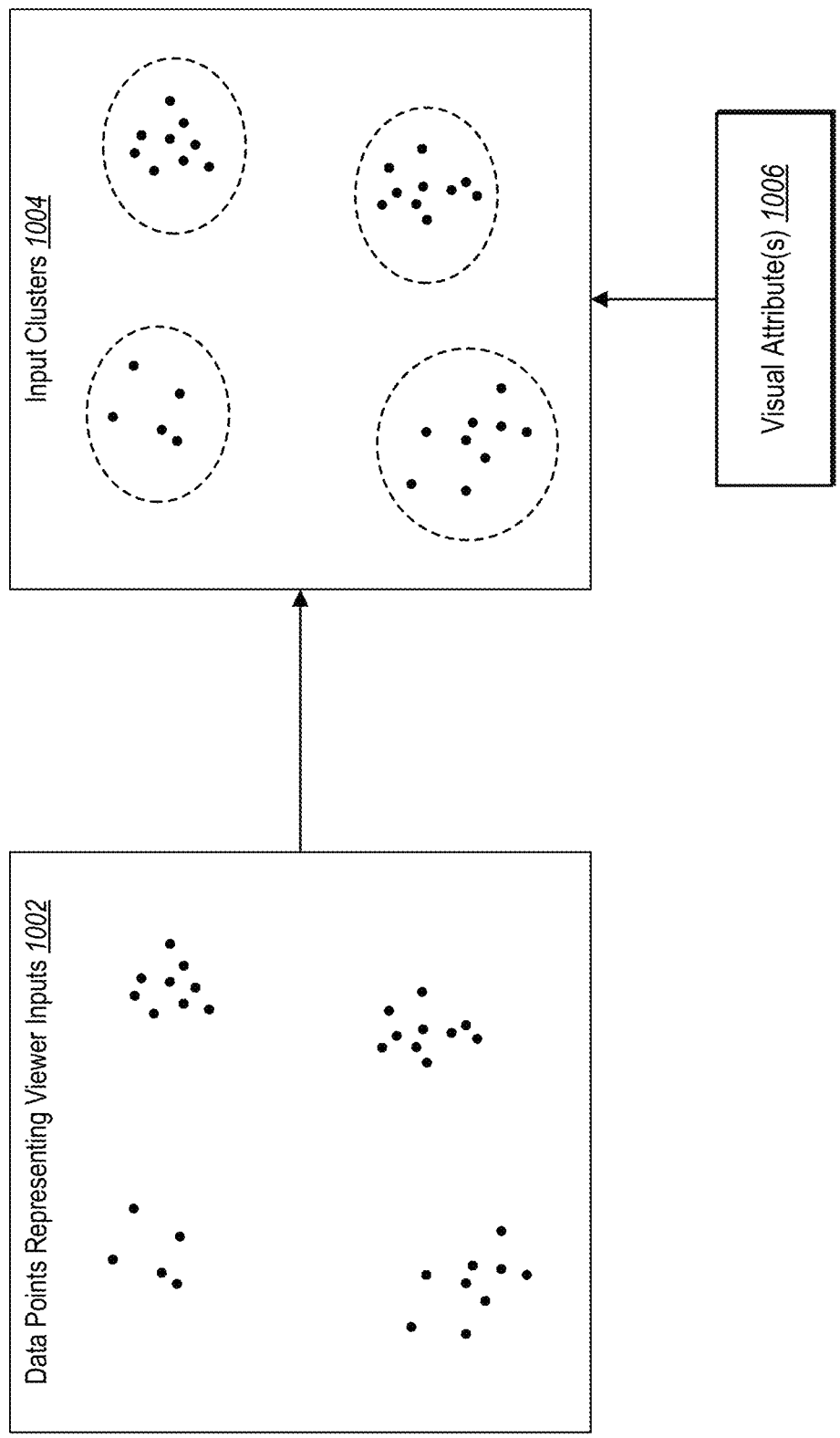

1800

```
┌─────────────────────────────────────────────────────────────────────┐
│ Receiving User Input Identifying Visual Attributes Of A Graphical   │
│ Element That Are Adjustable 1802                                    │
└─────────────────────────────────────────────────────────────────────┘
                                  ↓
┌─────────────────────────────────────────────────────────────────────┐
│             Providing A Digital Stream Of Video Content 1804        │
└─────────────────────────────────────────────────────────────────────┘
                                  ↓
┌─────────────────────────────────────────────────────────────────────┐
│ Collecting Viewer Inputs That Adjust The Graphical Element In       │
│ Accordance With The Visual Attributes 1806                          │
└─────────────────────────────────────────────────────────────────────┘
                                  ↓
┌─────────────────────────────────────────────────────────────────────┐
│                  Aggregating The Viewer Inputs 1808                 │
└─────────────────────────────────────────────────────────────────────┘
                                  ↓
┌─────────────────────────────────────────────────────────────────────┐
│              Generating An Input Summary Visualization 1810         │
└─────────────────────────────────────────────────────────────────────┘
```

*Fig. 18*

AGGREGATING AND VISUALIZING VIEWER INTERACTIONS WITH GRAPHICAL ELEMENTS WITHIN STREAMED VIDEO CONTENT

BACKGROUND

In recent years, computer-implemented technologies have improved software platforms for streaming digital content to computing devices. For example, live streaming video content has grown significantly in popularity, and software platforms have evolved to provide more dynamic engagement with the video content and/or with those participating in the live stream. For example, many conventional content streaming systems provide a digital stream of video content captured from a streaming computing device to a plurality of viewer computing devices and enable the viewer computing devices to communicate with the streaming computing device or other viewer computing devices via a communication interface provided with the stream. Although conventional content streaming systems can facilitate viewer engagement with streamed video content, such systems often operate inflexibly as they fail to enable flexibility, control, and constraints for user inputs; adaptability for different content; and scalability for large numbers of viewers. Further, conventional content streaming systems may operate inefficiently in how they present viewer inputs to the streaming device.

SUMMARY

This disclosure describes one or more embodiments of methods, non-transitory computer-readable media, and systems that solve one or more of the foregoing problems and provide other benefits. For example, in one or more embodiments, the disclosed systems generate and configure a digital stream of video content from a stream-transmitting computing device to include interactive graphical elements that viewer computing devices can move (or otherwise adjust) with visual inputs during the digital stream and then depicts the visual inputs in a graphic visualization. In particular, the disclosed systems can generate a digital stream (e.g., a live stream) that includes specified graphical elements adjustable by visual inputs from viewer computing devices to modify a pre-selected combination of visual attributes associated with the specified graphical elements. The disclosed systems can further aggregate and visualize in graphic form such visual inputs collected from the viewer computing devices. Based on the aggregated visual inputs, for instance, the disclosed systems generate a graphic visualization that summarizes the aggregated visual inputs in a concise presentation. By efficiently collecting and presenting visual inputs for an interactive video stream into an easy-to-understand graphic, the disclosed systems facilitate increased flexibility for visual inputs in the video stream, improved adaptability for different video content, and better scalability for large numbers of viewers.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures.

FIG. 4A illustrates visual elements of a graphical element in accordance with one or more embodiments.

FIG. 4B illustrates a graphical element having particular values corresponding to a combination of visual attributes in accordance with one or more embodiments.

FIG. 6A illustrates a block diagram of determining summary visualization attributes for generating an input summary visualization based on user input received from a stream-transmitting computing device in accordance with one or more embodiments.

FIGS. 9A-9C illustrate composite graphics corresponding to constraints placed on the adjustment of exemplary visual attributes in accordance with one or more embodiments.

FIGS. 10A-10B illustrate diagrams for aggregating viewer inputs into input clusters in accordance with one or more embodiments.

FIG. 18 illustrates a flowchart of a series of acts for generating an input summary visualization based on viewer inputs that adjust a graphical element within video content in accordance with one or more embodiments.

DETAILED DESCRIPTION

Figure 1:
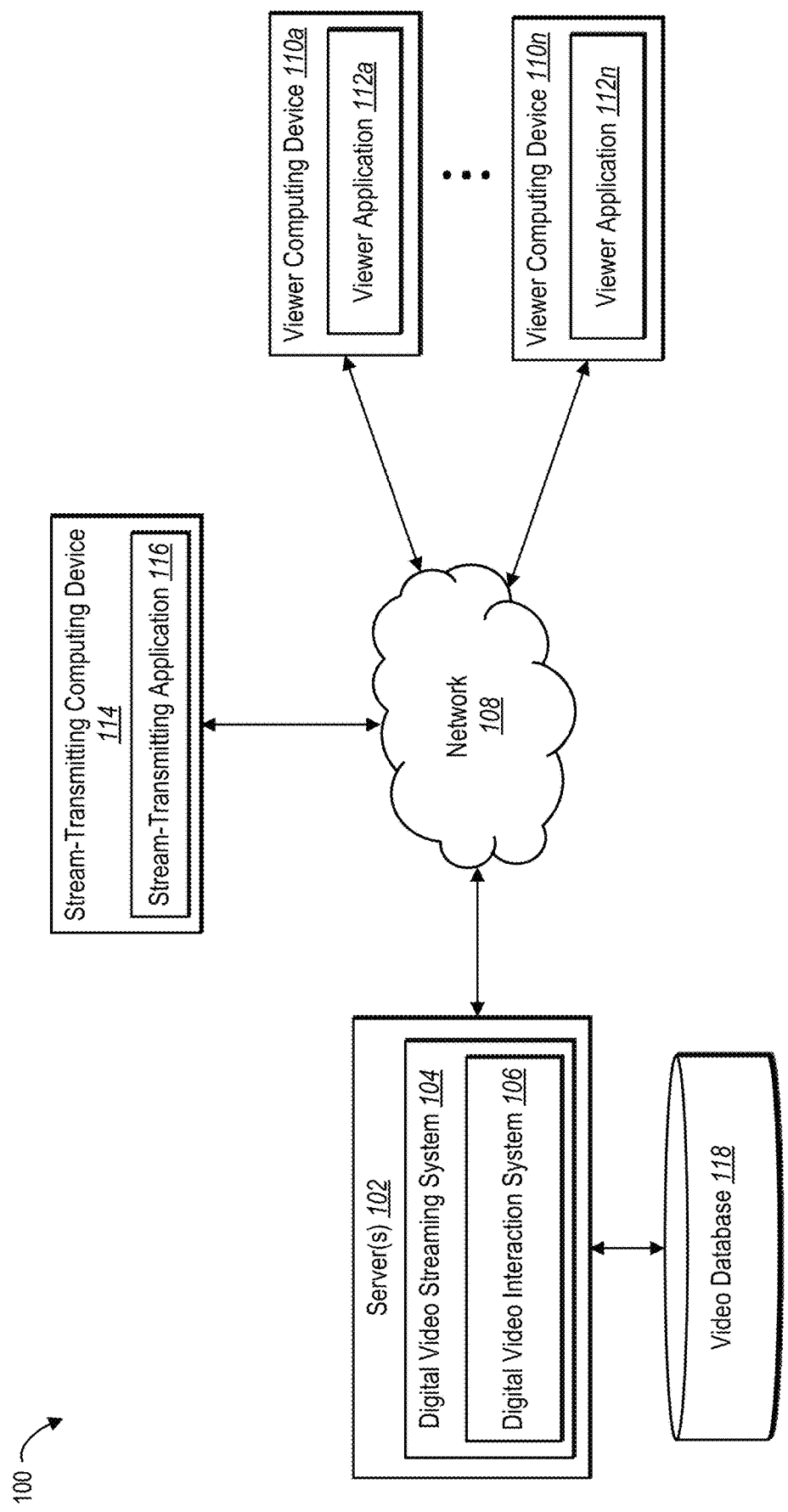
FIG. 1 illustrates an example system environment in which a digital video interaction system can operate in accordance with one or more embodiments.

This disclosure describes one or more embodiments of a digital video interaction system that collects and graphically summarizes visual inputs provided by viewer computing devices interacting with a digital stream of video content in accordance with streamer-specified configurations. For example, in one or more embodiments, the digital video interaction system receives user input from a stream-transmitting computing device that specifies how visual inputs are to be received, aggregated, and/or visualized. To illustrate, in some cases, the user input specifies visual attributes of graphical elements (e.g., rotation, position) that can be modified via viewer input and/or attributes used for visualizing a summary of the visual inputs (e.g., an organization used for displaying the summary). Accordingly, the digital video interaction system configures the collection, aggregation, and/or graphic visualization of visual inputs provided during the digital stream to allow for both expressiveness and sensemaking of the visual inputs. For example, in some implementations, the digital video interaction system generates the graphic visualization to provide a display of the collective of visual inputs by summarizing one or more attributes associated with the visual inputs in a single user interface.

To provide an illustration, in one or more embodiments, the digital video interaction system receives, from a stream-transmitting computing device, user input identifying visual attributes of a graphical element that are adjustable by viewer inputs. The digital video interaction system also transmits a digital stream of video content from the stream-transmitting computing device to viewer computing devices. Further, the digital video interaction system collects, from viewer computing devices and while providing the digital stream of video content, viewer inputs that adjust the graphical element within the video content in accordance with the visual attributes. Accordingly, the digital video interaction system aggregates viewer inputs into input clusters using the visual attributes identified by the stream-transmitting computing device and generates, for display on the stream-transmitting computing device, an input summary visualization representing the aggregated set of viewer inputs according to input clusters.

As just mentioned, in one or more embodiments, the digital video interaction system receives user input identifying visual attributes of a graphical element that are adjustable by viewer inputs. For example, in one or more embodiments, the digital video interaction system provides, to a stream-transmitting computing device (e.g., via a user interface displayed on the stream-transmitting computing device), a plurality of visual attributes associated with a graphical element. To illustrate, in some implementations, the visual attributes include a position of the graphical element, a shape of the graphical element, a size of the graphical element, a rotation of the graphical element, or a color of the graphical element. Accordingly, the digital video interaction system receives user input from the stream-transmitting computing device that selects one or more (e.g., a combination) of those visual attributes for adjustment via viewer input. In some instances, the digital video interaction system further determines, based on the user input, a range of values (e.g., a range of continuous or discrete values) within which adjustments to the visual attributes can be made.

In one or more embodiments, upon determining that a visual attribute is adjustable by viewer inputs, the digital video interaction system 106 removes or relaxes constraints associated with the visual attribute. For example, in some implementations, the digital video interaction system 106 places constraints on the modification of a visual attribute (e.g., by default) and removes or relaxes the constraints when user input identifies that visual attribute as adjustable by viewer inputs. To illustrate, in at least one implementation, the digital video interaction system 106 relaxes the constraints of a visual attribute so that viewer inputs can adjust the visual attribute within a range of values (e.g., indicated by user input).

In some implementations, the digital video interaction system further determines visual attributes for aggregating the viewer inputs based on user input received from the stream-transmitting computing device. For example, in some cases, the user input identifies a subset of visual attributes selected for adjustment by the viewer input. In some instances, the digital video interaction system similarly determines one or more summary visualization attributes for graphically visualizing the viewer inputs based on user input received from the stream-transmitting computing device.

In some instances, the digital video interaction system determines the visual attributes and/or summary visualization attributes for a particular input prompt to be provided during a digital stream of video content. By determining the visual attributes and/or summary visualization attributes, the digital video interaction system generates a configuration that manages viewer interactions with the video content in response to the input prompt, the aggregation of those interactions, and/or the visualization of those interactions.

As further mentioned above, in one or more embodiments, the digital video interaction system collects viewer inputs provided by the viewer computing devices during the digital stream of video content. In particular, in some implementations, the digital video interaction system generates a graphical element within the digital stream with visual attributes of the graphical element that viewer computing devices can adjust within the video content and collects the adjustments during the digital stream. In some embodiments, the digital video interaction system generates or configures the visual attributes of the graphical element to be adjustable in response to an input prompt, such as an input prompt received from the stream-transmitting computing device. In some instances, the digital video interaction system constrains the viewer inputs based on the range of values determined from the user input received from the stream-transmitting computing device.

In one or more embodiments, the digital video interaction system further aggregates the collected viewer inputs. In particular, the digital video interaction system aggregates the viewer inputs into input clusters. In some implementations, the digital video interaction system aggregates the viewer inputs based on user input received from the stream-transmitting computing device (e.g., user input specifying a number of input clusters for aggregation and/or user input identifying a subset of the visual attributes that were selected for adjustment via viewer input).

As mentioned above, in some embodiments, the digital video interaction system generates an input summary visualization that represents the aggregated input clusters. For example, in some instances, the digital video interaction system generates an input summary visualization that includes summary graphical elements representing input clusters determined by aggregating the viewer inputs. In some implementations, a summary graphical element corresponds to an input cluster and has a size that corresponds to the number of viewer inputs associated with that input cluster. In one or more embodiments, the digital video interaction system generates the input summary visualization based on user input from the stream-transmitting computer device identifying one or more summary visualization attributes.

As also mentioned above, conventional content streaming systems suffer from several technological shortcomings that result in inflexible and inefficient operation. For example, conventional content streaming systems often rigidly limit the expressiveness available to viewer computing devices when interacting with video content. To illustrate, some conventional systems only facilitate communication by viewer computing devices via a text chat interface that is separated from the video content. Such communication, however, provides little expression and causes difficulties when referencing spatial and graphics of video content (e.g., textual comments can be confusing where a graphic is difficult to describe). Though some conventional systems seek to remedy this issue by allowing for more expressive visual (e.g., graphical) inputs overlaid on the video content, such systems typically limit the degree to which viewer computing devices can create these inputs to a single dimension (e.g., location). For example, many conventional systems only allow viewer computing devices to provide a single attribute for the visual input, such as the placement of the visual attribute within the displayed video content.

Additionally, conventional systems are often inflexible in that they fail to flexibly adapt the visual inputs available to viewer computing devices to meet the needs of different video content, limiting these visual inputs to a specific setting. As a further matter, many conventional systems fail to provide a cohesive understanding of the collective of visual inputs provided by the viewer computing devices—often electing to show the raw visual inputs on the stream-transmitting computing device instead—leading to scalability issues as the number of visual inputs grows and overwhelms the information channel.

Additionally, conventional content streaming systems often operate inefficiently. In particular, as some conventional systems show the raw visual inputs provided by viewer computing devices, such systems often suffer from inefficiencies related to the viewing of the visual inputs. Indeed, conventional systems typically require a significant number of user interactions (e.g., scrolling and/or clicking interactions) to view the various visual inputs individually.

The digital video interaction system provides several advantages over conventional content streaming systems. For example, the digital video interaction system improves the flexibility with which content streaming systems generate or configure interactive graphical elements for viewer computing devices. By generating graphical elements of a streamed video content to be adjustable by viewer input according to a combination of visual attributes of the graphical element, the digital video interaction system facilitates more flexible visual inputs. Indeed, the digital video interaction system facilitates a large variety of visual inputs, increasing the available expressiveness of those visual inputs in contrast to the rigid and limited expressiveness of chat interfaces or one-dimensional inputs. By generating graphical elements to be adjustable by different combinations of visual attributes, the digital video interaction system flexibly adapts viewer inputs to the varying subject matter and needs of different video content. In particular, by determining which visual attributes of graphical elements are adjustable based on user input provided by a stream-transmitting computing device, the digital video interaction system can adapt the viewer inputs to remain relevant to the video content provided by the stream-transmitting computing device.

In addition to improved flexibility for interactive graphical elements, in some embodiments, the digital video interaction system improves the efficiency and succinctness with which content streaming systems generate graphic visualizations of viewer interactions with a streamed video. By generating an input summary visualization that represents the collected viewer inputs within a single input summary visualization, for instance, the digital video interaction system utilizes a graphical user interface that presents the viewer inputs to the stream-transmitting computing device in a succinct graphic visualization. Accordingly, in some cases, the disclosed digital video interaction system improves upon the graphical visualizations of conventional systems by succinctly and intelligently organizing summary graphical elements to represent visual inputs in a single easy-to-understand graphic visualization—that is, an input summary visualization. Indeed, the digital video interaction system reduces the number of user interactions required to view the viewer inputs and obtain an understanding of the collective of inputs. Rather than force computing devices to navigate within a scattered or elongated graphic representing individual visual inputs—or navigate between graphical user interfaces for separate or similar visual inputs by different viewers—the digital video interaction system reduces navigation into a single graphic. By generating an input summary visualization, the disclosed system constructs a graphic that intelligently consolidates and organizes summary graphical elements representing visual inputs interacting with a digital stream of video content.

Beyond improving the efficiency of graphical visualizations, the digital video interaction system can better scale visual inputs responding to a video stream into a graphic visualization. In particular, by generating an input summary visualization that represents the aggregation of viewer inputs collected during the digital stream of video content, the digital video interaction system better scales or consolidates viewer interactions with a digital stream of video content. Indeed, by representing all viewer inputs (e.g., collected in response to an input prompt) within a concise input summary visualization, the digital video interaction system flexibly adapts to large numbers of viewer inputs and avoids issues associated with presenting the raw visual inputs. Such a consolidated and single graphic is particularly helpful when visual inputs from viewer computing devices scale to the tens, hundreds, or thousands of inputs during a digital stream that conventional content streaming systems fail to effectively visualize in one-dimensional or dispersed visualizations.

Additional detail regarding the digital video interaction system will now be provided with reference to the figures. For example, FIG. 1 illustrates a schematic diagram of an exemplary system 100 in which a digital video interaction system 106 can be implemented. As illustrated in FIG. 1, the system 100 includes a server(s) 102, a network 108, viewer computing devices 110a-110n, a stream-transmitting computing device 114, and a video database 118.

Although the system 100 of FIG. 1 is depicted as having a particular number of components, the system 100 can have any number of additional or alternative components (e.g., any number of servers, viewer computing devices, stream-transmitting computing devices, video databases, or other components in communication with the digital video interaction system 106 via the network 108). Similarly, although FIG. 1 illustrates a particular arrangement of the server(s) 102, the network 108, the viewer computing devices 110a-110n, the stream-transmitting computing device 114, and the video database 118, various additional arrangements are possible.

The server(s) 102, the network, 108, the viewer computing devices 110a-110n, the stream-transmitting computing device 114, and the video database 118 may be communicatively coupled with each other either directly or indirectly (e.g., through the network 108 discussed in greater detail below in relation to FIG. 19). Moreover, the server(s) 102, the viewer computing devices 110a-110n, and the stream-transmitting computing device may include a variety of computing devices (including one or more computing devices as discussed in greater detail with relation to FIG. 19).

As mentioned above, the system 100 includes the server(s) 102. In one or more embodiments, the server(s) 102 generate, store, receive, and/or transmit digital data including digital data related to digital streams of video content. To provide an example, in some instances, the server(s) 102 provide a digital stream of video content to a viewer computing device (e.g., one of the viewer computing devices 110a-110n) and receives viewer interactions with the video content. In one or more embodiments, the server(s) 102 comprise a data server. In some embodiments, the server(s) 102 comprise a communication server or a web-hosting server.

As shown in FIG. 1, the server(s) 102 include the digital video streaming system 104. In one or more embodiments, the digital video streaming system 104 provides functionality for streaming video content. To illustrate, in at least one implementation, the digital video streaming system 104 communicates with the stream-transmitting computing device 114 to obtain a digital stream of video content (e.g., video content captured at the stream-transmitting computing device 114) and communicates with the viewer computing devices 110a-110n to provide the digital stream of video content for display.

Additionally, the server(s) 102 include the digital video interaction system 106. In particular, in one or more embodiments, the digital video interaction system 106 utilizes the server(s) 102 to facilitate interaction with streamed video content by viewer computing devices. For example, in some instances, the digital video interaction system 106 utilizes the server(s) 102 to provide a digital stream of video content, collects viewer inputs representing interactions with the video content, and generates an input summary visualization that represents the collected viewer inputs.

To illustrate, in one or more embodiments, the digital video interaction system 106, via the server(s) 102 receives user input from a stream-transmitting computing device identifying visual attributes of a graphical element that are adjustable by viewer inputs. The digital video interaction system 106 also, via the server(s) 102, provides a digital stream of video content from the stream-transmitting computing device to a set of viewer computing devices. Via the server(s) 102, the digital video interaction system 106 further collects viewer inputs from the set of viewer devices while providing the digital stream of video content. In particular, the viewer inputs adjust the graphical element within the video content in accordance with the visual attributes. The digital video interaction system 106, via the server(s) 102, aggregates the set of viewer inputs into a set of input clusters using the visual attributes identified by the stream-transmitting computing device. Accordingly, via the server(s) 102, the digital video interaction system 106 generates an input summary visualization that represents the aggregated set of viewer inputs according to the set of input clusters.

In one or more embodiments, the video database 118 stores video content for digital streaming. For example, in some embodiments, the video database 118 stores video content captured by the stream-transmitting computing device 114. In some instances, the video database 118 further stores one or more graphical elements to be presented within the video content and/or configurations related to visual attributes of the graphical element(s) that are adjustable by viewer inputs. In some cases, the video database 118 provides access to the stored video content to the digital video interaction system 106. Though FIG. 1 illustrates the video database 118 as a distinct component, one or more embodiments include the video database 118 as a component of the server(s) 102, the digital video streaming system 104, or the digital video interaction system 106.

In one or more embodiments, the stream-transmitting computing device 114 includes a computing device that is capable of capturing, storing, and/or transmitting video content and displaying input summary visualizations of collected viewer inputs. For example, in some implementations, the stream-transmitting computing device 114 includes at least one of a smartphone, a tablet, a desktop computer, a laptop computer, a head-mounted-display device, or other electronic devices. In some instances, the stream-transmitting computing device 114 includes one or more applications (e.g., the stream-transmitting application 116) that are capable of capturing, storing, and/or transmitting video content and displaying input summary visualizations of collected viewer inputs. For example, in some embodiments, the stream-transmitting application 116 includes a software application respectively installed on the stream-transmitting computing device 114. In other cases, however, the stream-transmitting application 116 includes a web browser or other application that accesses a software application hosted on the server(s) 102.

In one or more embodiments, the viewer computing devices 110a-110n include computing devices that are capable of displaying and interacting with video content, such as video content in a digital stream. For example, in some implementations, the viewer computing devices 110a-110n include at least one of a smartphone, a tablet, a desktop computer, a laptop computer, a head-mounted-display device, or other electronic devices. In some instances, the viewer computing devices 110a-110n include one or more applications (e.g., viewer applications 112a-112n, respectively) that are capable of displaying and interacting with video content, such as video content in a digital stream. For example, in some embodiments, the viewer applications 112a-112n each include a software application respectively installed on the viewer computing devices 110a-110n. In other cases, however, the viewer applications 112a-112n each include a web browser or other application that accesses a software application hosted on the server(s) 102.

The digital video interaction system 106 can be implemented in whole, or in part, by the individual elements of the system 100. Indeed, although FIG. 1 illustrates the digital video interaction system 106 implemented with regard to the server(s) 102, different components of the digital video interaction system 106 can be implemented by a variety of devices within the system 100. For example, one or more (or all) components of the digital video interaction system 106 can be implemented by a different computing device or a separate server from the server(s) 102 hosting the digital video streaming system 104. Example components of the digital video interaction system 106 will be described below with regard to FIG. 17.

Figure 2A:
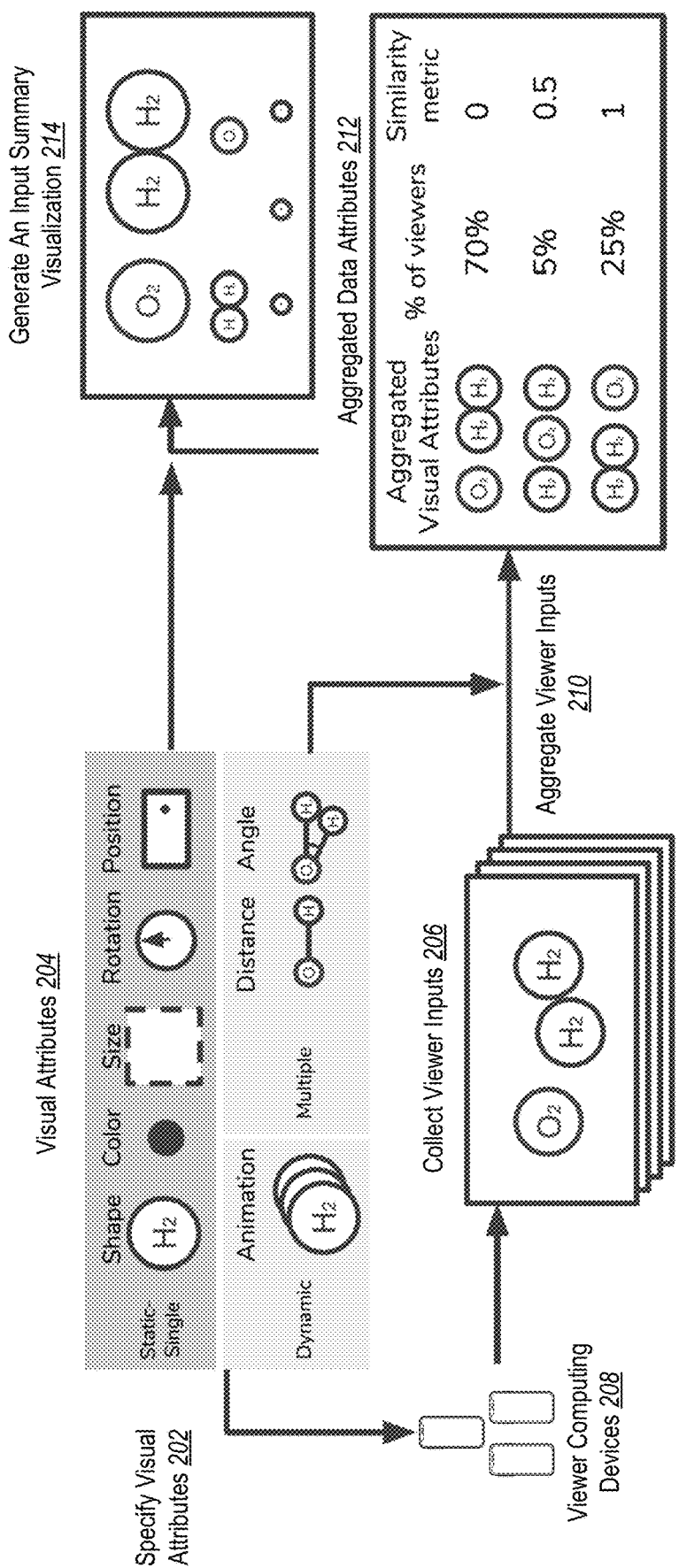
FIGS. 2A-2B illustrate overview diagrams of the digital video interaction system generating an input summary visualization of viewer inputs that adjust visual attributes of graphical elements in accordance with one or more embodiments.
Figure 2B:
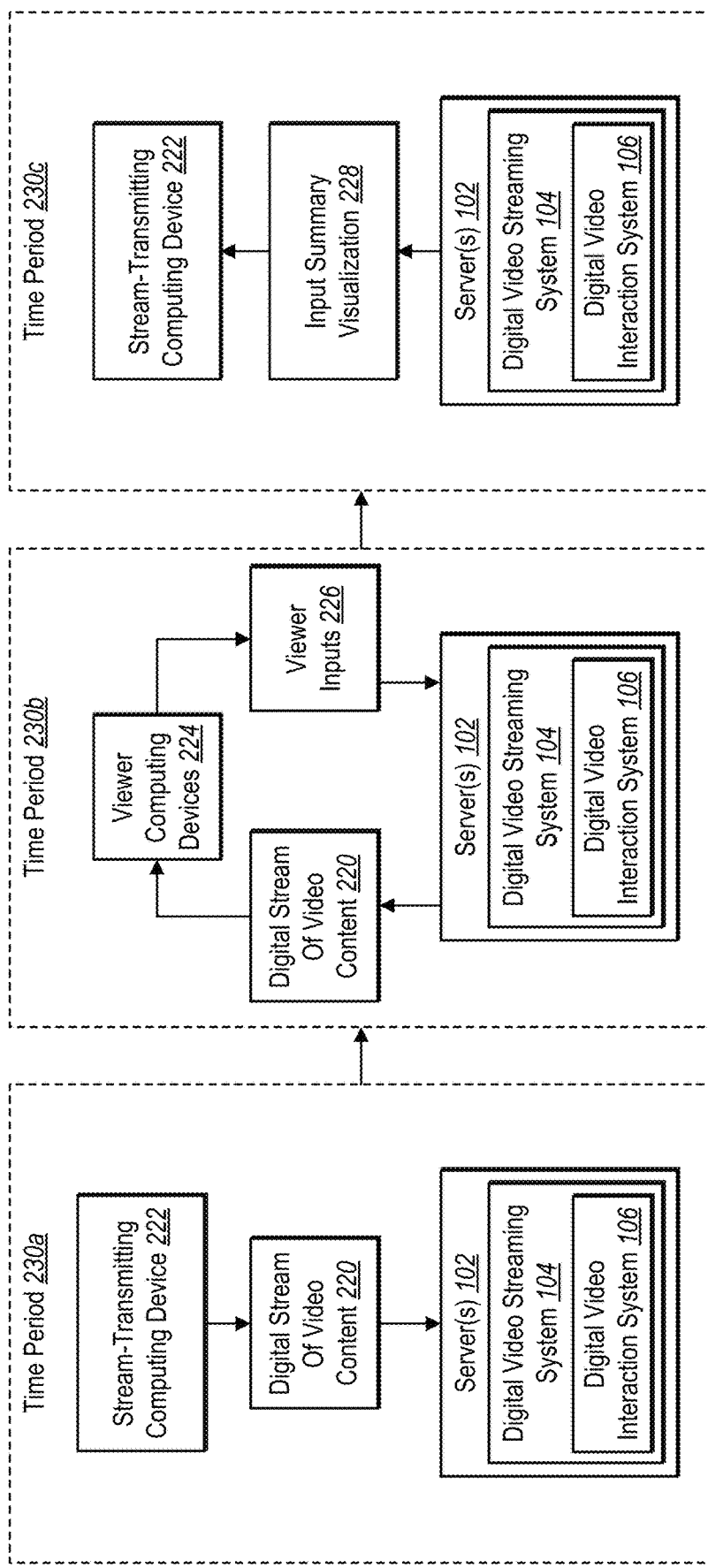

As mentioned above, in one or more embodiments, the digital video interaction system 106 collects viewer inputs that adjust visual attributes of a graphical element and generates an input summary visualization of the viewer inputs. FIGS. 2A-2B each illustrate an overview diagram of the digital video interaction system 106 generating an input summary visualization of viewer inputs that adjust visual attributes of a graphical element in accordance with one or more embodiments. In particular, FIG. 2A illustrates a broad overview of generating an input summary visualization that represents viewer inputs related to graphical elements in accordance with one or more embodiments. Further, FIG. 2B illustrates an overview of generating an input summary visualization of viewer inputs that adjust visual attributes of graphical elements within video content in accordance with one or more embodiments. Though FIGS. 2A-2B illustrate implementation of the digital video interaction system 106 with respect to a particular number of graphical elements, the digital video interaction system 106 operates similarly for various numbers of graphical elements.

As shown in FIG. 2A, the digital video interaction system 106 performs an act 202 of specifying visual attributes. In particular, the digital video interaction system 106 specifies (e.g., determines) which visual attributes of a graphical element are adjustable by viewer inputs.

In one or more embodiments, a graphical element includes a digital visual element that is displayable on a computing device. In particular, in some embodiments, a graphical element includes a digital element having visual attributes or characteristics that allow the digital element to be viewed via a display of a computing device. To illustrate, in some cases, a graphical element includes a digital image (e.g., a digitally generated or digitally reproduced image), a symbol or a character of text. In some cases, a graphical element includes a text box. In some implementations, a graphical element is displayable within video content (e.g., a digital video). In some cases, a graphical element (e.g., a summary graphical element) is displayable within an input summary visualization, which will be discussed in more detail below.

In some implementations, a graphical element is static. In other implementations, however, a graphical element is dynamic. Indeed, in one or more embodiments, a dynamic graphical element includes a graphical element that changes (e.g., moves) over time. For example, in some instances, a dynamic graphical element includes an animated graphical element or a graphical element that is otherwise configured to change its appearance over time.

In some implementations, a graphical element includes an interactive graphical element. In one or more embodiments, an interactive graphical element includes a graphical element that can be modified by a computing device. For example, in some cases, an interactive graphical element includes a graphical element that is adjustable (e.g., via one or more adjustable visual attributes) based on interactions with the graphical element by a computing device.

As just mentioned, in one or more embodiments, a graphical element includes or is otherwise associated with one or more visual attributes. Indeed, in one or more embodiments, a visual attribute includes a visual characteristic of a graphical element. For example, in some cases, a visual attribute includes a characteristic that affects or defines how a graphical element is displayed on a computing device. To illustrate, in some cases, a visual attribute includes a shape of a graphical element, a color of a graphical element, a position of a graphical element, a size of a graphical element, or a rotation of a graphical element. In some cases, a visual attribute includes text associated with the graphical element (e.g., text included in a text box). In some instances, a visual attribute includes a characteristic that affects or defines how a graphical element is displayed in relation to another graphical element. For example, in some cases, a visual attribute includes a distance of a graphical element from another graphical element or an angle created based on positions of the graphical element and the other graphical element with respect to an axis. In some embodiments, a visual attribute includes an animation associated with a graphical element. In one or more embodiments, the value of a visual attribute includes the particular representation of the visual attribute (e.g., the particular position of the graphical element, the particular color of the graphical element).

In one or more embodiments, the digital video interaction system 106 specifies or otherwise determines which visual attributes of a graphical element are adjustable based on user input received from a stream-transmitting computing device. For example, in some cases, the digital video interaction system 106 provides available visual attributes (e.g., the visual attributes 204) to the stream-transmitting computing device (e.g., via a graphical user interface displayed on the stream-transmitting computing device). Accordingly, the digital video interaction system 106 receives user input, from the stream-transmitting computing device, that identifies (e.g., selects) the visual attributes that are to be adjustable by the viewer inputs.

As will be discussed in more detail below, in one or more embodiments, the digital video interaction system 106 further determines (e.g., based on the user input received from the stream-transmitting computing device) visual attributes to be used in aggregating the viewer inputs. In some cases, as will be also discussed, the digital video interaction system 106 further determines, based on the user input received from the stream-transmitting computing device, one or more summary visualization attributes to be used in visualizing the viewer inputs.

As further indicated in FIG. 2A, the digital video interaction system 106 performs an act 206 of collecting viewer inputs from a set of viewer computing devices 208. Indeed, in one or more embodiments, a viewer input includes digital data received from a viewer computing device. In particular, in some embodiments, a viewer input includes digital data related to an adjustment to one or more visual attributes of a graphical element made by a viewer computing device. To illustrate, in some cases, a viewer input includes digital data representing an interaction by a viewer computing device with a graphical element that modifies one or more visual attributes of the graphical element. In one or more embodiments, the digital video interaction system 106 constrains the viewer computing devices 208 to adjusting only those visual attributes previously determined to be adjustable (e.g., based on the user input from the stream-transmitting computing device).

As further illustrated by FIG. 2A, the digital video interaction system 106 further performs an act 210 of aggregating the viewer inputs collected from the viewer computing devices 208. In particular, in some cases, the digital video interaction system 106 aggregates the viewer inputs into one or more input clusters. In one or more embodiments, the digital video interaction system 106 aggregates the viewer inputs using one or more of the visual attributes specified as adjustable by the viewer inputs. For example, in some cases, the digital video interaction system 106 aggregates the viewer inputs using a subset of the visual attributes specified (e.g., based on user input received from the stream-transmitting computing device) as adjustable by the viewer inputs. In some instances, however, the digital video interaction system 106 utilizes all visual attributes identified for adjustment by the viewer inputs to aggregate the viewer inputs.

As shown by FIG. 2A, in one or more implementations, upon aggregating the viewer inputs, the digital video interaction system 106 determines aggregated data attributes 212. In particular, the aggregated data attributes 212 relate to the input clusters resulting from the aggregation of the viewer inputs.

For example, as shown in FIG. 2A, the aggregated data attributes 212 include the aggregated visual attributes of each input cluster. In one or more embodiments, the aggregated visual attributes of an input cluster represent the visual attributes of the graphical elements resulting from the viewer inputs included in the input cluster. For instance, in some cases, the digital video interaction system 106 determines the aggregated visual attributes for an input cluster based on the most represented visual attribute values provided by the viewer inputs included in the cluster (e.g., the most common positions of the graphical elements represented in the cluster). In some cases, the digital video interaction system 106 determines the aggregated visual attributes by determining average values for the visual attributes provided by the viewer inputs of that cluster. In some instances, the aggregated visual attributes represent the adjustments made to those visual attributes specifically identified for aggregating the viewer inputs.

As further shown in FIG. 2A, the aggregated data attributes 212 include the percentage of viewer inputs represented by each input cluster. In one or more embodiments, the digital video interaction system 106 includes each viewer input collected in at least one input cluster. As will be discussed in more detail below, in one or more embodiments, the digital video interaction system 106 utilizes the percentage of viewer inputs or some other measurement of the viewer inputs represented by an input cluster (e.g., a raw viewer input count) to generate a summary graphical element representing the input cluster within an input summary visualization.

Additionally, as shown, the aggregated data attributes 212 include similarity metric values for the input clusters. In one or more embodiments, a similarity metric value includes a value representing the similarity between an input cluster and at least one other input cluster. For example, in some implementations, a similarity metric value includes a numerical value representing one or more latent and/or patent qualities associated with an input cluster. In particular, in some cases, a similarity metric value includes a value that corresponds to an input cluster and indicates the similarity of that input cluster to another input cluster when compared to the similarity metric value corresponding to that other input cluster. For example, in some implementations, the closeness of the similarity metric values of two input clusters represents the similarity of those input clusters. In other words, the similarity between two input clusters is greater or lesser based on the closeness or distance of their similarity metric values, respectively.

In one or more embodiments, the digital video interaction system 106 determines the similarity metric values for the input clusters by applying a principal component analysis algorithm to the input clusters determined by aggregating the viewer inputs. For example, in some implementations, the digital video interaction system 106 generates vectors representing the input clusters. In some implementations, a vector includes values representing patent and/or latent characteristics of the corresponding input cluster. In some cases, the digital video interaction system 106 further utilizes the principal component analysis algorithm to reduce the vector into one dimension—the similarity metric value. Indeed, in one or more embodiments, the digital video interaction system 106 utilizes the principal component analysis algorithm as described in Ian T. Jolliffe and Jorge Cadima, *Principal Component Analysis: A Review and Recent Developments*, Phil. Trans. R. Soc. A: Math., Phys. & Eng. Sci. Vol. 374 (2016), which is incorporated herein by reference in its entirety.

As further shown in FIG. 2A, the digital video interaction system 106 performs an act 214 of generating an input summary visualization. In one or more embodiments, an input summary visualization includes a graphic summarizing viewer inputs that adjust one or more visual attributes of a graphical element. In particular, in some implementations, an input summary visualization includes a graphic that reflects the viewer inputs according to the input clusters determined from aggregating the viewer inputs. For example, in one or more embodiments, an input summary visualization includes at least one graphical element (referred to as a summary graphical element) that represents an input cluster (e.g., reflects the one or more aggregated visual attributes associated with the corresponding input cluster). In some implementations, an input summary visualization further includes an organization or arrangement that represents the input clusters.

As indicated, in some cases, the digital video interaction system 106 generates the input summary visualization based on the input clusters resulting from aggregating the viewer inputs. In some implementations, the digital video interaction system 106 further generates the input summary visualization based on one or more of the aggregated data attributes associated with the input clusters. For example, in some cases, the digital video interaction system 106 associates, with a summary graphical element representing an input cluster, visual attributes that correspond to the aggregated visual attributes determined for that input cluster. In some implementations, the digital video interaction system 106 associates the summary graphical element with a size based on the number of viewer inputs represented by the input cluster. In some cases, the digital video interaction system 106 positions the summary graphical element relative to other summary graphical elements based on the similarity metrics of the corresponding input clusters.

As mentioned, FIG. 2B illustrates an overview of generating an input summary visualization of viewer inputs provided in relation to video content in accordance with one or more embodiments. As shown in FIG. 2B, at time period 230a, the digital video interaction system 106 accesses a digital stream of video content 220. In one or more embodiments, the digital video interaction system 106 accesses the digital stream of video content 220 by receiving the digital stream of video content 220 from a stream-transmitting computing device 222 (e.g., the stream-transmitting computing device that captured and/or stored the video content). In some implementations, the digital video interaction system 106 receives the digital stream of video content 220 from another computing device or a third-party system.

In one or more embodiments, a digital stream includes a sequential transmission and/or reception of digital data between or among computing devices that is displayed or otherwise rendered upon or shortly after receipt. In particular, in one or more embodiments, a digital stream includes a continuous transmission and/or reception of a data object (e.g., a data file) that allows the display or interaction of the portion of the data object already transmitted/received before the entirety of the data object has been transmitted/received. To illustrate, in some embodiments, a digital stream (also referred to as a digital video stream) includes a transmission and/or reception of video content that allows the receiving computing device (e.g., a viewer computing device) to view the portion of the video content already transmitted/received before the entirety of the video content has been transmitted/received. In some embodiments, a digital stream is live. For example, in some cases, the transmitting computing device (e.g., the stream-transmitting computing device) transmits the digital data as it is captured in real time (e.g., with a slight delay) and the receiving computing device displays the digital data as it is received in real time (e.g., with a slight delay).

In one or more embodiments, video content includes digital video. In particular, in one or more embodiments, video content includes digital data for displaying (e.g., playing via a video player) at least a portion of a digital video. In some implementations, video content includes a digital video that was pre-recorded (and stored in data storage for subsequent access). In some cases, however, video content includes live digital video (e.g., a digital video that is transmitted for viewing as soon as it is captured—or transmitted with minimal delay).

As further shown in FIG. 2B, at time period 230b, the digital video interaction system 106 provides the digital stream of video content 220 to viewer computing devices 224. In particular, in some cases, the digital video interaction system 106 provides the digital stream of video content 220 for display within user interfaces (e.g., a video player included in the user interfaces) of the viewer computing devices.

Additionally, as shown in FIG. 2B, at the time period 230b, the digital video interaction system 106 collects (e.g., receives) viewer inputs 226 from the viewer computing devices 224 while providing the digital stream of video content 220. In particular, the digital video interaction system 106 receives, from each viewer computing device, an interaction with at least one graphical element within the video content. As indicated above with reference to FIG. 2A, in one or more embodiments, the viewer inputs 226 adjust the graphical element in accordance with the visual attributes determined to be adjustable (e.g., based on user input received from the stream-transmitting computing device 222). In some implementations, as will be discussed in more detail below, the digital video interaction system 106 provides an input prompt to the viewer computing devices 224 and receives the viewer inputs 226 in response to the input prompt.

Further, as illustrated in FIG. 2B, at time period 230c, the digital video interaction system 106 generates an input summary visualization 228 representing the viewer inputs 226. In particular, as discussed above with reference to FIG. 2A, in some cases, the digital video interaction system 106 aggregates the viewer inputs 226 into input clusters and generates the input summary visualization 228 based on the input clusters (and/or one or more of the other aggregated data attributes). As shown in FIG. 2B, the digital video interaction system 106 provides the input summary visualization 228 for display on the stream-transmitting computing device 222. In some implementations, the digital video interaction system 106 further provides the input summary visualization 228 for display on the viewer computing devices 224.

Figure 3A:
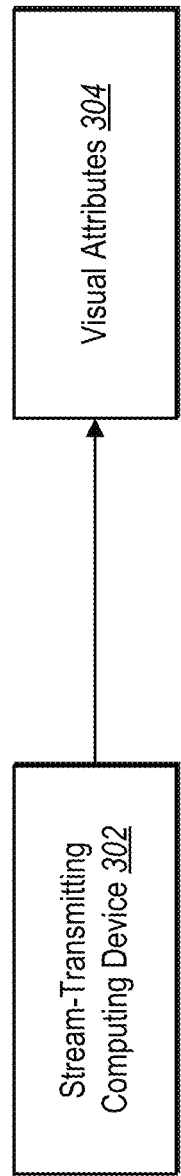
FIG. 3A illustrates a block diagram of determining visual attributes that are adjustable by viewer inputs based on user input received from a stream-transmitting computing device in accordance with one or more embodiments.
Figure 3B:
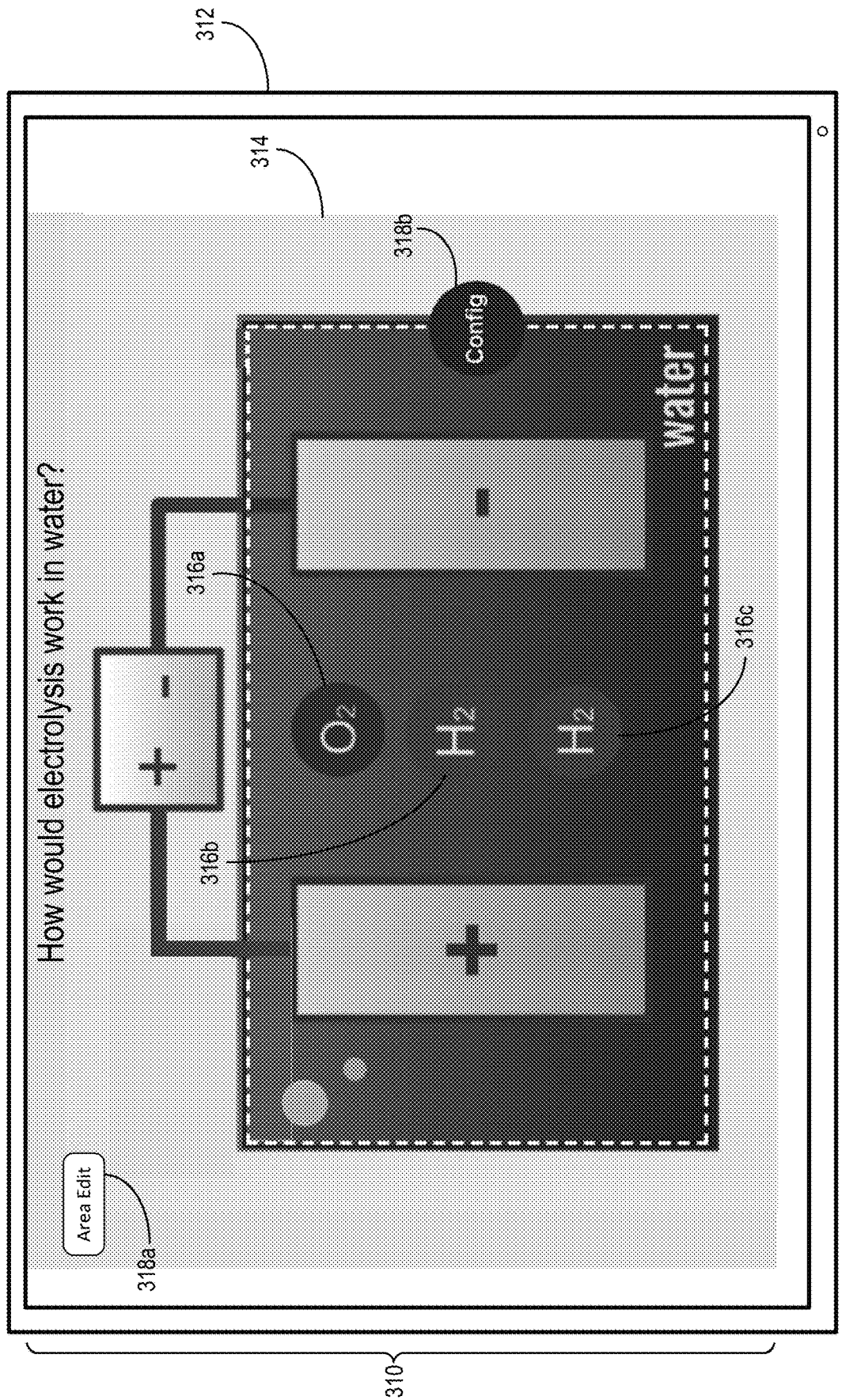
FIGS. 3B-3C illustrate graphical user interfaces used by the digital video interaction system for specifying visual attributes in accordance with one or more embodiments.
Figure 3C:
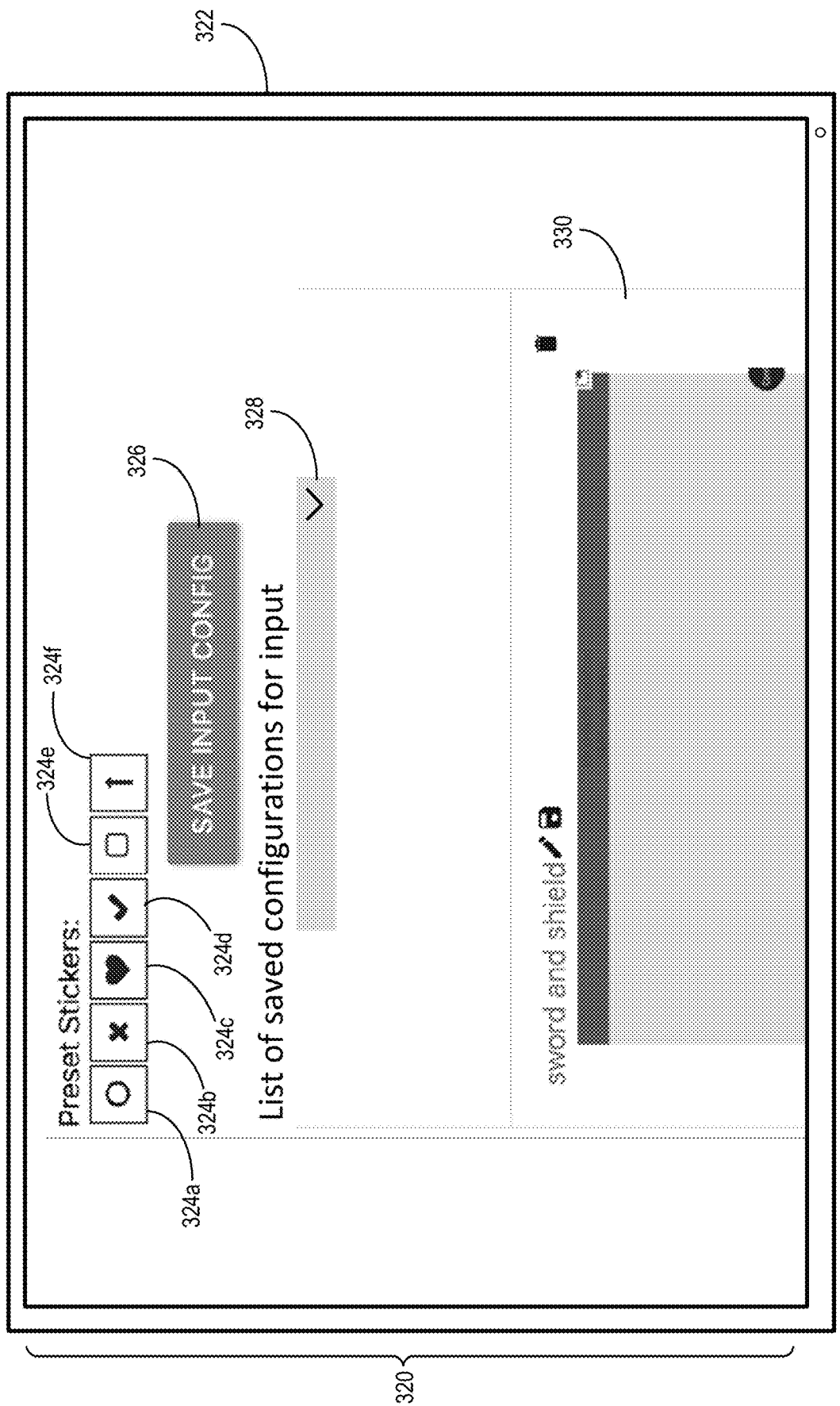
Figure 5A:
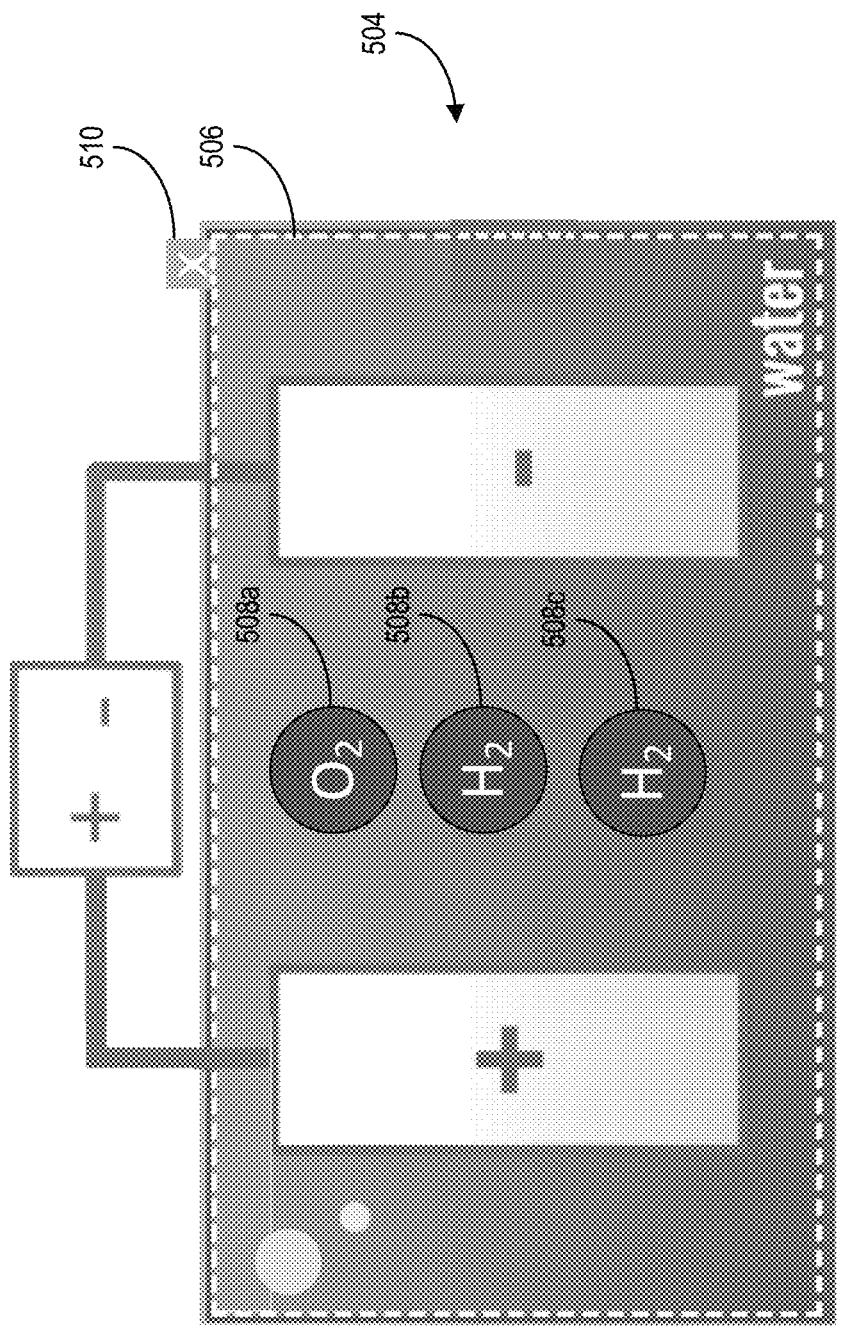
FIGS. 5A-5C illustrate composite graphics for determining constraints on how visual attributes can be adjusted in accordance with one or more embodiments.
Figure 5C:
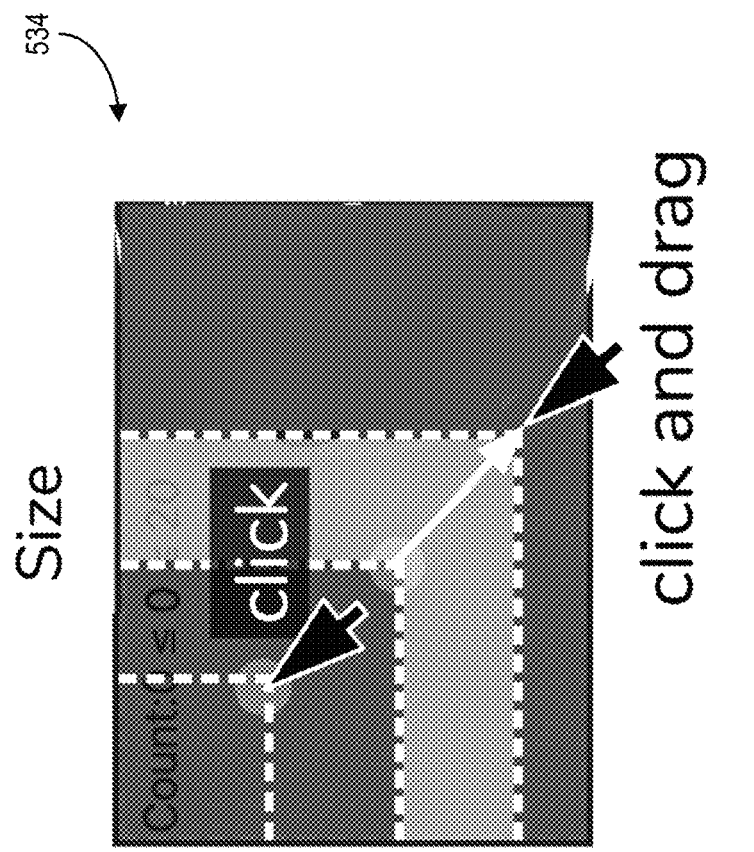
Figure 5B:
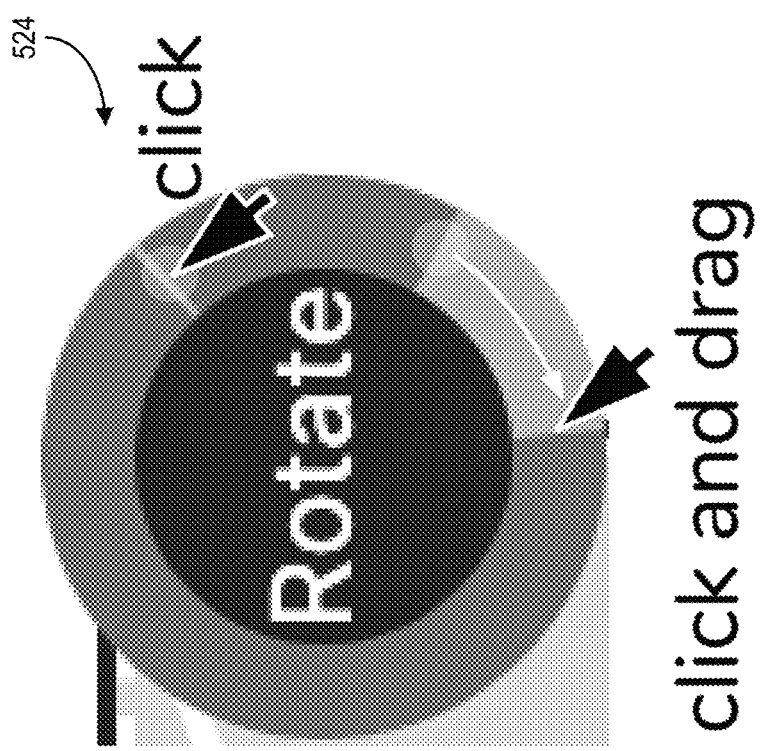

As mentioned above, in one or more embodiments, the digital video interaction system 106 determines visual attributes of one or more graphical elements that are adjustable by viewer inputs. FIGS. 3A-5C illustrate determining visual attributes that are adjustable by viewer inputs in accordance with one or more embodiments. In particular, FIGS. 3A-3C illustrate diagrams for determining visual attributes that are adjustable based on selections from a stream-transmitting computing device in accordance with one or more embodiments. Indeed, as will be discussed below, in some embodiments, the digital video interaction system 106 configures the adjustability of the visual attributes of a graphical element before the start of a digital stream of video content in response to user input provided by the stream-transmitting computing device and then adjusts the visual attributes of the graphical element in response to viewer inputs collected during the digital stream (e.g., a live streaming session). Additionally, FIGS. 4A-4B illustrate example visual attributes for adjustment by viewer inputs in accordance with one or more embodiments. Further, FIGS. 5A-5C illustrate graphical user interfaces used by the digital video interaction system 106 for determining constraints on the available adjustments in accordance with one or more embodiments.

In particular, FIG. 3A illustrates a block diagram of determining visual attributes 304 that are adjustable by viewer inputs based on user input received from a stream-transmitting computing device 302 in accordance with one or more embodiments. Indeed, in some implementations, the digital video interaction system 106 receives user input from the stream-transmitting computing device 302 that identifies the visual attributes 304 that are adjustable by the viewer inputs. In some implementations, the user input received from the stream-transmitting computing device 302 identifies a single visual attribute for adjustment by the viewer inputs. In some cases, however, the user input identifies multiple visual attributes for adjustment by the viewer inputs.

In one or more embodiments, the digital video interaction system 106 provides various optional visual attributes to the stream-transmitting computing device 302 and receives user input identifying a selection of one or more of the visual attributes for adjustment by the viewer inputs. FIG. 3B illustrates a graphical user interface 310 used by the digital video interaction system 106 for specifying visual attributes in accordance with one or more embodiments.

In particular, as shown in FIG. 3B, the digital video interaction system 106 provides the graphical user interface 310 for display on the stream-transmitting computing device 312. Further, the digital video interaction system 106 provides, for display within the graphical user interface 310, the region 314. In one or more embodiments, the region 314 includes a portion of video content, such as a portion of video content with which viewer computing devices are to interact to provide viewer inputs.

As shown in FIG. 3B, the digital video interaction system 106 further provides, for display within the region 314, graphical elements 316a-316. In one or more embodiments, the digital video interaction system 106 provides the graphical elements 316a-316c for display in response to user input from the stream-transmitting computing device 312 to generate the graphical elements 316a-316c. Indeed, based on the user input, the digital video interaction system 106 generates the graphical elements 316a-316c for inclusion in the video content (e.g., the portion of the video content corresponding to the region 314).

In one or more embodiments, the digital video interaction system 106 determines default (e.g., initial) values for visual attributes for the graphical elements 316a-316c based on further user input received from the stream-transmitting computing device 312. For example, in some implementations, the digital video interaction system 106 provides another graphical user interface for selection of default values for visual attributes (e.g., discussed below with reference to FIG. 3C). In some cases, the digital video interaction system 106 determines one or more default values for the visual attributes based on user interactions detected within the graphical user interface 310 (e.g., determines the initial position of the graphical elements 316a-316c based on user interactions placing the graphical elements 316a-316c within the region 314).

Additionally, as illustrated in FIG. 3B, the digital video interaction system 106 provides, for display within the region 314, selectable options 318a-318b for identifying digital attributes of the graphical elements 316a-316c that are adjustable by the viewer inputs. For example, in some instances, in response to detecting a selection of the selectable option 318a, the digital video interaction system 106 determines that the positions of the graphical elements 316a-316c are adjustable by the viewer inputs and/or the space in which the graphical elements 316a-316c can be positioned (e.g., an area that will be overlayed on the video content for positioning of the graphical elements 316a-316c). As another example, in some cases, in response to detecting a selection of the selectable option 318b, the digital video interaction system 106 provides an expanded menu that displays various other visual attributes for identification as adjustable by the viewer attributes.

In one or more embodiments, the digital video interaction system 106 further provides the selectable options 318a-318b for determining the degree to which the selectable visual attributes are adjustable. Indeed, the digital video interaction system 106 constrains the adjustability of visual attributes. In some cases, the digital video interaction system 106 constrains the adjustability based on user input received from the stream-transmitting computing device 312 via the graphical user interface 310. In at least one instance, as will be discussed in more detail with regard to FIGS. 5A-5C, in response to detecting a selection of one of the selectable options 318a-318b, the digital video interaction system 106 provides additional user interfaces, windows, and/or selectable options for use in determining the constraints on the adjustability of the identified visual attributes.

FIG. 3C illustrates an additional graphical user interface 320 used by the digital video interaction system 106 for specifying visual attributes in accordance with one or more embodiments. In particular, the digital video interaction system 106 provides the graphical user interface 320 for display on the stream-transmitting computing device 322.

As shown in FIG. 3C, the digital video interaction system 106 provides, for display within the graphical user interface 320, selectable options 324a-324f for selecting a value (e.g., a default or initialized value) of a visual attribute of a graphical element. Though FIG. 3C only illustrates selectable options for selecting the value of one visual attribute (e.g., the shape) of a graphical element, the digital video interaction system 106 provides selectable options for selecting a value of one or more additional visual attributes in some implementations.

Further, though FIG. 3C illustrates selectable options 324a-324f for selecting among pre-set shapes, the digital video interaction system 106 offers alternative options for selecting the shape of a graphical element in some instances. For example, in some embodiments, the digital video interaction system 106 provides an option that allows a stream-transmitting computing device to upload an image file or provides an option that allows the stream-transmitting computing device to draw a custom shape.

As further shown in FIG. 3C, the digital video interaction system 106 provides a save configuration option 326 for display within the graphical user interface 320. Indeed, in one or more embodiments, the digital video interaction system 106 generates a configuration that reflects the one or more graphical elements to be provided within the video content, the one or more visual attributes of the graphical element(s) that are adjustable by viewer inputs, and constraints placed on the adjustment of those visual attributes. In some implementations, the digital video interaction system 106 generates and stores a configuration in response to detecting a user selection of the save configuration option 326.

Accordingly, in some implementations, the digital video interaction system 106 generates a configuration before providing a digital stream of the corresponding video content and stores the configuration for subsequent access when providing the digital stream. In some cases, the digital video interaction system 106 stores the configuration for use in multiple digital streams of video content, whether the video content is the same or different across the various digital streams. In some embodiments, however, the digital video interaction system 106 provides the graphical user interface 320 during a digital stream of video content for on-the-fly configuration. In such embodiments, the digital video interaction system 106 can limit use of the configuration to the current digital stream or save the configuration for additional use in one or more subsequent digital streams.

Indeed, as shown in FIG. 3C, the digital video interaction system 106 further provides a drop-down menu 328 within the graphical user interface 320. In response to detecting a user selection of the drop-down menu 328, the digital video interaction system 106 provides a list of configurations that were previously generated and saved. For example, in some implementations, the digital video interaction system 106 generates a pre-set template library that includes a plurality of configurations, where each configuration identifies at least one graphical element and one or more visual attributes of the at least one graphical element that are adjustable by viewer inputs. In some cases, at least some of the configurations within the pre-set template library include configurations generated solely by the digital video interaction system 106. By contrast, in some instances, at least some of the configurations in the pre-set template library include configurations generated in response to user input from the stream-transmitting computing device 322. In one or more embodiments, in response to detecting a selection of one of the previously-saved configurations, the digital video interaction system 106 provides options for modifying the configuration and/or associating the configuration with a digital stream of video content. Indeed, in some implementations, the digital video interaction system 106 utilizes a configuration selected via the drop-down menu 328 as a starting point and further modifies the configuration based on user input received from the stream-transmitting computing device 322.

Additionally, as shown in FIG. 3C, the digital video interaction system 106 provides a window 330 for display in the graphical user interface 320. In one or more embodiments, the window 330 includes a preview window for previewing a configuration, such as a saved configuration selected from the drop-down menu 328 or a newly-generated configuration.

As mentioned, FIG. 4A illustrates example visual attributes 402a-402e of a graphical element in accordance with one or more embodiments. In particular, in one or more embodiments, the visual attributes 402a-402e are associated with a graphical element included within video content that will be provided to viewer computing devices as part of a digital stream. In some instances, the visual attributes 402a-402e include visual attributes that are available for identification as visual attributes that are adjustable by viewer inputs. In other words, the digital video interaction system 106 determines which of the visual attributes 402a-402e are adjustable during the digital stream of video content. As discussed above, in some implementations, the digital video interaction system 106 determines which of the visual attributes 402a-402e are adjustable based on user input received from a stream-transmitting computing device.

In some embodiments, by determining that a visual attribute is adjustable, the digital video interaction system 106 removes or relaxes constraints on the visual attributes so that viewer inputs can modify the visual attribute or otherwise establishes that the viewer inputs can modify the visual attribute. For example, by determining that the position of a graphical element is adjustable, the digital video interaction system 106 removes or relaxes the constraints on the position of the graphical element so that viewer inputs can move the graphical element within the video content. In some implementations, the digital video interaction system 106 applies a restriction on modifying the visual attribute by default and removes the restriction upon identifying the visual attribute for adjustment by viewer inputs.

Though FIG. 4A shows particular visual attributes, it should be understood that the digital video interaction system 106 manages additional or alternative visual attributes in some instances. For example, as indicated above, in one or more embodiments, a visual attribute associated with a graphical element corresponds to a distance between that graphical element and another graphical element. Accordingly, in some instances, the digital video interaction system 106 determines that the visual attribute is adjustable by viewer inputs and removes or relaxes the constraints on the visual attribute so the viewer inputs can adjust the distance between the graphical element and the other graphical element. Likewise, as discussed above, in some embodiments, a visual attribute associated with a graphical element corresponds to an angle created by the position of the graphical element and another graphical element with respect to an axis (or with respect to a third graphical element or other visual element displayed within the video content). Accordingly, in some cases, the digital video interaction system 106 determines that the visual attribute is adjustable and removes or relaxes the constraints on the visual attribute so the viewer inputs can adjust the positioning of the graphical element and/or the other graphical element to modify the angle.

Further, in some instances, as previously discussed, a graphical element is dynamic. Accordingly, in some cases, a visual attribute associated with the graphical element corresponds to whether or not an animation is applied to the graphical element and, if so, what type of animation. Thus, in at least one instance, the digital video interaction system 106 removes or relaxes the constraints on the visual attribute so the viewer inputs can adjust the visual attribute of the graphical element by applying an animation (e.g., a different animation than currently applied) to the graphical element.

Further, in some implementations, the digital video interaction system 106 utilizes text boxes as graphical elements. For example, in some cases, a graphical element includes a visually anchored text box. In some implementations, a visual attribute associated with the text box includes the text included in the text box. Accordingly, the digital video interaction system 106 determines that the visual attribute is adjustable and removes or relaxes the constraints on the visual attribute so that viewer inputs can change (e.g., add, delete, or modify) the text within a text box.

FIG. 4B illustrates a graphical element 410 having particular values corresponding to a combination of visual attributes in accordance with one or more embodiments. In particular, FIG. 4B illustrates the graphical element 410 having a particular shape, color, size, rotation, and position. In one or more embodiments, the digital video interaction system 106 utilizes the values of the combination of visual attributes shown in FIG. 4B as the default values for those visual attributes (e.g., based on user input received from a stream-transmitting computing device). In some implementations, the digital video interaction system 106 receives the particular values as part of a viewer input adjusting the graphical element 410 within video content. For example, in at least one instance, the digital video interaction system 106 receives a viewer input that adjusts the graphical element 410 by adjusting the visual attributes to include the particular values.

Indeed, in one or more embodiments, the digital video interaction system 106 removes or relaxes the constraints on multiple visual attributes so that viewer inputs can adjust multiple visual attributes of the graphical element 410. By selecting a combination of visual attributes of a graphical element for adjustment by viewer inputs, the digital video interaction system 106 operates more flexibly than conventional content streaming systems. Indeed, the digital video interaction system 106 facilitates more flexible visual inputs. In particular, the digital video interaction system 106 facilitates a large variety of visual inputs that offer improved expressiveness when compared to conventional systems that typically limit the control of viewer inputs to a single visual attribute.

Though FIG. 4B illustrates a particular combination of visual attributes for the graphical element 410, it should be understood that the digital video interaction system 106 uses various combinations of visual attributes. In particular, the digital video interaction system 106 removes and/or relaxes the constraints on various combinations of visual attributes so that viewer inputs can adjust those visual attributes.

By removing and/or relaxing constraints so that viewer inputs can adjust a combination of visual attributes, the digital video interaction system 106 operates more flexibly than conventional content streaming systems. Indeed, the digital video interaction system 106 provides for more variation in the adjustments made to graphical elements by viewer inputs. Accordingly, the digital video interaction system 106 flexibly facilitates more expressive viewer inputs than allowed under conventional systems.

As mentioned above, FIGS. 5A-5C illustrate composite graphics for determining constraints on how visual attributes can be adjusted in accordance with one or more embodiments. In particular, FIGS. 5A-5C illustrate composite graphics used for determining constraints for the adjustment of exemplary visual attributes. Similar principals can be applied to visual attributes not shown in these figures. Though not explicitly shown in the below figures, the digital video interaction system 106 provides the composite graphics illustrated below within a graphical user interface in some implementations.

Indeed, in some implementations, the digital video interaction system 106 associates constraints on visual attributes to prevent the adjustment of those visual attributes. For instance, in some cases, the digital video interaction system 106 places constraints on all visual attributes associated with a graphical element by default. Accordingly, based upon receiving user input identifying one or more visual attributes that are adjustable by viewer inputs, the digital video interaction system 106 removes or relaxes the constraints associated with those visual attributes. By determining the constraints for the adjustment of the visual attributes, the digital video interaction system 106 determines whether constraints will still apply to some degree and, if so, what those constraints are (e.g., the limits to which a viewer input can adjust a visual attribute).

For example, FIG. 5A illustrates a composite graphic 504. As shown in FIG. 5A, in one or more embodiments, the composite graphic 504 displays a portion of video content within which graphical elements 508a-508c will be displayed during a digital stream of the video content. Further, as shown, the digital video interaction system 106 provides a position bounding box 506 for display within the composite graphic 504. In one or more embodiments, the position bounding box 506 defines the boundaries of the area within which the graphical elements 508a-508c can be positioned by viewer inputs. In other words, the digital video interaction system 106 establishes a constraint, based on the position bounding box 506, that prevents a viewer input from repositioning one of the graphical elements 508a-508c outside of the position bounding box 506. In one or more embodiments, the digital video interaction system 106 overlays the area defined by the position bounding box 506 over the portion of the video content when collecting viewer inputs from the viewer computing devices so that the viewer computing devices can reposition the graphical elements 508a-508c.

In one or more embodiments, the digital video interaction system 106 modifies the position bounding box 506 based on received user input. Indeed, the digital video interaction system 106 makes the position bounding box 506 bigger or smaller based on the user input. By modifying the position bounding box 506, the digital video interaction system 106 modifies the constraint on where a viewer input can position one of the graphical elements 508a-508c.

As further shown in FIG. 5A, the digital video interaction system 106 provides a deselect option 510 for display within the composite graphic 504 and in association with the position bounding box 506. In one or more embodiments, in response to detecting a user selection of the deselect option 510, the digital video interaction system 106 removes the constraint on the position with which the graphical elements 508a-508c can be placed. Accordingly, a viewer input can position the graphical elements 508a-508c anywhere within the composite graphic 504.

FIG. 5B illustrates a composite graphic 524. As shown in FIG. 5B, in one or more embodiments, the composite graphic 524 represents a graphical element to be adjusted within video content. In some cases, in response to detecting user input interacting with the composite graphic 524, the digital video interaction system 106 establishes a constraint on how much a viewer input can rotate the graphical element. For example, as shown in FIG. 5B, in one or more embodiments, the digital video interaction system 106 detects a user input that selects (e.g., clicks on) the composite graphic 524 and drags the selection to indicate a range of rotation. Thus, the digital video interaction system 106 establishes a constraint that prevents a viewer input from rotating a graphical element more than the indicated range of rotation.

FIG. 5C illustrates a composite graphic 534. As shown in FIG. 5C, in one or more embodiments, the composite graphic 534 represents a graphical element to be adjusted within video content. In some cases, in response to detecting user input interacting with the composite graphic 534, the digital video interaction system 106 establishes a constraint on the size a viewer input can apply to the graphical element. For example, as shown in FIG. 5C, in one or more embodiments, the digital video interaction system 106 detects a user input that selects (e.g., clicks on) the composite graphic 534 and drags the selection to indicate a maximum size that can be applied to the graphical element. Thus, the digital video interaction system 106 establishes a constraint that prevents a viewer input from applying a size to the graphical element that is greater than the indicated maximum size.

As indicated above, in one or more embodiments, the digital video interaction system 106 establishes a constraint on the adjustability of a visual attribute by a viewer input based on a range of values. In particular, the digital video interaction system 106 receives, from a stream-transmitting computing device, a range of values in which a viewer input can adjust the corresponding visual attribute of a graphical element (e.g., an area providing a range of values for a position of the graphical element, a range of values for the rotation of the graphical element, a range of values for the size of the graphical element). Accordingly, in such embodiments, the digital video interaction system 106 establishes the constraint based on the received range of values.

As indicated above, the digital video interaction system 106 determines that there are multiple graphical elements that are adjustable by viewer inputs within the video content in some instances. Accordingly, in one or more embodiments, the digital video interaction system 106 determines that the same visual attributes are adjustable for each graphical element and/or the same constraints apply to the adjustments of those visual attributes. In some embodiments, however, the digital video interaction system 106 determines that different combinations of visual attributes are adjustable for each graphical element and/or that different constraints apply to the adjustments of those visual attributes. In other words, in some cases, the digital video interaction system 106 configures the adjustability of each graphical element differently.

Thus, in one or more embodiments, the digital video interaction system 106 communicates with a stream-transmitting computing device to identify one or more graphical elements that are adjustable within video content and determine how the graphical element(s) is to be adjustable. In particular, the digital video interaction system 106 generates configurations related to the adjustability of the graphical element(s) by determining which visual attributes are adjustable and any constraints to be applied to their adjustment. Accordingly, in some embodiments, the algorithm and acts described with reference to FIGS. 3B-3C and 5A-5C correspond to performing a step for configuring visual attributes of a graphical element to be interactive within video content based on selections from a stream-transmitting computing device.

Figure 6B:
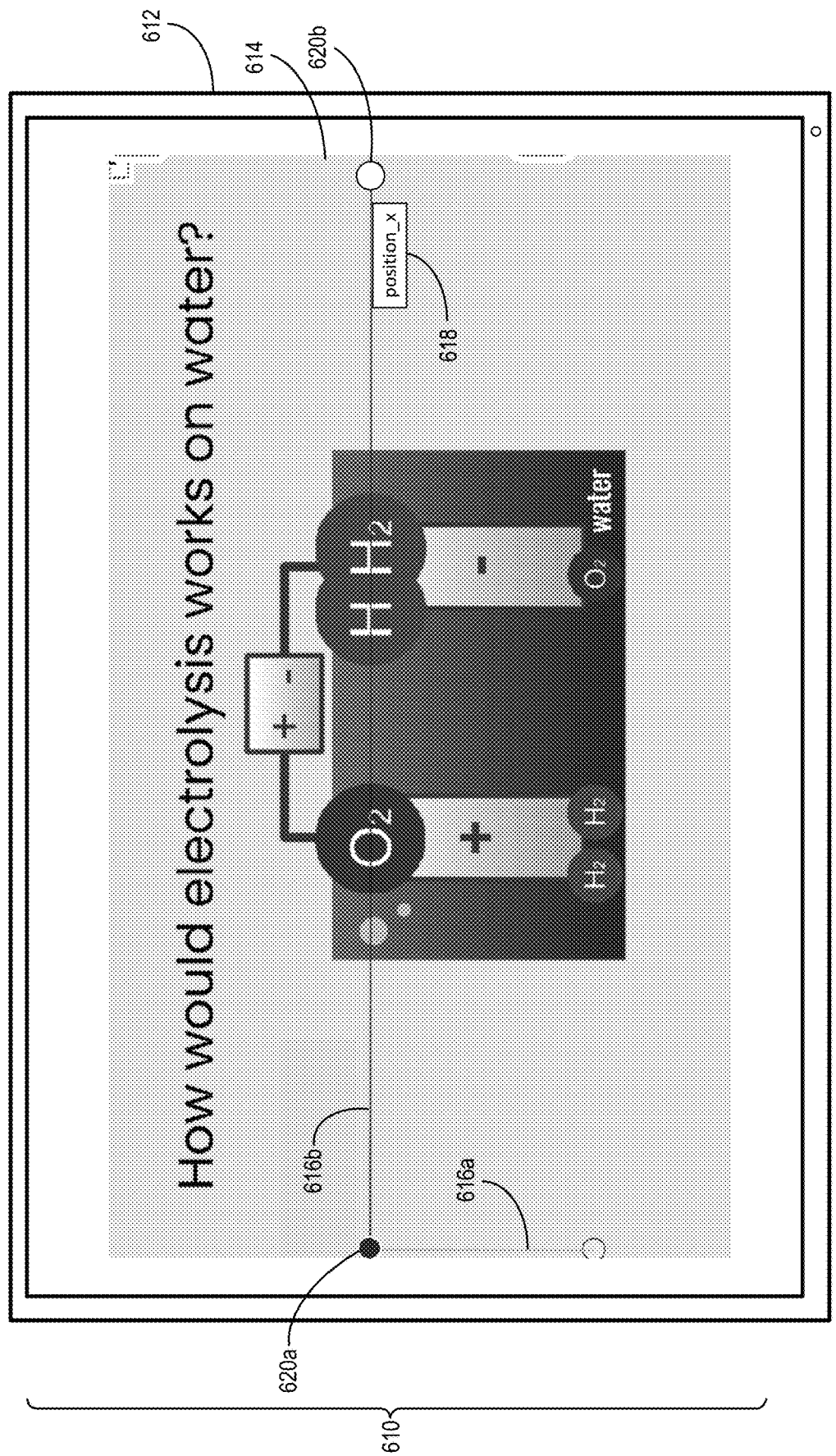
FIGS. 6B-6C illustrate graphical user interfaces used by the digital video interaction system for specifying one or more summary visualization attributes in accordance with one or more embodiments.
Figure 6C:
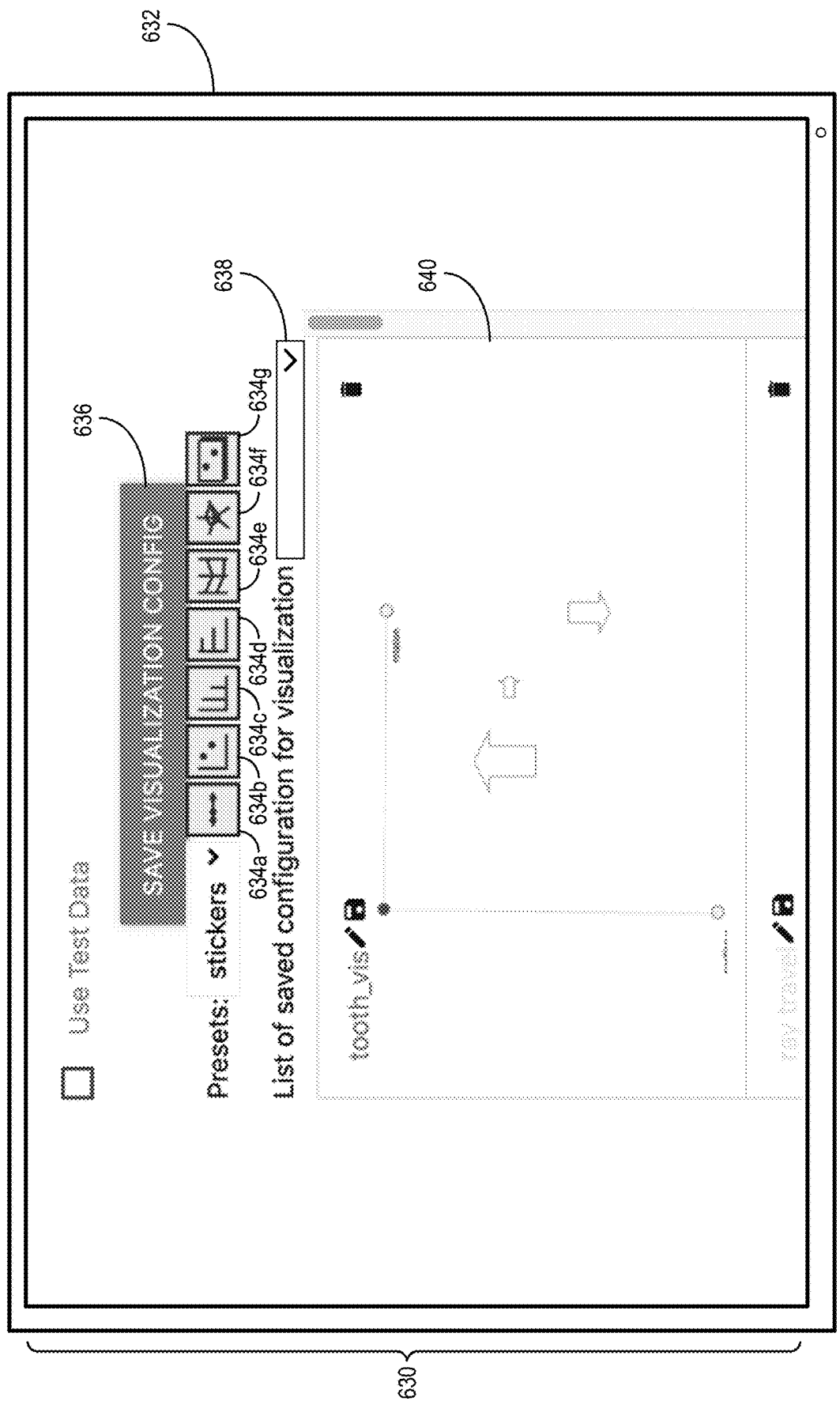

As discussed above, in one or more embodiments, the digital video interaction system 106 further determines summary visualization attributes for generating an input summary visualization to reflect viewer inputs that adjust one or more graphical elements. FIGS. 6A-6C illustrate diagrams for determining summary visualization attributes for generating an input summary visualization based on selections from a stream-transmitting computing device in accordance with one or more embodiments.

In particular, FIG. 6A illustrates a block diagram of determining summary visualization attributes 604 for generating an input summary visualization based on user input received from a stream-transmitting computing device 602 in accordance with one or more embodiments. In one or more embodiments, a summary visualization attribute includes a characteristic that affects or defines an input summary visualization. For example, in some cases, a summary visualization attribute includes an attribute that affects or defines an organization and/or display of visual elements (referred to as summary graphical elements) within an input summary visualization. To illustrate, in some instances, a summary visualization attribute includes a characteristic related to a number of axes to use for displaying the summary graphical elements within the input summary visualization or a characteristic related to how to display the summary graphical elements with respect to the number of axes (e.g., by increasing input cluster size, by positioning within the video content). In some cases, a summary visualization attributes includes a characteristic related to a particular plot that will be used for the input summary visualization.

As mentioned, in one or more embodiments, an input summary visualization includes one or more summary graphical elements, and a summary visualization attribute affects how those summary graphical elements are organized and/or displayed. Indeed, in one or more embodiments, a summary graphical element includes a graphical element that is displayable within an input summary visualization. More detail regarding summary graphical elements and their display within input summary visualizations will be provided below.

In some implementations, the digital video interaction system 106 receives user input from the stream-transmitting computing device 602 that identifies the summary visualization attributes 604 for generating an input summary visualization. In some implementations, the user input received from the stream-transmitting computing device 602 identifies a single summary visualization attribute. In some cases, however, the user input identifies multiple summary visualization attributes.

FIG. 6B illustrates a graphical user interface 610 used by the digital video interaction system 106 for specifying one or more summary visualization attributes in accordance with one or more embodiments. In particular, as shown, the digital video interaction system 106 provides the graphical user interface 610 for display on the stream-transmitting computing device 612.

As further shown in FIG. 6B, the digital video interaction system 106 provides a viewer input template visualization 614 for display within the graphical user interface 610. In one or more embodiments, the viewer input template visualization 614 corresponds to an image designated for use as part of an input summary visualization. For example, in some implementations, the viewer input template visualization 614 corresponds to a portion of video content within which graphical elements are adjusted by viewer inputs. Indeed, in some instances, the digital video interaction system 106 utilizes the same portion of the video content for the input summary visualization.

In one or more embodiments, based on user input received via the graphical user interface 610, the digital video interaction system 106 establishes one or more summary visualization attributes. For example, FIG. 6B illustrates the digital video interaction system 106 providing the axes 616a-616b for display within the viewer input template visualization 614. In particular, the digital video interaction system 106 establishes the axes 616a-616b for use in arranging one or more summary graphical elements within the corresponding input summary visualization.

Indeed, FIG. 6B illustrates a configuration for a multi-dimensional input summary visualization (e.g., an input summary visualization utilizing more than one axis to arrange summary graphical elements displayed within the input summary visualization). It should be noted, however, that the digital video interaction system 106 generates configurations that use one axis in some implementations.

In one or more embodiments, based on user interactions with the graphical user interface 610 (e.g., interactions with the viewer input template visualization 614 itself), the digital video interaction system 106 adds the axes 616a-616b for use within the input summary visualization. For example, in some implementations, the digital video interaction system 106 provides a selectable option (not shown) within the graphical user interface 610 for adding axes or reacts to a particular user interaction (e.g., a right-click or a keyboard shortcut) designated for adding axes. In some cases, the digital video interaction system 106 provides a selectable option for subtracting axes from use in the input summary visualization in a similar manner.

As further shown in FIG. 6B, the digital video interaction system 106 provides an axis tag 618 for display in association with the axis 616b. In particular, the axis tag 618 indicates the designated use of the axis 616b within the input summary visualization. In other words, the axis tag 618 indicates how the digital video interaction system 106 has determined to arrange summary graphical elements with respect to the axis 616b within the input summary visualization. The axis tag 618 of FIG. 6B indicates one particular designated use of an axis. Other uses are available in some implementations. More detail regarding the potential uses of an axis within an input summary visualization will be provided below.

In some implementations, in response to detecting a user interaction in association with the axis 616b, the digital video interaction system 106 provides selectable options (now shown) for display within the viewer input template visualization 614. For example, in some cases, in response to detecting a user interaction with the axis tag 618, the digital video interaction system 106 provides selectable options for changing the use of the axis 616b. As another example, in some instances, in response to detecting a user interaction with the axis 616b, such as a user interaction with one of the endpoints 620a-620b of the axis 616b, the digital video interaction system 106 provides selectable options for modifying the axis 616b itself (e.g., changing an orientation of the axis 616b).

FIG. 6C illustrates a graphical user interface 630 used by the digital video interaction system 106 for specifying summary visualization attributes in accordance with one or more embodiments. In particular, the digital video interaction system 106 provides the graphical user interface 630 for display on the stream-transmitting computing device 632.

As shown in FIG. 6C, the digital video interaction system 106 provides, for display within the graphical user interface 630, selectable options 634a-634g for selecting a summary visualization attribute. Though FIG. 6C only illustrates selectable options for selecting the value for one summary visualization attribute (e.g., the type of plot that will be used for the input summary visualization), the digital video interaction system 106 provides selectable options for selecting a value of one or more additional summary visualization attributes in some implementations.

As further shown in FIG. 6C, the digital video interaction system 106 provides a save configuration option 636 for display within the graphical user interface 630. Indeed, in one or more embodiments, the digital video interaction system 106 generates a configuration that reflects the one or more summary visualization attributes to be used for generating an input summary visualization. In some implementations, the digital video interaction system 106 generates and stores a configuration in response to detecting a user selection of the save configuration option 636.

Accordingly, in some implementations, the digital video interaction system 106 generates a configuration before collecting viewer inputs (and generating a corresponding input summary visualization) and stores the configuration for subsequent access when generating an input summary visualization after viewer inputs have been collected. In some cases, the digital video interaction system 106 stores the configuration for use in generating several input summary visualizations. In other words, the digital video interaction system 106 utilizes the configuration for generating input summary visualizations for different digital streams of video content. In some embodiments, however, the digital video interaction system 106 provides the user graphical interface 630 after collecting viewer inputs during a particular digital stream of video content for on-the-fly configuration. In such embodiments, the digital video interaction system 106 can limit use of the configuration to the current digital stream or save the configuration for additional use in one or more subsequent digital streams.

Indeed, as shown in FIG. 6C, the digital video interaction system 106 further provides a drop-down menu 638 within the graphical user interface 630. In response to detecting a user selection of the drop-down menu 638, the digital video interaction system 106 provides a list of configurations that were previously generated and saved. In one or more embodiments, in response to detecting a selection of one of the saved configurations, the digital video interaction system 106 provides options for modifying the configuration and/or utilizing the configuration to generate an input summary visualization.

Additionally, as shown in FIG. 6C, the digital video interaction system 106 provides a window 640 for display in the graphical user interface 630. In one or more embodiments, the window 640 includes a preview window for previewing a configuration, such as a saved configuration selected from the drop-down menu 638 or a newly-generated configuration.

Figure 7:
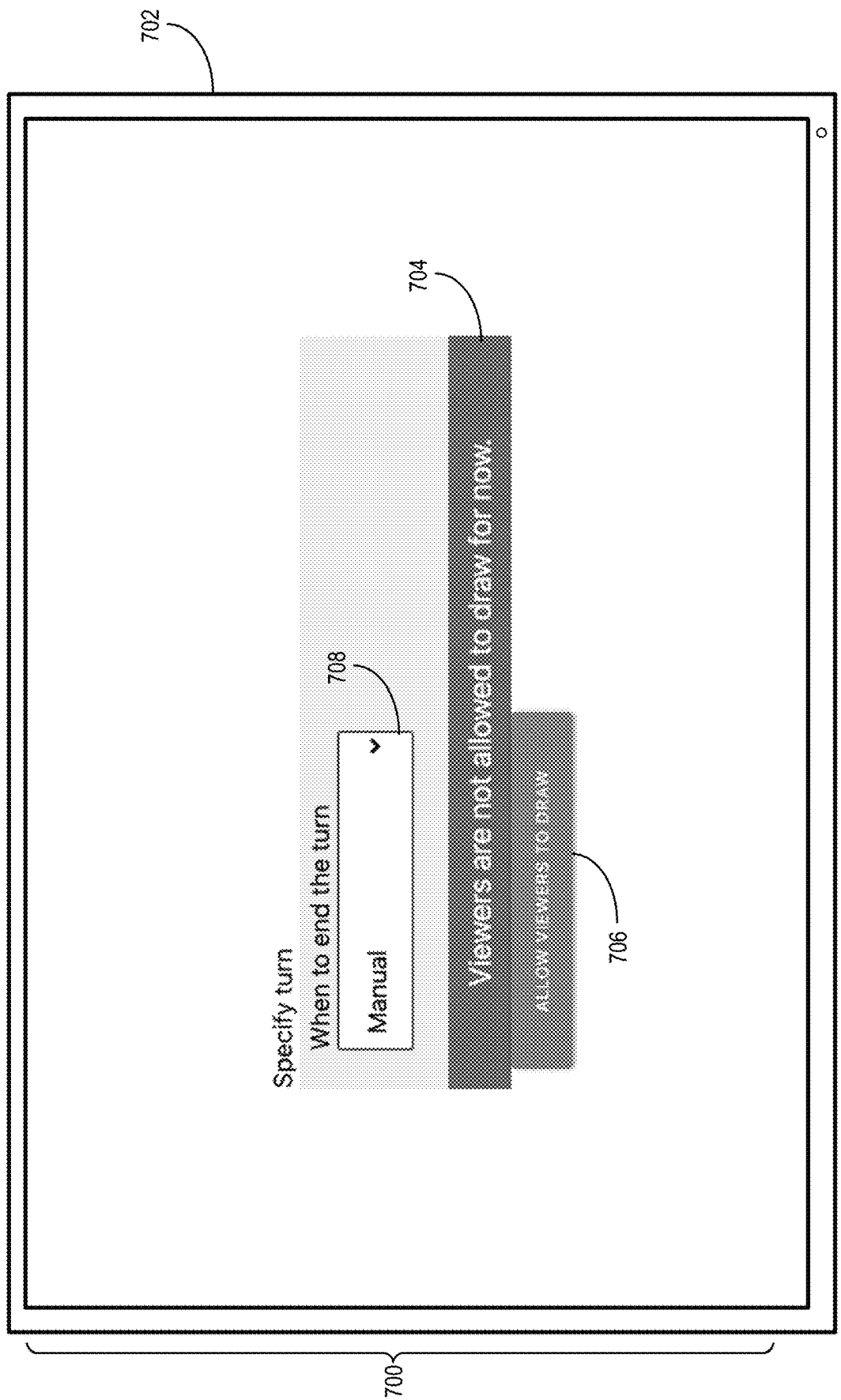
FIG. 7 illustrates a graphical user interface used by the digital video interaction system for initiating an input prompt in accordance with one or more embodiments.

As mentioned above, in one or more embodiments, the digital video interaction system 106 collects viewer inputs adjusting a graphical element within video content. In some instances, the digital video interaction system 106 collects the viewer inputs upon initiating an input prompt. FIG. 7 illustrates a graphical user interface 700 used by the digital video interaction system 106 for initiating an input prompt in accordance with one or more embodiments. In particular, the digital video interaction system 106 provides the graphical user interface 700 for display on the stream-transmitting computing device 702.

As shown in FIG. 7, the digital video interaction system 106 provides, for display within the graphical user interface 700, a status indicator 704 that indicates whether or not viewer inputs are currently being collected. In some implementations, the digital video interaction system 106 updates the status indicator 704 when collection of viewer inputs has been initiated and/or has ended.

As further shown in FIG. 7, the digital video interaction system 106 provides the input prompt button 706. In one or more embodiments, the digital video interaction system 106 receives an input prompt in response to a user selection of the input prompt button 706. Further, in some implementations, the digital video interaction system 106 begins collecting viewer inputs in response to the user selection of the input prompt button 706. In other words, the digital video interaction system 106 enables the viewer computing devices to adjust one or more graphical elements within the video content being displayed via a digital stream.

Additionally, as shown in FIG. 7, the digital video interaction system 106 provides a drop-down menu 708 for specifying how collection of viewer inputs ends. In some implementations, the digital video interaction system 106 determines, based on a user selection via the drop-down menu 708, that the collection of viewer inputs ends when the stream-transmitting computing devices provides a particular indication that it should end. In some cases, the digital video interaction system 106 determines that the collection of viewer inputs ends after a specified time limit. In some cases, the digital video interaction system 106 determines that the collection of viewer inputs ends when all viewer computing devices participating in the digital stream of video content (or a specified number of viewer computing devices) have provided input.

In some implementations, rather than utilizing a separate graphical user interface, the digital video interaction system 106 provides the status indicator 704, the input prompt button 706, and the drop-down menu 708 within a window displayed within a graphical user interface through which the digital video interaction system 106 further displays the video content. Accordingly, the stream-transmitting computing device 702 can quickly access options related to initiating an input prompt.

As shown, FIG. 7 suggests receiving an input prompt via a manual user input (e.g., a user selection of the input prompt button 706). In some implementations, however, the digital video interaction system 106 receives or detects an input prompt in response to other triggers. For example, in at least one implementation, the digital video interaction system 106 detects a user input when the digital stream reaches a particular portion of the video content. In such cases, the digital video interaction system 106 automatically initiates a collection of viewer inputs.

In some implementations, the digital video interaction system 106 further provides, within the graphical user interface 700, options for selecting a configuration to associate with the input prompt. For example, in some cases, the digital video interaction system 106 provides an option for selecting a previously saved configuration for use. In some implementations, the digital video interaction system 106 provides an option for on-the-fly configuration.

Figure 8:
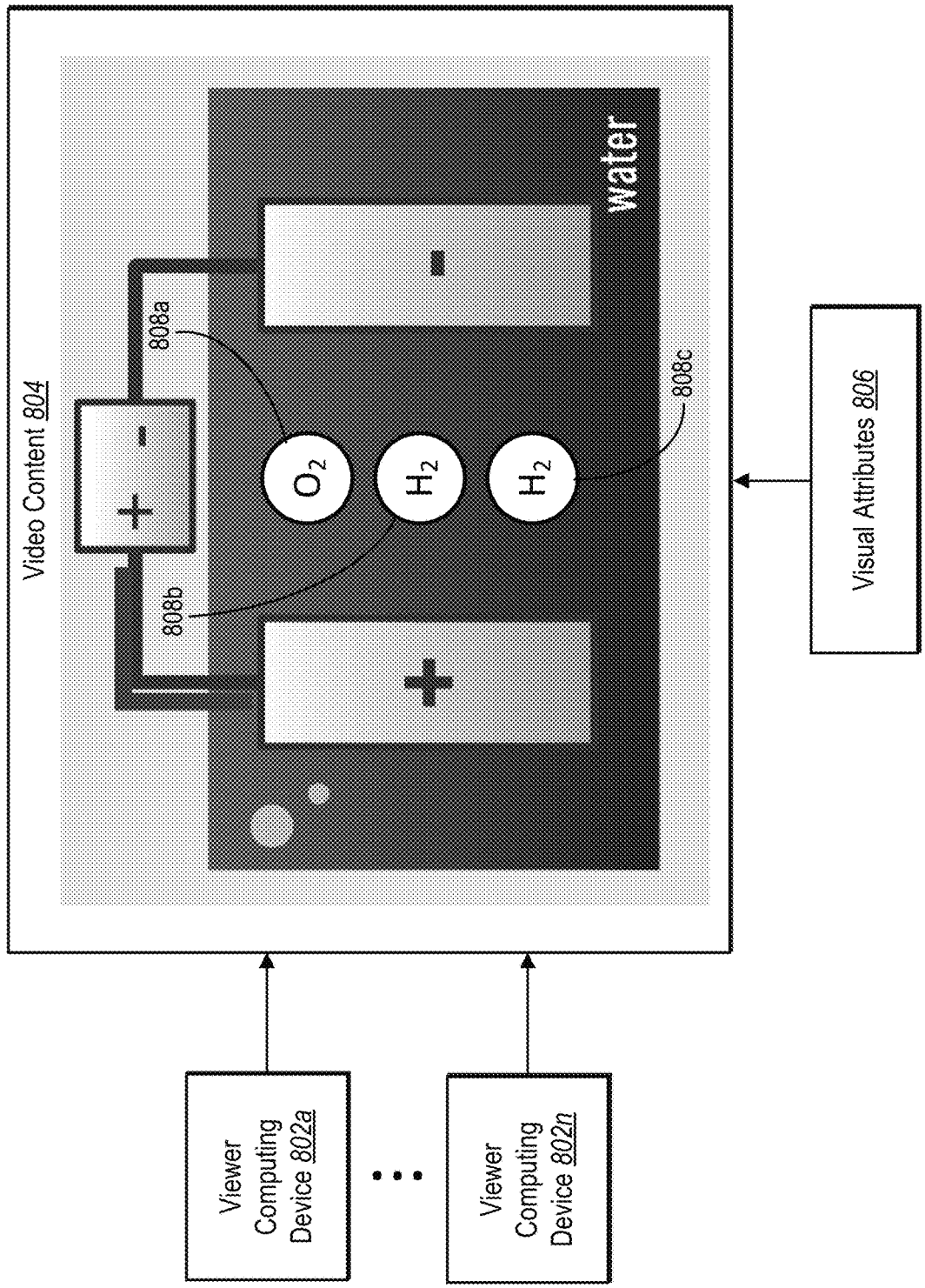
FIG. 8 illustrates a block diagram for collecting viewer inputs in accordance with one or more embodiments.

As discussed above, the digital video interaction system 106 collects viewer inputs that adjust a graphical element within video content. FIG. 8 illustrates a block diagram for collecting viewer inputs in accordance with one or more embodiments.

As shown in FIG. 8, the digital video interaction system 106 receives viewer inputs from viewer computing devices 802a-802n, which are participating in a digital stream of video content 804. In particular, the digital video interaction system 106 receives the viewer inputs via interactions of the viewer computing devices 802a-802n with the video content 804. For example, in one or more embodiments, the viewer inputs include interactions with at least one of the graphical elements 808a-808c. In other words, in some implementations, the digital video interaction system 106 receives, from each of the viewer computing devices 802a-802n, a viewer input that includes an interaction with at least one of the graphical elements 808a-808c.

As indicated above, in some cases, the viewer inputs include adjustments to at least one of the graphical elements 808a-808c. For example, viewer inputs can reposition one or more of the graphical elements 808a-808c within the video content 804, change the size of one or more of the graphical elements 808a-808c, etc.

As shown in FIG. 8, however, in some cases, the viewer inputs include adjustments to at least one of the graphical elements 808a-808c in accordance with the visual attributes 806. For example, in one or more embodiments, the digital video interaction system 106 specifies the visual attributes 806 based on user input received via a stream-transmitting computing device. Thus, in some instances, the digital video interaction system 106 removes or relaxes the constraints on a visual attribute that was previously specified as adjustable so that the viewer inputs can adjust at least one or more of the graphical elements 808a-808c by modifying the visual attribute. Further, the digital video interaction system 106 prevents the viewer inputs from modifying visual attributes that were not previously specified as adjustable.

As discussed above, in one or more embodiments, the digital video interaction system 106 determines constraints related to how visual attributes can be adjusted. Accordingly, the digital video interaction system 106 can collect viewer inputs in accordance with those restraints. FIGS. 9A-9C illustrate composite graphics corresponding to constraints placed on the adjustment of exemplary visual attributes in accordance with one or more embodiments. Similar principals can be applied to visual attributes not shown in these figures. Though the below figures illustrate composite graphics individually, the digital video interaction system 106 provides those composite graphics illustrated below within a graphical user interface displayed on a viewer computing device in some implementations. In particular, in some cases, the digital video interaction system 106 provides the composite graphics illustrated below within a graphical user interface displaying, on a viewer computing device, the portion of video content for which viewer inputs are being collected.

For example, FIG. 9A illustrates composite graphics 902a-902b corresponding to graphical elements 904a-904b, respectively. In particular, the composite graphics 902a-902b correspond to a constraint on adjusting the size of the graphical elements 904a-904b, respectively.

For example, the composite graphic 902a corresponds to a constraint on adjusting the size of the graphical element 904a based on the digital video interaction system 106 specifying a continuous range of possible sizes that can be provided to the graphical element 904a via viewer input. Accordingly, in some implementations, the digital video interaction system 106 provides the composite graphic 902a for display within a graphical user interface displayed on a viewer computing device upon determining that the viewer computing device is attempting to adjust the size of a graphical element for which a continuous range of possible sizes has been specified.

As shown in FIG. 9A, the composite graphic 902a includes a minimum size indicator 906 and a maximum size indicator 908 to indicate the minimum and maximum sizes allowed for the graphical element 904a, respectively. In other words, the digital video interaction system 106 indicates, to the viewer computing device, that the size of the graphical element 904a is adjustable anywhere within the range of sizes bounded by the minimum size indicator 906 and the maximum size indicator 908. As shown, the digital video interaction system 106 further provides, for reference, the size box 910 to indicate the current size of the graphical element 904a based on input provided via the cursor 912.

The composite graphic 902b corresponds to a constraint on adjusting the size of the graphical element 904b based on the digital video interaction system 106 specifying a discrete range of possible sizes that can be provided to the graphical element 904b via viewer input. Accordingly, in some implementations, the digital video interaction system 106 provides the composite graphic 902b for display within a graphical user interface displayed on a viewer computing device upon determining that the viewer computing device is attempting to adjust the size of a graphical element for which a discrete range of possible sizes has been specified.

As shown in FIG. 9A, the composite graphic 902b includes a minimum size indicator 914, an intermediate size indicator 916, and a maximum size indicator 918 to indicate the minimum potential sizes that can be assigned to the graphical element 904b. In other words, the digital video interaction system 106 indicates, to the viewer computing device, that the size of the graphical element 904b is adjustable to a size defined by one of the minimum size indicator 914, the intermediate size indicator 916, or the maximum size indicator 918.

FIG. 9B illustrates composite graphics 930a-930b corresponding to graphical elements 932a-932b, respectively. In particular, the composite graphics 930a-930b correspond to a constraint on adjusting the rotation of the graphical elements 932a-932b, respectively.

For example, the composite graphic 930a corresponds to a constraint on adjusting the size of the graphical element 932a based on the digital video interaction system 106 specifying a continuous range of possible degrees of rotation that can be provided to the graphical element 932a via viewer input. Accordingly, in some implementations, the digital video interaction system 106 provides the composite graphic 930a for display within a graphical user interface displayed on a viewer computing device upon determining that the viewer computing device is attempting to adjust the rotation of a graphical element for which a continuous range of possible rotations has been specified.

As shown in FIG. 9B, the composite graphic 930a includes a range 934 of possible rotation values. In other words, the digital video interaction system 106 indicates, to the viewer computing device, that the rotation of the graphical element 932a is adjustable anywhere within the range 934. As shown, the digital video interaction system 106 further provides, for reference, the current range indicator 936 to indicate the current rotation of the graphical element 930a based on input provided via the cursor 938.

The composite graphic 930b corresponds to a constraint on adjusting the rotation of the graphical element 932b based on the digital video interaction system 106 specifying a discrete range of possible rotation values that can be provided to the graphical element 932b via viewer input. Accordingly, in some implementations, the digital video interaction system 106 provides the composite graphic 930b for display within a graphical user interface displayed on a viewer computing device upon determining that the viewer computing device is attempting to adjust the size of a graphical element for which a discrete range of possible rotation values has been specified.

As shown in FIG. 9B, the composite graphic 930b includes rotation value indicators 940a-940e. In other words, the digital video interaction system 106 indicates, to the viewer computing device, that the rotation of the graphical element 932b is adjustable to include a rotation value defined by one of the rotation value indicators 940a-940e.

FIG. 9C illustrates color constraint areas 950a-950b corresponding to graphical elements (not show). In particular, the color constraint areas 950a-950b each correspond to a constraint on adjusting the color of a graphical element.

For example, the color constraint area 950a corresponds to a constraint on adjusting the color of a graphical element based on the digital video interaction system 106 specifying a relatively small range of available colors. To illustrate, in some cases, the digital video interaction system 106 determines that a small number of colors is available for the graphical element. In some cases, the digital video interaction system 106 changes the color of the graphical element based on a user selection within the color palette area 952a. Further, in some cases, the digital video interaction system 106 changes the shade of the selected color based on a user selection within the shade area 954a.

In some cases, the color constraint area 950b corresponds to a constraint on adjusting the color of a graphical element based on the digital video interaction system 106 specifying a comparatively larger range of available colors. As indicated above, in some cases, the digital video interaction system 106 changes the color of the graphical element or the hue of the selected color based on a user selection within color palette area 952b or the shade area 954b, respectively.

As indicated above, though FIGS. 9A-9C indicate the implementation of constraints when adjusting particular visual attributes, the digital video interaction system 106 operates similarly when implementing constraints with regard to other visual attributes. Additionally, in some implementations, the digital video interaction system 106 implements constraints with regard to the number of graphical elements allowed to be added via viewer input and/or the types of graphical elements allowed to be added via user input. As with the visual attributes, the digital video interaction system 106 bases constraints with regard to the number and/or type of graphical elements added via viewer input based on selections provided by a stream-transmitting computing device.

Figure 10B:
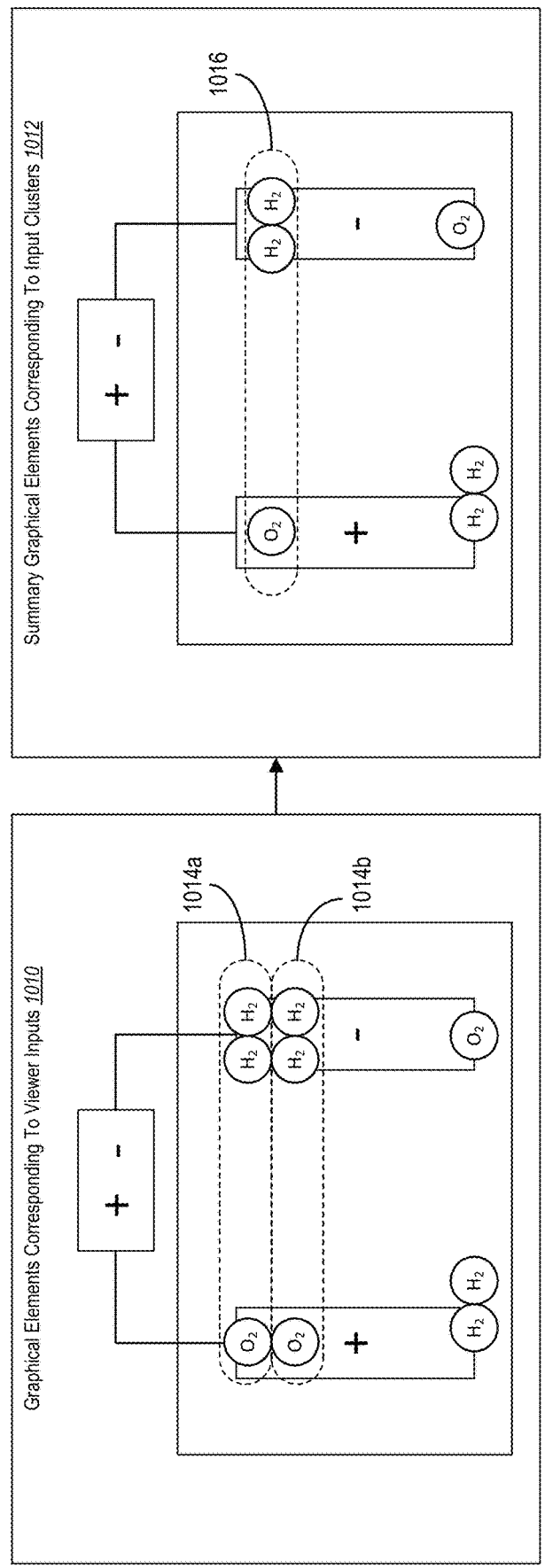

As indicated above, in one or more embodiments, the digital video interaction system 106 aggregates collected viewer inputs. In particular, the digital video interaction system 106 aggregates the viewer inputs into input clusters. FIGS. 10A-10B illustrate diagrams for aggregating viewer inputs into input clusters in accordance with one or more embodiments.

In particular, FIG. 10A illustrates an overview diagram for aggregating viewer inputs into input clusters in accordance with one or more embodiments. As shown in FIG. 10A, the digital video interaction system 106 aggregates the data points representing viewer inputs 1002 into the input clusters 1004.

In one or more embodiments, an input cluster includes a set of viewer inputs. In particular, in some embodiments, an input cluster includes a set of one or more viewer inputs that share at least one characteristic or attribute. To illustrate, in some implementations, an input cluster includes a set of one or more viewer inputs that have at least one common visual attribute (as will be discussed below).

In one or embodiments, the digital video interaction system 106 aggregates the viewer inputs (e.g., aggregates the data points representing viewer inputs 1002) into the input clusters 1004 using a clustering algorithm. For example, in some instances, the digital video interaction system 106 utilizes a k-nearest neighbor clustering algorithm, a k-means clustering algorithm, or a hierarchical clustering algorithm. As an example of the latter, in one or more embodiments, the digital video interaction system 106 utilizes a hierarchical clustering algorithm described in Stephen C. Johnson, *Hierarchical Clustering Schemes*, Psychometrika, Vol. 32, Issue No. 3 (1967), pp. 241-254, which is incorporated herein by reference in its entirety.

As mentioned above, in some embodiments, the digital video interaction system 106 utilizes text boxes for adjustment by viewer inputs. In other words, a graphical element includes a text box and viewer inputs can adjust a visual attribute of the text box by modifying the text within the text box. Accordingly, in some implementations, the digital video interaction system 106 aggregates collected viewer inputs based on the text provided by the viewer inputs. In some instances, the digital video interaction system 106 aggregates viewer inputs based on provided text using a term frequency-inverse document frequency (tf-idf) algorithm. In some implementations, the digital video interaction system 106 utilizes a support vector machine (SVM) text categorization algorithm.

In one or more embodiments, the digital video interaction system 106 applies the clustering algorithm to a set of feature vectors corresponding to the data points representing viewer inputs 1002. In one or more embodiments, a feature vector corresponds to a vector that includes one or more values representative of an object, such as a graphical element. In particular, in some embodiments, a feature vector includes a vector that includes one or more values representing attributes or characteristics of an object. For example, in some cases, a feature vector includes a vector having one or more values that represent visual attributes of a graphical element.

In at least one implementation, the digital video interaction system 106 generates a feature vector corresponding to a viewer input by combining one hot vectors representing a graphical element resulting from the viewer input. For example, in some cases, the digital video interaction system 106 generates a one hot vector for each visual attribute of the graphical element. Further, the digital video interaction system 106 combines (e.g., concatenates) each one hot vector to generate the feature vector for the viewer input. In some implementations, where a text box is involved, the digital video interaction system 106 scores the text included in the text box (e.g., using tf-idf) and appends the resulting scores to the feature vector. In one or more embodiments, the digital video interaction system 106 applies the clustering algorithm to the resulting feature vectors.

As further shown in FIG. 10A, the digital video interaction system 106 further aggregates the data points representing viewer inputs 1002 into the input clusters 1004 based on a visual attribute(s) 1006. In particular, in some instances, the digital video interaction system 106 aggregates the data points representing viewer inputs 1002 based on one or more specified visual attributes (e.g., rather than all possibly applicable visual attributes). In one or more embodiments, the digital video interaction system 106 determines the one or more visual attributes based on user input received from a stream-transmitting computing device. In some implementations, the digital video interaction system 106 specifies, for aggregating the data points representing viewer inputs 1002, the visual attributes identified as adjustable via the viewer inputs. In some cases, the digital video interaction system 106 specifies a subset of those visual attributes identified as adjustable via the viewer inputs.

Thus, in one or more embodiments, the digital video interaction system 106 aggregates the data points representing viewer inputs 1002 so that each of the input clusters 1004 includes viewer inputs that adjusted visual attributes of the corresponding graphical elements in similar ways. In some implementations, the digital video interaction system 106 aggregates the data points representing viewer inputs 1002 based on the visual attribute(s) 1006 by generating feature vectors for the data points representing viewer inputs 1002 based only on the visual attribute(s) 1006. For example, in at least one instance, the digital video interaction system 106 only generates one hot vectors for the visual attribute(s) 1006 and combines the one hot vectors to generate the corresponding feature vectors.

Further, in some embodiments, the digital video interaction system 106 determines a number of input clusters to obtain and aggregates the data points representing viewer inputs 1002 to obtain that number of input clusters. For example, in some cases, the digital video interaction system 106 determines the number of input clusters based on user input received from a stream-transmitting computing device. Thus, the digital video interaction system 106 provides additional control to the stream-transmitting computing device over how the data points representing viewer inputs 1002 are aggregated in some cases.

In some implementations, the digital video interaction system 106 further changes the number of input clusters and re-aggregates the viewer inputs to obtain the new number of input clusters. To illustrate, in some implementations, the digital video interaction system 106 receives user input from the stream-transmitting computing device that changes the number of input clusters. In some cases, the digital video interaction system 106 receives, from the stream-transmitting computing device, user input changing the number of input clusters on the fly, such as while the stream-transmitting computing device is displaying an input summary visualization representing the viewer inputs. Accordingly, the digital video interaction system 106 generates a new input summary visualization reflecting the changed number of input clusters. Thus, the digital video interaction system 106 facilitates the aggregation and viewing of viewer inputs at different levels of abstraction.

FIG. 10B illustrates another diagram for aggregating viewer inputs into input clusters in accordance with one or more embodiments. As shown in FIG. 10B, the digital video interaction system 106 aggregates the viewer inputs into input clusters. In particular, FIG. 10B illustrates graphical elements corresponding to viewer inputs 1010. FIG. 10B further illustrates summary graphical elements corresponding to input clusters 1012 that are generated by the digital video interaction system 106 based on the viewer inputs.

As shown in FIG. 10B, the digital video interaction system 106 aggregates the viewer inputs represented by the graphical element groups 1014*a*-1014*b* into and input cluster represented by the summary graphical element group 1016. As discussed above, in some implementations, the digital video interaction system 106 aggregates the viewer inputs represented by the graphical element groups 1014*a*-1014*b* based on one or more visual attributes. Accordingly, in some implementations, the digital video interaction system 106 determines visual attributes for the resulting input cluster (e.g., the input cluster represented by the summary graphical element group 1016) that are representative of the visual attribute(s) reflected in the viewer inputs.

To illustrate, where aggregating the viewer inputs represented by the graphical element groups 1014*a*-1014*b* based on the positioning of the graphical elements, the digital video interaction system 106 associates the resulting input cluster (e.g., input cluster represented by the summary graphical element group 1016) with a positioning that is most representative of the positioning associated with the viewer inputs. In some cases, where the viewer inputs represented by the graphical element groups 1014*a*-1014*b* provide the same positioning for the graphical elements, the digital video interaction system 106 associates that resulting input cluster with that positioning. In other cases, where the viewer inputs represented by the graphical element groups 1014*a*-1014*b* provide different positionings, the digital video interaction system 106 associates the resulting input cluster with an average positioning, a median positioning, or some other positioning that reflects the positionings associated with the viewer inputs.

Figure 11:
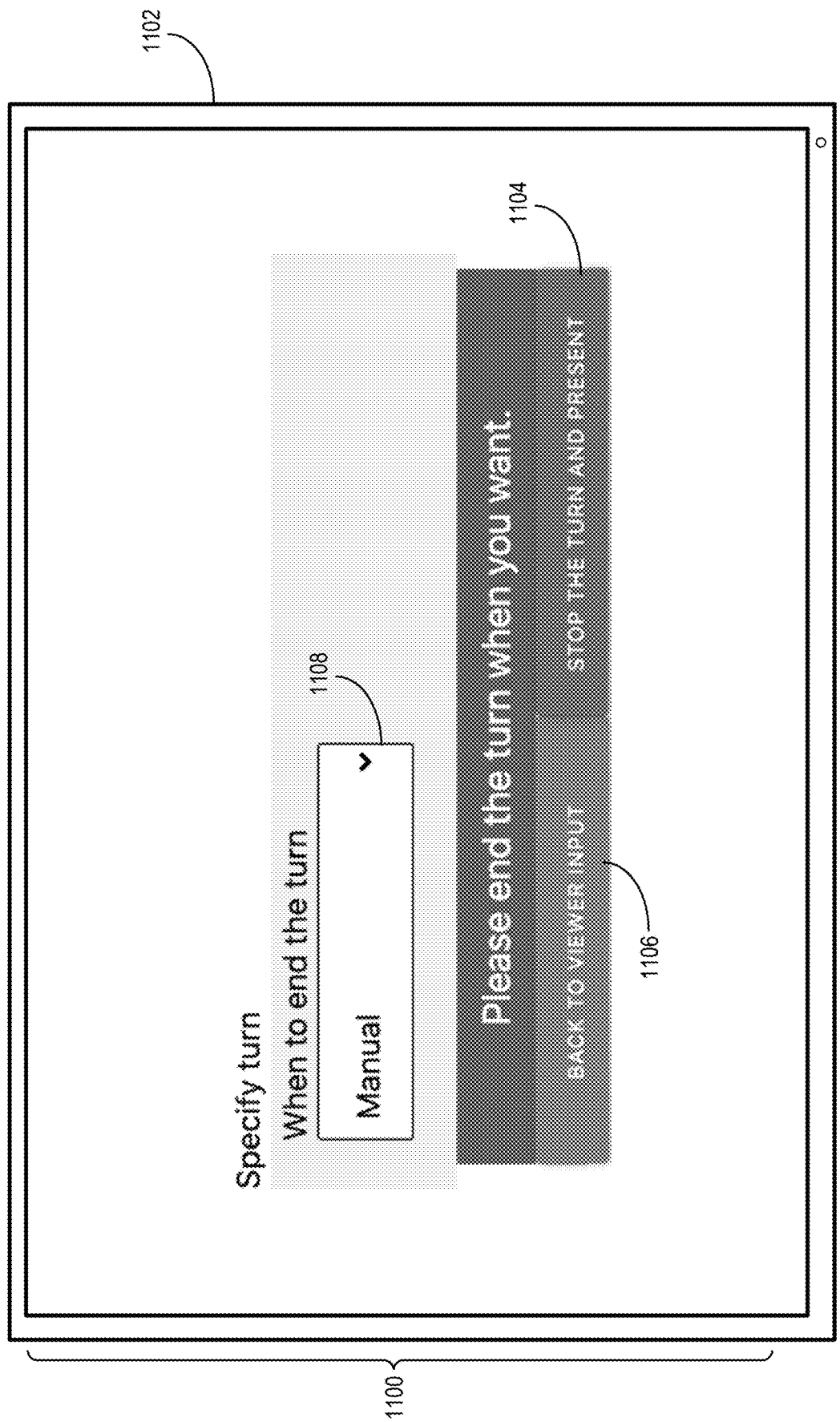
FIG. 11 illustrates a graphical user interface used by the digital video interaction system for initiating a prompt to generate and/or provide an input summary visualization in accordance with one or more embodiments.

As mentioned above, in one or more embodiments, the digital video interaction system 106 generates an input summary visualization. In some embodiments, the digital video interaction system 106 provides the input summary visualization for display on the stream-transmitting computing device and/or the viewer computing devices. In some instances, the digital video interaction system 106 generates (and provides, for display) the input summary visualization in response to a prompt. FIG. 11 illustrates a graphical user interface 1100 used by the digital video interaction system 106 for initiating a prompt to generate and/or provide an input summary visualization in accordance with one or more embodiments. In particular, the digital video interaction system 106 provides the graphical user interface 1100 for display on the stream-transmitting computing device 1102.

As shown in FIG. 11, the digital video interaction system 106 provides, for display within the graphical user interface 1100, a summary prompt button 1104. In some implementations, the digital video interaction system 106 ends the collection of viewer input (e.g., disabling viewer input) and/or generates an input summary visualization in response to a user selection of the summary prompt button 1104. Further, the digital video interaction system 106 provides, for display, a selectable option 1106 for re-initiating the collection of viewer inputs (e.g., after the collection has already ended).

Additionally, as shown in FIG. 11, the digital video interaction system 106 provides a drop-down menu 1108 for specifying when provision of the input summary visualization ends. For example, in some implementations, the digital video interaction system 106 determines, based on a user selection via the drop-down menu 1108, that the provision of the input summary visualization ends when the stream-transmitting computing devices provides a particular indication that it should end or after a specified time-limit.

As discussed above with reference to FIG. 7, in some implementations, rather than utilizing a separate graphical user interface, the digital video interaction system 106 provides the contents of the graphical user interface 1100 in FIG. 11 within a window displayed within a more comprehensive graphical user interface.

Figure 12A:
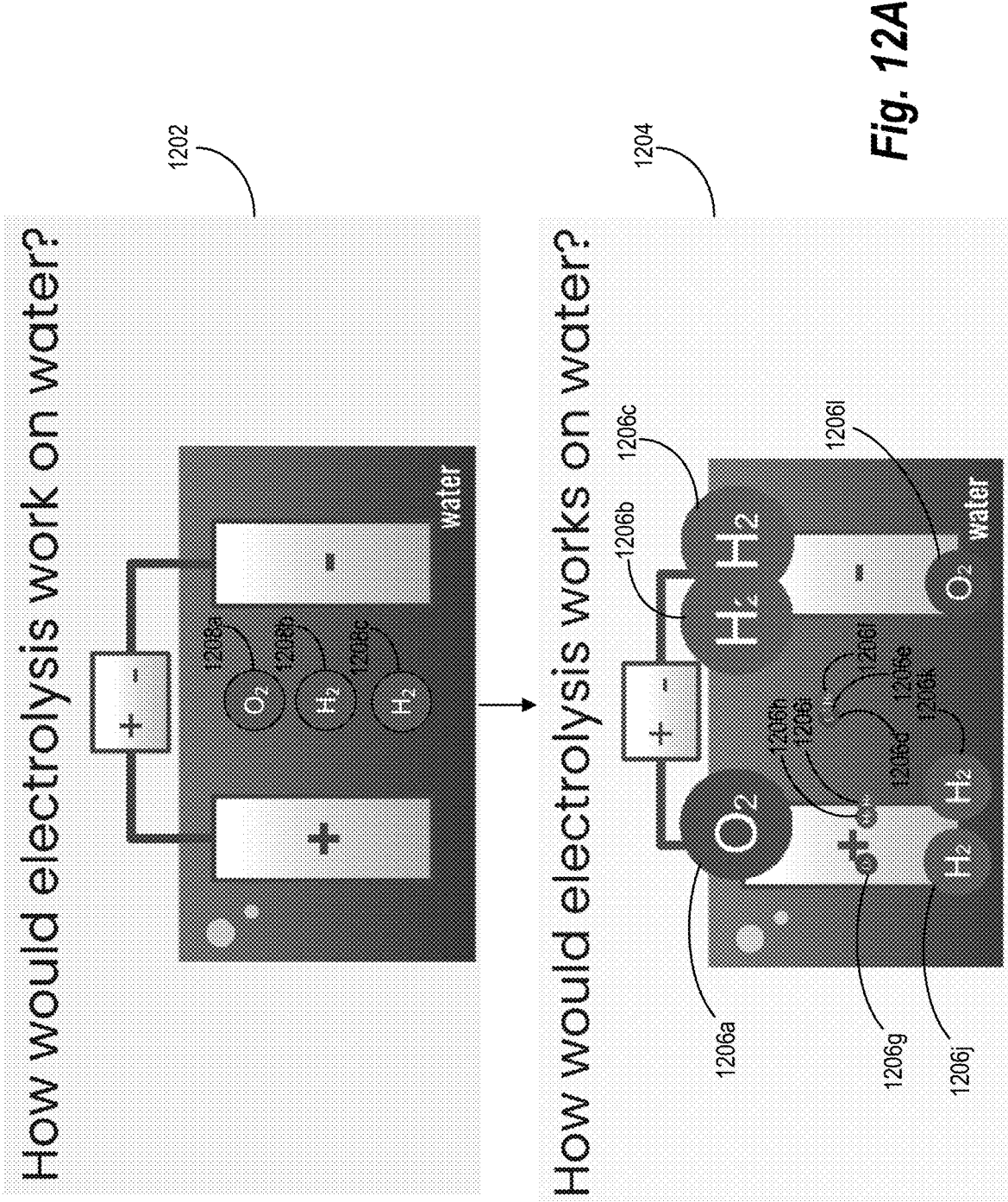
FIGS. 12A-12B illustrate video content and exemplary input summary visualizations that correspond to video content in accordance with one or more embodiments.
Figure 12B:
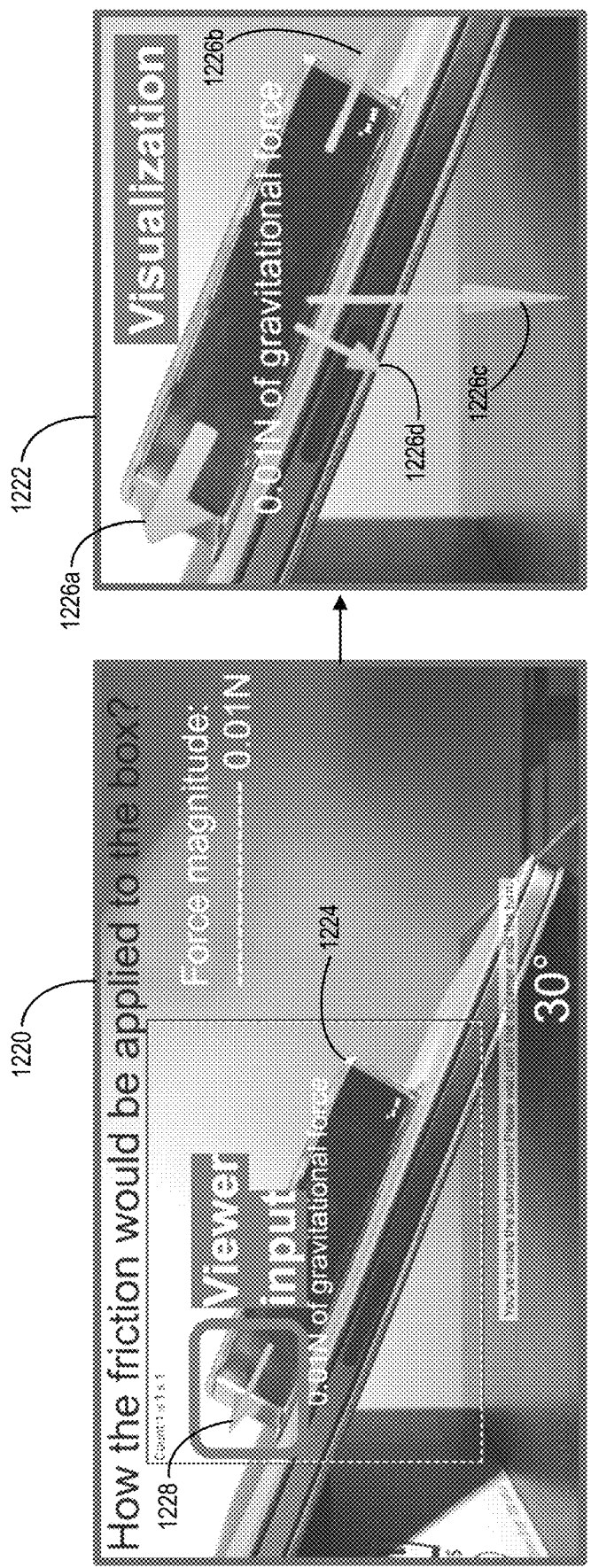
Figure 13A:
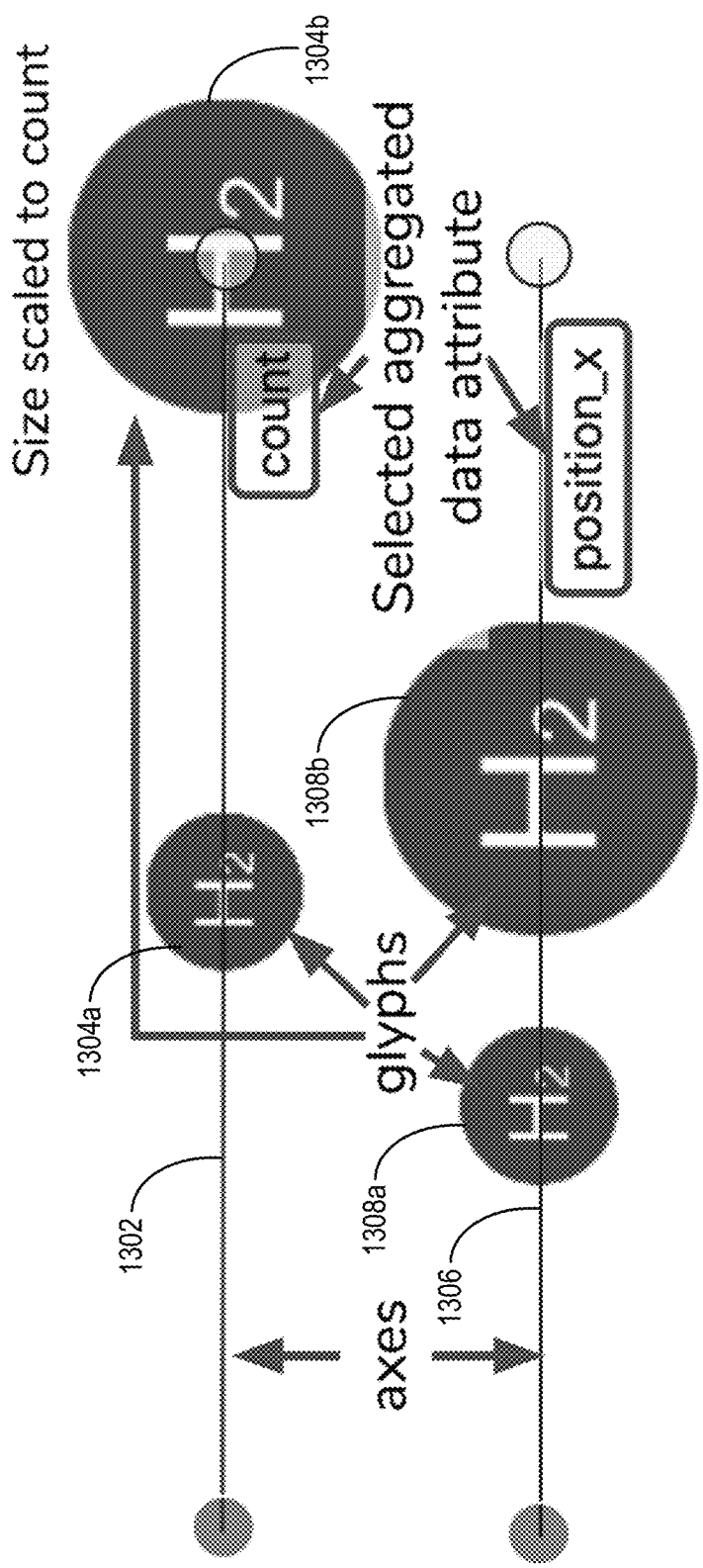
FIGS. 13A-13C illustrate utilizing one or more axes to generate input summary visualizations in accordance with one or more embodiments.
Figure 13B:
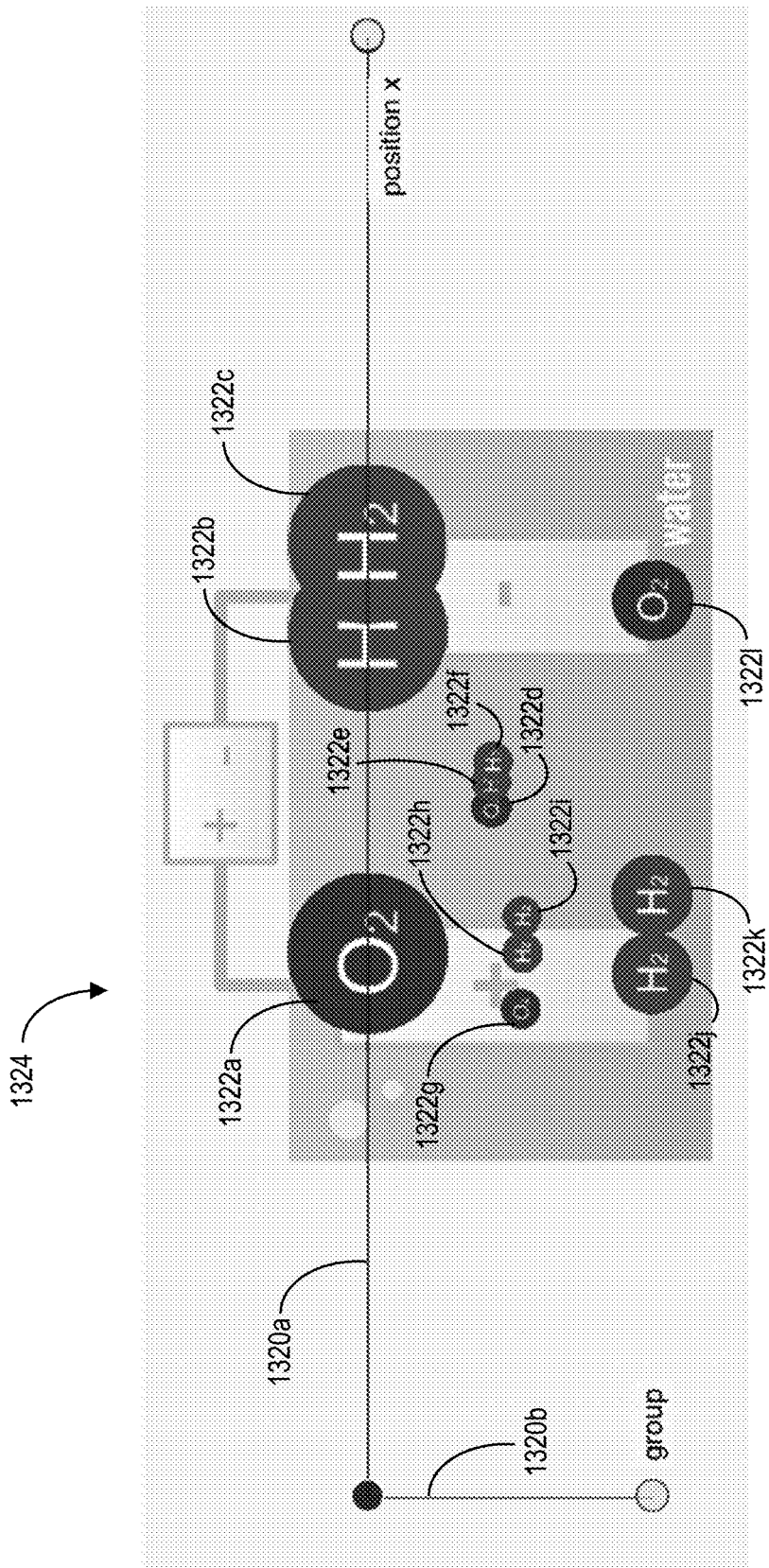
Figure 13C:
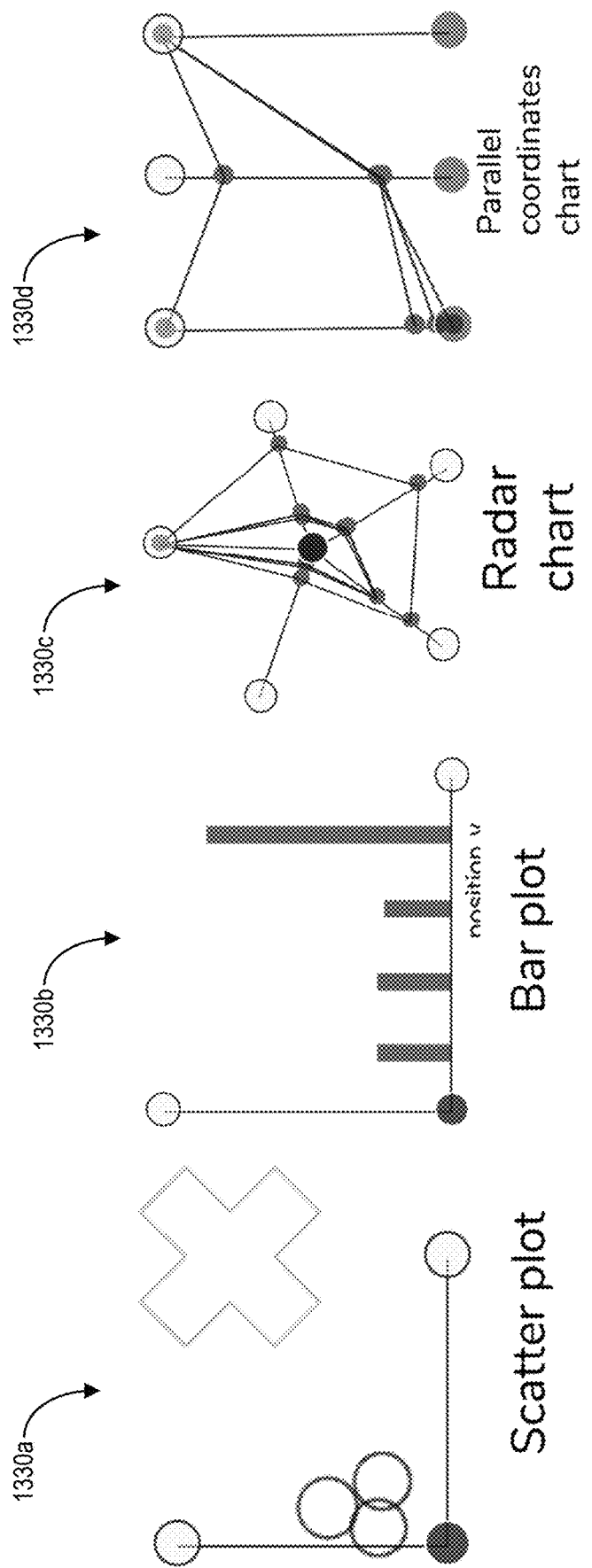

As previously discussed, the digital video interaction system 106 generates input summary visualizations based on aggregated viewer inputs (e.g., based on the resulting input clusters). FIGS. 12A-13C illustrate video content and diagrams for generating input summary visualizations in accordance with one or more embodiments. In particular, FIGS. 12A-12B illustrate video content and exemplary input summary visualizations that correspond to video content in accordance with one or more embodiments. FIGS. 13A-13C illustrate utilizing one or more axes to generate input summary visualizations in accordance with one or more embodiments.

For example, FIG. 12A illustrates an input summary visualization 1204 that corresponds to video content 1202. In particular, the video content 1202 includes a textual sentence prompting viewer computing devices to determine the positioning of molecules in response to a chemical process. In one or more embodiments, the digital video interaction system 106 removes or relaxes constraints on position of graphical elements representing the chemical molecules so the viewer computing devices can reposition the graphical elements within the video content 1202.

As shown in FIG. 12A, the input summary visualization 1204 includes summary graphical elements 1206a-1206l. In particular, as shown, the summary graphical elements 1206a-1206l correspond to the graphical elements 1208a-1208c that are adjustable within the video content 1202. Further, in one or more embodiments, the summary graphical elements 1206a-1206l correspond to input clusters generated by aggregating collected viewer inputs that adjust the graphical elements 1208a-1208c within the video content 1202. For example, in some cases, the summary graphical elements 1206a-1206c correspond to a first input cluster, the summary graphical elements 1206d-1206f correspond to a second input cluster, the summary graphical elements 1206g-1206i correspond to a third input cluster, and the summary graphical elements 1206j-1206l correspond to a fourth input cluster.

In one or embodiments, the summary graphical elements 1206a-1206l further represent the visual attributes associated with each input cluster. In particular, the summary graphical elements 1206a-1206l represent the visual attributes determined for their respective input cluster based on visual attributes selected for use in aggregating the collected viewer inputs. For example, the positioning of the summary graphical elements 1206a-1206c reflect that the first input cluster includes viewer inputs that similarly positioned the graphical elements 1208a-1208c within the video content 1202 (e.g., positioned the graphical element 1208a on the left side of the video content 1202 and positioned the graphical elements 1208b-1208c on the right side of the video content). By contrast, the positioning of the summary graphical elements 1206i-1206l reflect that the fourth input cluster includes viewer inputs that positioned the graphical elements 1208a-1208c differently than those viewer inputs from the first input cluster (e.g., positioned the graphical element 1208a on the right side of the video content 1202 and positioned the graphical elements 1208b-1208c on the left side of the video content).

As further shown in FIG. 12A, the digital video interaction system 106 generates the summary graphical elements 1206a-1206l having different sizes within the input summary visualization 1204. In one or more embodiments, the digital video interaction system 106 generates the summary graphical elements 1206a-1206l to have a size corresponding to the number of viewer inputs represented by their respective input cluster. For example, in some implementations, the digital video interaction system 106 utilizes larger sizes to reflect input clusters having a large number of viewer inputs and smaller sizes to reflect input clusters having a small number of viewer inputs. To illustrate, in some cases, the digital video interaction system 106 generates the summary graphical elements 1206a-1206c to have a size reflecting that the first input cluster represents a large number of viewer inputs. By contrast, the digital video interaction system 106 generates the summary graphical elements 1206d-1206f to have a size reflecting that the second input cluster represents a comparatively small number of viewer inputs.

FIG. 12B similarly illustrates an input summary visualization 1222 that corresponds to video content 1220. In particular, the video content 1220 prompts viewer computing devices to determine the frictional force applied to an object 1224 that is inclined at an angle. In one or more embodiments, the digital video interaction system 106 removes and/or relaxes the constraints on the position, rotation, and size of a graphical element representing the frictional force applied to the object 1224 so that the viewer computing devices can reposition, rotate, and/or resize the length of the graphical element within the video content 1202.

Indeed, as shown in FIG. 12B, the input summary visualization 1222 includes summary graphical elements 1226a-1226d. In particular, as shown, the summary graphical elements 1226a-1226d correspond to the graphical element 1228 that is adjustable within the video content 1220. Further, in one or more embodiments, the summary graphical elements 1226a-1226d correspond to input clusters generated by aggregating collected viewer inputs that adjust the graphical element 1228 within the video content 1220. For example, in some cases, the summary graphical element 1226a corresponds to a first input cluster, the summary graphical element 1226b corresponds to a second input cluster, the summary graphical element 1226c corresponds to a third input cluster, and the summary graphical element 1226d corresponds to a fourth input cluster.

As discussed above with reference to FIG. 12A, the summary graphical elements 1226a-1226d further represent the visual attributes and the number of viewer inputs associated with each input cluster. In particular, in one or more embodiments, as the viewer inputs adjust the size of the graphical element 1228 in one dimension (e.g., the length), the digital video interaction system 106 utilizes another size dimension to reflect the number of viewer inputs represented by the input cluster. For example, as shown in FIG. 12B, the digital video interaction system 106 generates the summary graphical elements 1226a-1226d to have a width corresponding to the number of viewers represented by their respective input cluster.

As mentioned above, FIGS. 13A-13C illustrate diagrams of the digital video interaction system 106 utilizing one or more axes to generate an input summary visualization. In particular, in one or more embodiments, the digital video interaction system 106 utilizes one or more axes to organize summary graphic elements displayed within an input summary visualization.

In particular, FIG. 13A illustrates the digital video interaction system 106 utilizing a single axis for organizing summary graphical elements. For example, FIG. 13A illustrates the digital video interaction system 106 utilizing the axis 1302 for organizing the summary graphic elements 1304a-1304b within an input summary visualization. As shown in FIG. 13A, the digital video interaction system 106 positions the summary graphic elements 1304a-1304b on the axis 1302 based on a number of viewer inputs included in the input cluster represented by each of the summary graphic elements 1304a-1304b. Indeed, as shown, the digital video interaction system 106 configures the axis 1302 so that progressing across the axis 1302 from left to right reflects an increase in the number of viewer inputs associated with the input cluster represented by a summary graphic element positioned on the axis 1302. For example, FIG. 13A illustrates the summary graphical element 1304a representing an input cluster that includes a particular number of viewer inputs and further illustrates the summary graphic element 1304b representing an input cluster that includes a larger number of viewer inputs (as the summary graphic element 1304b is positioned farther to the left on the axis 1302). Thus, in one or more embodiments, the digital video interaction system 106 associates summary graphical elements with a size based on the number of viewer inputs represented by their corresponding input cluster and further arranges the summary graphical elements on an axis based on the number of viewer inputs represented.

FIG. 13A further illustrates the axis 1306 for organizing the summary graphic elements 1308a-1308b within an input summary visualization (e.g., a separate input summary visualization than that discussed above). As shown in FIG. 13A, the digital video interaction system 106 configures the axis 1306 so that a position of a summary graphical element on the axis 1306 reflects a horizontal position associated with the input cluster represented by that summary graphical element. For example, FIG. 13A illustrates the summary graphical element 1308a representing an input cluster associated with a particular horizontal position and further illustrates the summary graphical element 1308b representing an input cluster associated with a horizontal position that is farther to the right. In other words, the viewer inputs represented by the summary graphical element 1308a positioned a corresponding graphical element further to the left than the viewer inputs represented by the summary graphical element 1308b.

Though FIG. 13A illustrates utilizing an axis for arranging summary graphical elements based on a number of viewer inputs or horizontal position associated with the corresponding input clusters, the digital video interaction system 106 can arrange summary graphical elements based on various other factors. For example, in some cases, the digital video interaction system 106 arranges summary graphical elements based on size, color, rotation, vertical position, shape, applied animation, distance between a graphical element and another graphical element within video content, etc. Accordingly, in some implementations, the digital video interaction system 106 arranges summary graphical elements with respect to an axis by associating an aggregated data attribute with the axis (e.g., one of the aggregated data attributes discussed above with reference to FIG. 2A). In some cases, however, the digital video interaction system 106 arranges the summary graphical elements based on other factors, such as custom factors received by a stream-transmitting computing device.

FIG. 13B illustrates the digital video interaction system 106 utilizing multiple axes for organizing summary graphical elements. For example, FIG. 13B illustrates the digital video interaction system 106 utilizing the horizontal axis 1320a and the vertical axis 1320b for organizing the summary graphic elements 1322a-1322l within an input summary visualization 1324. As shown in FIG. 13B, the digital video interaction system 106 positions the summary graphical elements 1322a-1322l with respect to the horizontal axis 1320a based on the horizontal positions associated with the corresponding input cluster.

Further, the digital video interaction system 106 positions the summary graphical elements 1322a-1322l with respect to the vertical axis 1320b based on the similarity metric values associated with the corresponding input clusters. Indeed, as discussed above with reference to FIG. 2A, in one or more embodiments, the digital video interaction system 106 determines similarity metric values for the input clusters obtained from aggregating collected viewer inputs. Accordingly, in some implementations, the digital video interaction system 106 organizes summary graphical elements representing those input clusters based on their similarity metric values.

For example, in some instances, the digital video interaction system 106 places the summary graphical elements of one input cluster closer to the summary graphical elements of another input cluster where those two input clusters have similarity metric values that are close. By contrast, the digital video interaction system 106 places the summary graphical elements of one input cluster farther away from the summary graphical elements of another input cluster where those input clusters have similarity metric values that are comparatively different.

To illustrate, as shown in FIG. 13B, the digital video interaction system 106 places the summary graphical elements 1322g-1322i closer to the summary graphical elements 1322d-1322f than the summary graphical elements 1322j-1322l with respect to the vertical axis 1320b. Accordingly, the digital video interaction system 106 indicates that the input cluster corresponding to the summary graphical elements 1322g-1322i has a similarity metric value that is more similar to that of the input cluster corresponding to the summary graphical elements 1322d-1322f.

Accordingly, the digital video interaction system 106 can utilize multiple axes within an input summary visualization to provide information regarding multiple characteristics of the input clusters determined from the collected viewer inputs.

In some implementations, the digital video interaction system 106 utilizes multiple axes within an input summary visualization to display input summary visualizations having diverse displays, providing different analyses of collected viewer inputs. In particular, the digital video interaction system 106 arranges summary graphical elements within an input summary visualization based on different configurations of multiple axes. FIG. 13C illustrates different exemplary input summary visualizations using multiple axes in accordance with one or more embodiments. For example, as shown in FIG. 13C, in some embodiments, the digital video interaction system 106 generates an input summary visualization as a scatter plot 1330a. Further, in some cases, the digital video interaction system 106 generates an input summary visualization as a bar plot 1330b. In some instances, however, the digital video interaction system 106 generates an input summary visualization as a radar chart 1330c. Further, in some embodiments, the digital video interaction system 106 generates an input summary visualization as a parallel coordinates chart 1330d.

By representing all viewer inputs within a single, concise input summary visualization, the digital video interaction system 106 operates more flexibly than conventional content streaming systems. In particular, by representing all viewer inputs within an input summary visualization, the digital video interaction system 106 provides improved scalability when compared to conventional systems. Indeed, the digital video interaction system 106 can flexibly adapt to large numbers of viewer inputs and represents those viewer inputs within an input summary visualization without overwhelming the information channel as is often experienced by conventional content streaming systems that elect to display the raw viewer inputs individually.

Further, by representing all viewer inputs within a single input summary visualization, the digital video interaction system 106 operates more efficiently than conventional content streaming systems. In particular, the digital video interaction system 106 utilizes a graphical user interface that more efficiently displays viewer inputs. Accordingly, the digital video interaction system 106 reduces the number of steps required to view viewer inputs under conventional systems, which typically require various scrolling and/or clicking operations to view the raw data.

As just mentioned above, and as discussed above, in one or more embodiments, the digital video interaction system 106 operates more flexibly than conventional content streaming systems. In particular, the digital video interaction system 106 facilitates more flexible visual inputs and flexibly adapts viewer inputs to the needs of different video content. For example, as suggested above with reference to FIGS. 12A-12B, the digital video interaction system 106 can adapt viewer inputs to different subject matters presented via educational lectures, allowing the lecturer to evaluate the students' understanding of the presented material. As another example, as will be shown below, the digital video interaction system 106 can also solicit visual feedback from viewer computing devices as part of a collaborative creation process where a stream-transmitting computing devices utilizes the viewer inputs to generate content.

Researchers have conducted studies to determine the flexibility of one or more embodiments of the digital video interaction system 106. For the studies, the researchers recruited streamers that provided video content covering various topics. For each stream, the researchers further recruited viewers that were interested in the covered topic. The researchers worked with each streamer to incorporate use of an embodiment of the digital video interaction system 106 within their stream. In particular, the researchers helped the viewers to incorporate configurations that would be relevant to their streamed topic. FIGS. 14A-16B illustrate graphical representations reflecting qualitative testing results regarding the flexibility of the digital video interaction system 106 in accordance with one or more embodiments.

Figure 14A:
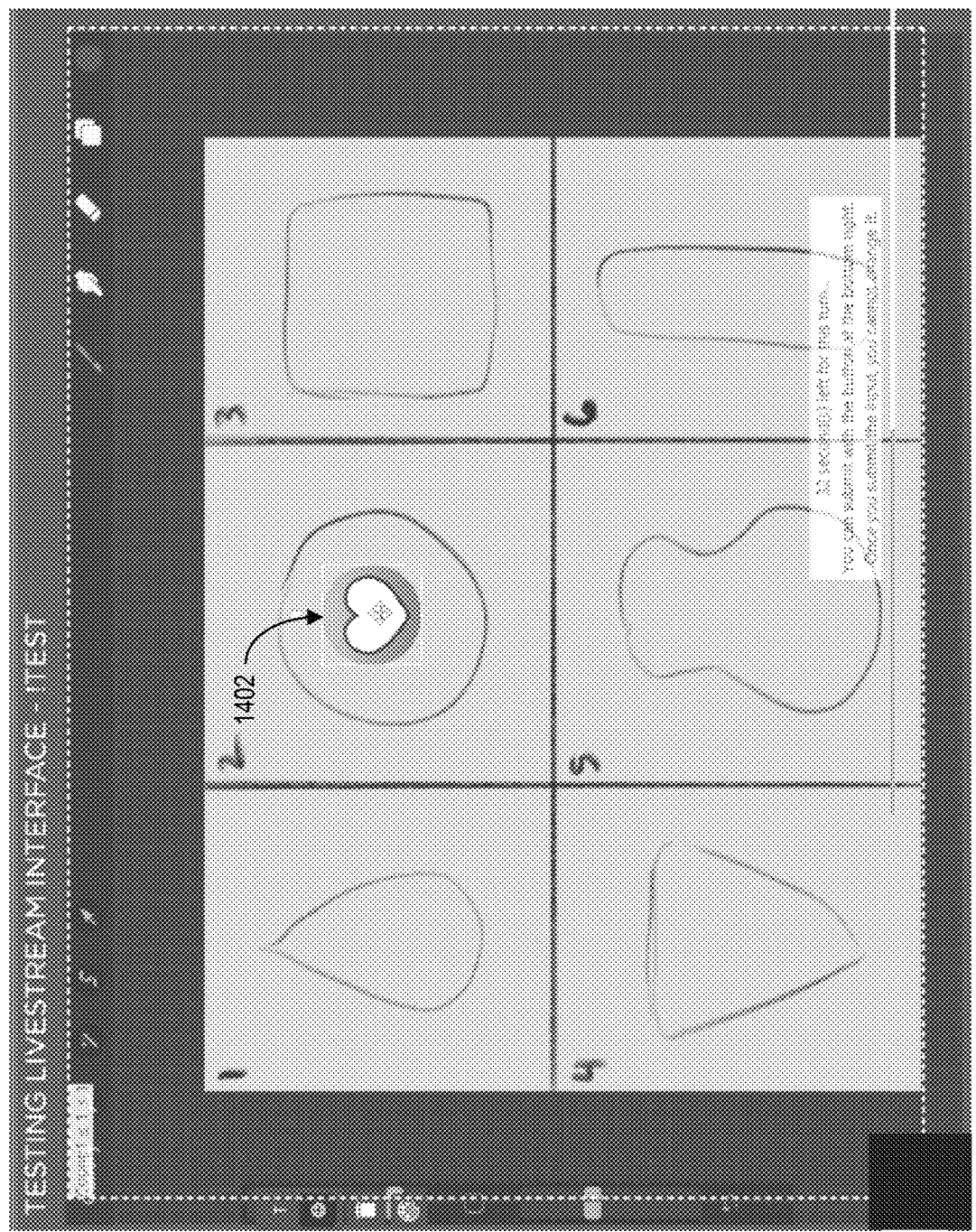
FIGS. 14A-14C illustrate graphical representations reflecting qualitative testing results regarding the flexibility of the digital video interaction system in accordance with one or more embodiments.
Figure 14B:
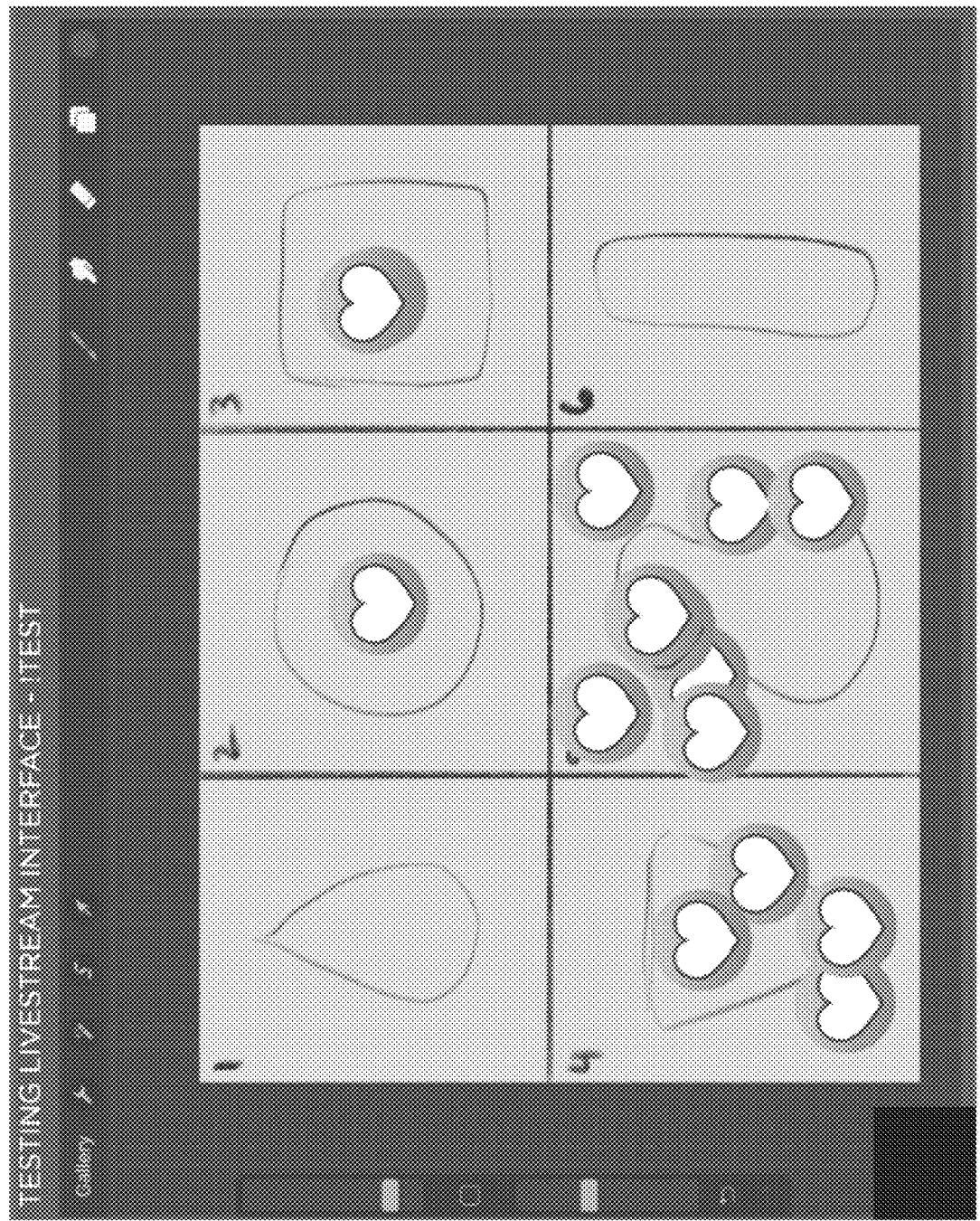
Figure 14C:
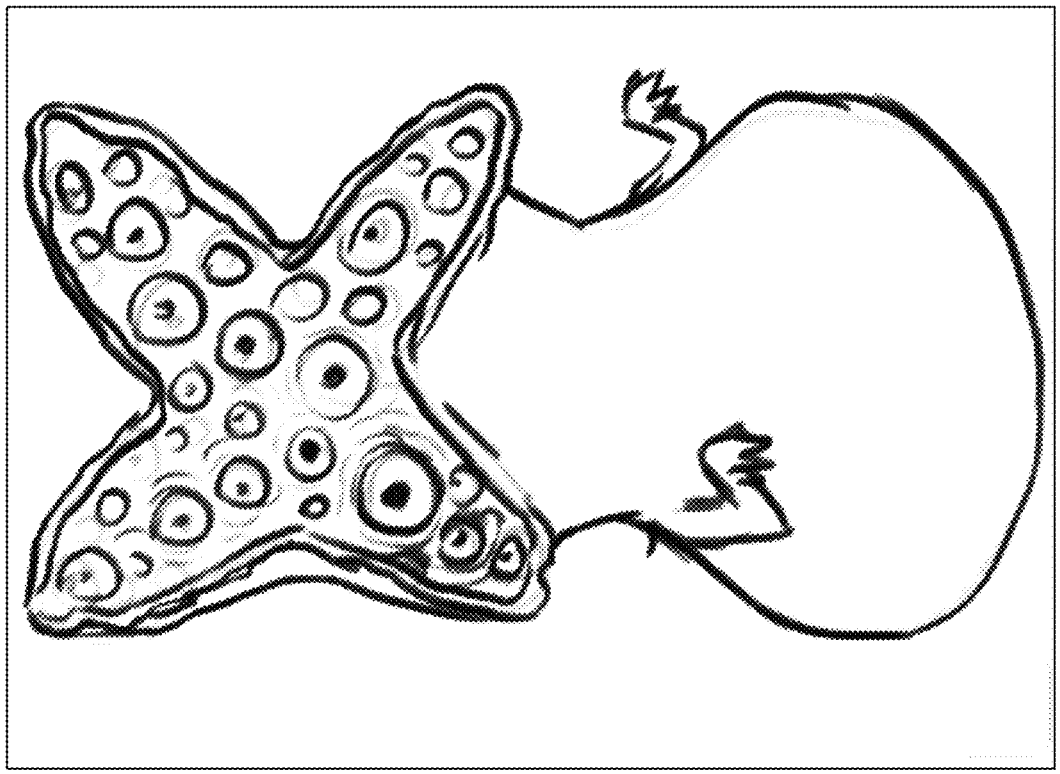

In particular, FIGS. 14A-14C illustrate diagrams related to a digital stream of video content where the digital video interaction system 106 requested the viewer computing devices to provide input regarding an image for the stream-transmitting computing device to draw. As shown in FIG. 14A, the digital video interaction system 106 provided a grid layout composed of different shapes within the video content displayed on the viewer computing devices. The digital video interaction system 106 relaxed the constraints on the position of a graphical element (e.g., the graphical element 1402) so that the viewer computing devices could position the graphical element 1402 on a shape to vote for that shape. FIG. 14B illustrates the shapes that obtained the most votes. Though FIG. 14B illustrates a raw vote count rather than an input summary visualization generated based on aggregating the votes, the digital video interaction system 106 can generate an input summary visualization that conveys the number of votes associated with each shape (e.g., via the size of the summary graphical elements). FIG. 14C illustrates the final image drawn by the stream-transmitting computing device based on the shapes selected via the viewer inputs.

Figure 15A:
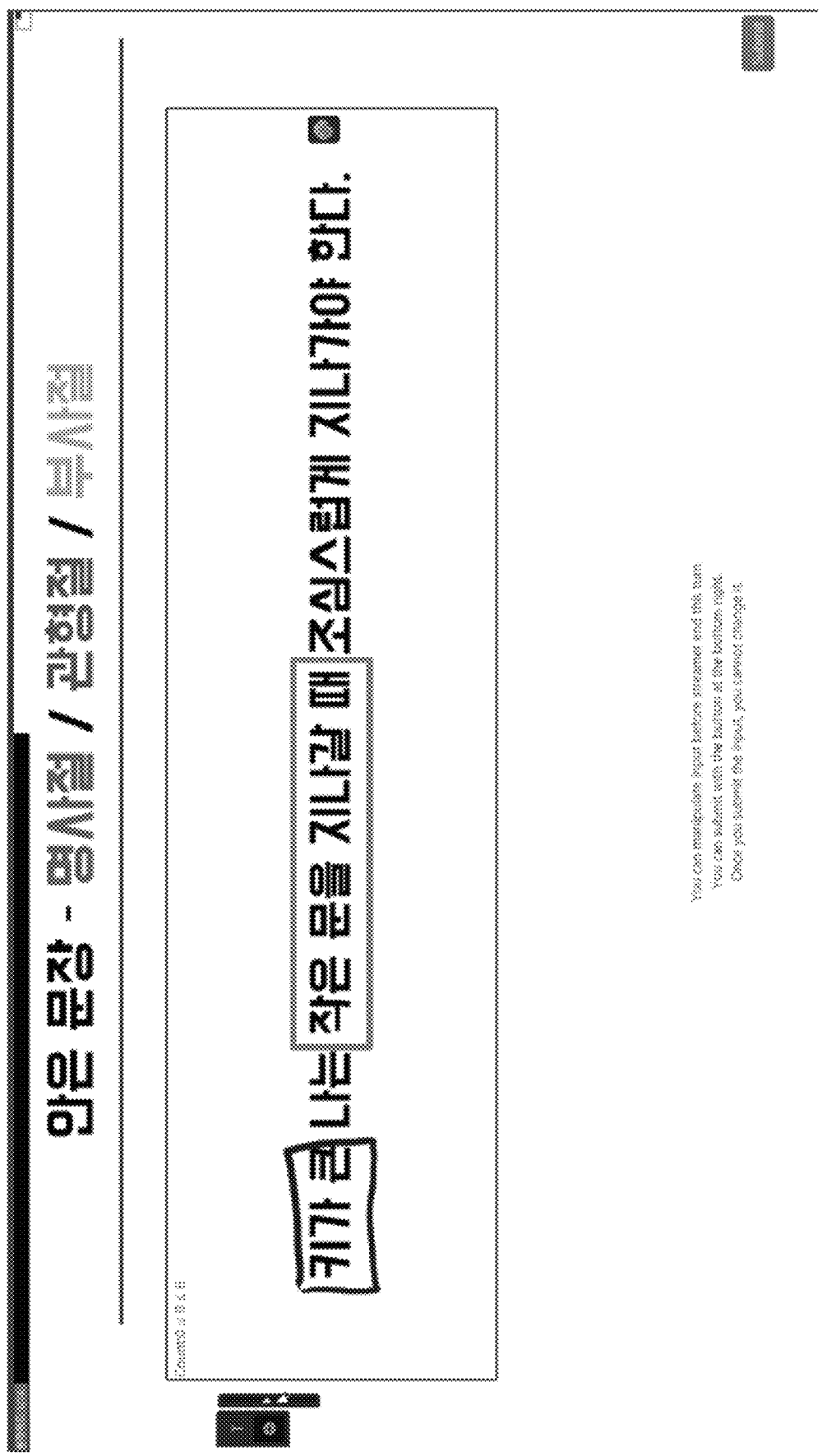
FIGS. 15A-15C illustrate additional graphical representations reflecting qualitative testing results regarding the flexibility of the digital video interaction system in accordance with one or more embodiments.
Figure 15B:
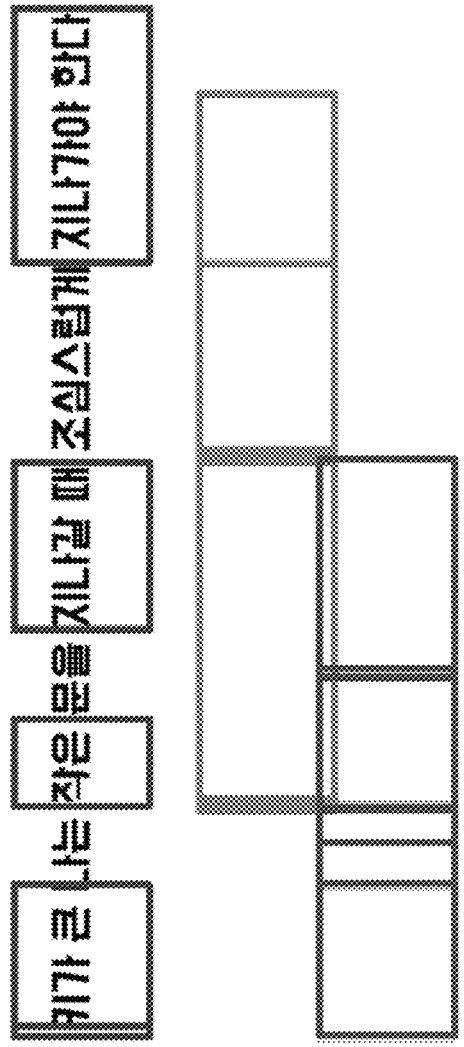
Figure 15C:
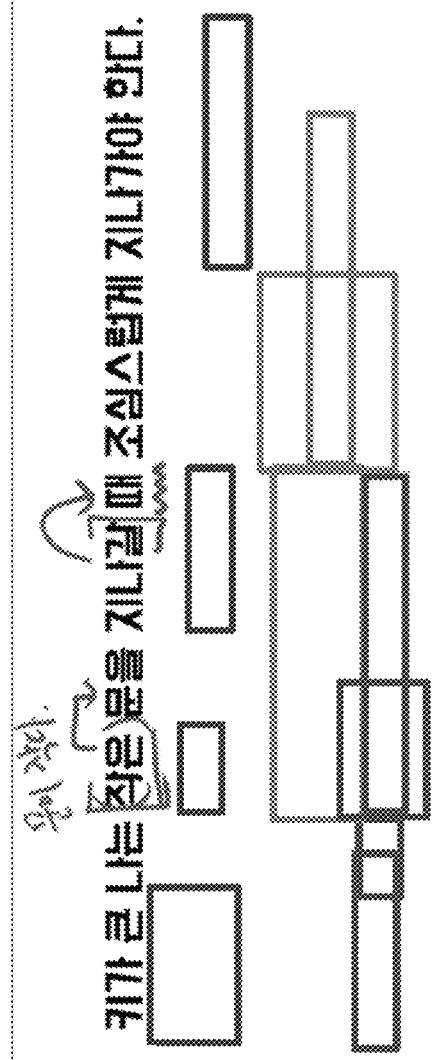

FIGS. 15A-15C illustrate diagrams related to a digital stream of video content where the digital video interaction system 106 requested the viewer computing devices to annotate grammatical concepts on a sentence. As shown in FIG. 15A, the digital video interaction system 106 provided the sentence within the video content displayed on the viewer computing devices. The digital video interaction system 106 enabled the viewer computing devices to annotate clauses of the sentence with boxes and associate the boxes with the clause's role in the sentence (content, adjective, or adverb)—for example, by adjusting the color of the box to indicate the grammatical role in the sentence. FIG. 15B illustrates the raw viewer inputs, with each row of boxes including viewer inputs for a particular role. FIG. 15C illustrates an input summary visualization generated based on aggregating the viewer inputs. In FIG. 15C, the height of each box corresponds to the number of viewer inputs represented by the corresponding input cluster.

Figure 16A:
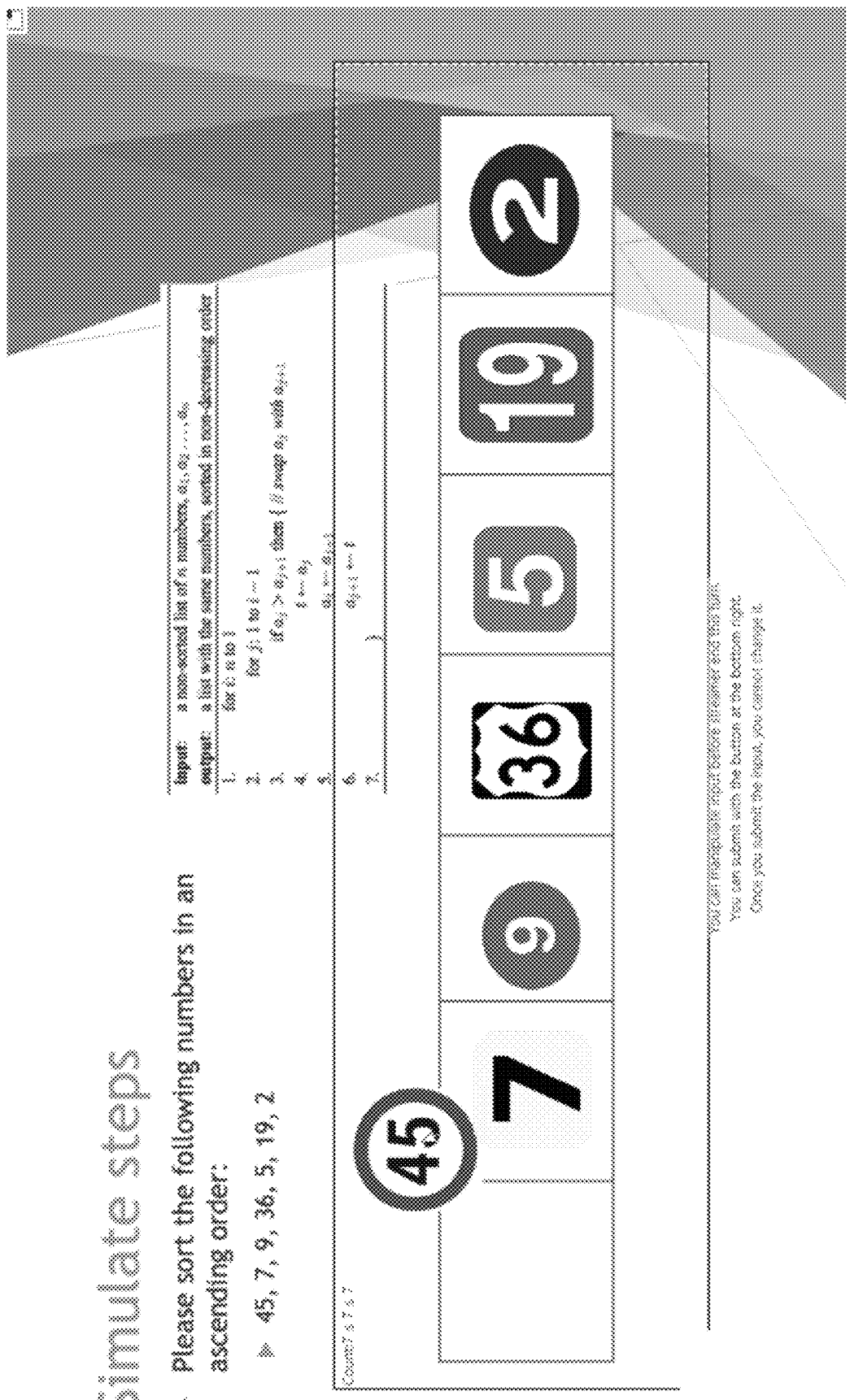
FIGS. 16A-16B illustrate additional graphical representations reflecting qualitative testing results regarding the flexibility of the digital video interaction system in accordance with one or more embodiments.
Figure 16B:
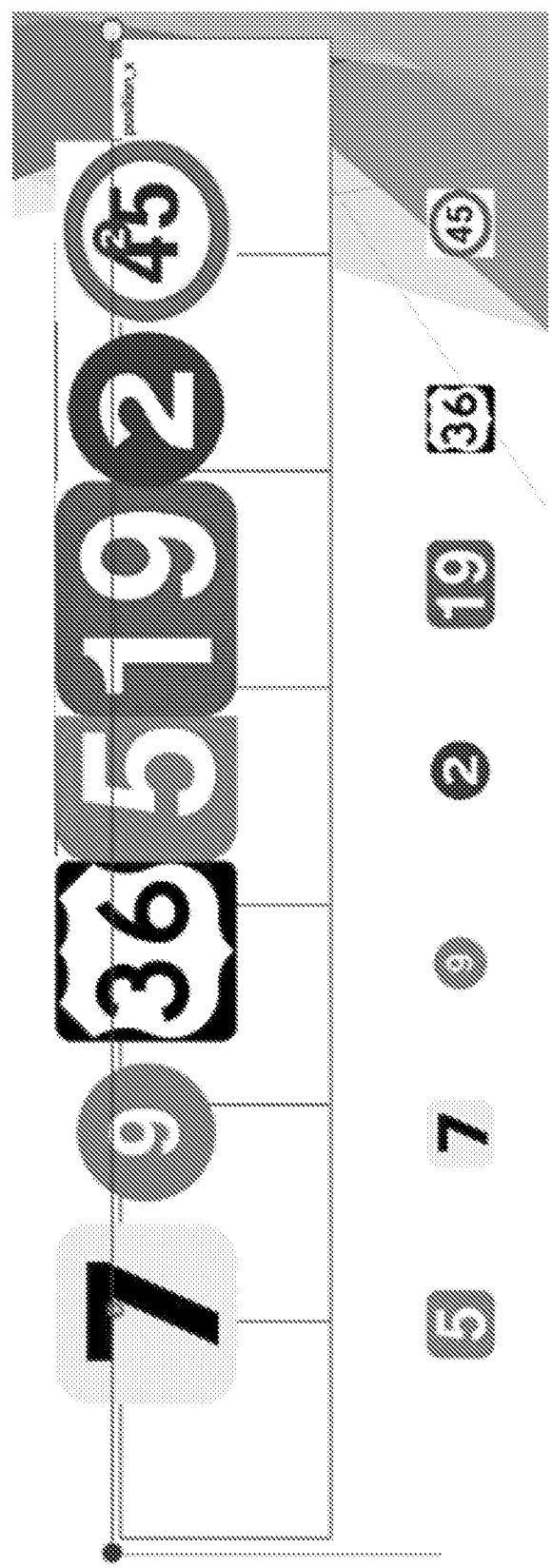

FIGS. 16A-16B illustrate diagrams related to a digital stream of video content where the digital video interaction system 106 requested the viewer computing devices to perform bubble sorting by positioning graphical elements with different numbers. In particular, the digital video interaction system 106 requested the viewer computing devices to perform the bubble sorting in order to simulate an iteration of a sorting algorithm. As shown in FIG. 16A, the digital video interaction system 106 provided several numbers within the video content displayed on the viewer computing devices.

FIG. 16B illustrates an input summary visualization generated based on aggregating the viewer inputs with each row of summary graphical elements corresponding to an input cluster. In particular, each row of summary graphical elements corresponds to an input cluster that represents the order in which the included viewer inputs sorted the graphical elements. For example, the top row represents an input cluster in which viewer inputs tended to sort the graphical elements in the order of 7, 9, 36, 5, 19, 2, and 45. By contrast, the bottom row represents an input cluster in which viewer inputs tended to sort the graphical elements in the order of 5, 7, 9, 2, 19, 36, and 45. In FIG. 16B, the size of the summary graphical elements represents the number of viewer inputs included in the corresponding input cluster.

Thus, as illustrated by FIGS. 14A-16B, as well as the preceding discussion and corresponding figures, the digital video interaction system 106 is flexible in that it facilitates a rich streaming environment in which various types of viewer inputs can be received. Accordingly, the digital video interaction system 106 flexibly adapts viewer inputs to the needs of different video content by offering different adjustments to graphical elements that are relevant to the video content.

Figure 17:
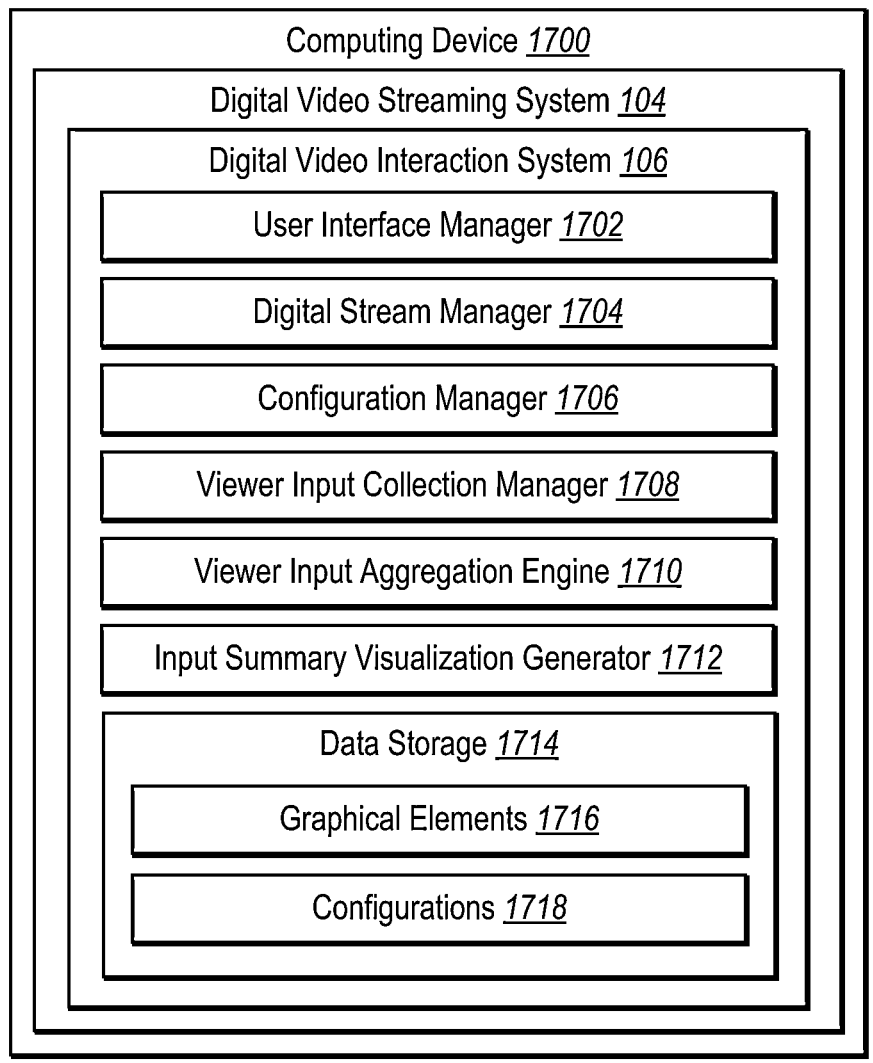
FIG. 17 illustrates an example schematic diagram of a digital video interaction system in accordance with one or more embodiments.

Turning now to FIG. 17, additional detail will be provided regarding various components and capabilities of the digital video interaction system 106. In particular, FIG. 17 illustrates the digital video interaction system 106 implemented by the computing device 1700 (e.g., the server(s) 102, the viewer computing devices 110a-110n, and/or the stream-transmitting computing device 114 as discussed above with reference to FIG. 1). Additionally, the digital video interaction system 106 is also part of the digital video streaming system 104. As shown, in one or more embodiments, the digital video interaction system 106 includes, but is not limited to, a user interface manager 1702, a digital stream manager 1704, a configuration manager 1706, a viewer input collection manager 1708, a viewer input aggregation engine 1710, an input summary visualization generator 1712, and data storage 1714 (which includes graphical elements 1716 and configurations 1718).

As just mentioned, and as illustrated in FIG. 17, the digital video interaction system 106 includes the user interface manager 1702. In one or more embodiments, the user interface manager 1702 provided graphical user interfaces and visual elements within graphical user interfaces displayed on a stream-transmitting computing device and/or viewer computing devices. For example, in some embodiments, the user interface manager 1702 provides, for display on a stream-transmitting computing device, one or more graphical user interfaces through which a stream-transmitting computing device can provide user input that identifies visual attributes that are adjustable via viewer inputs and/or summary visualization attributes for generating input summary visualizations. Further, in at least one implementation, the user interface manager 1702 provides, for display on a stream-transmitting computing device, graphical user interfaces through which the stream-transmitting computing device can initiate and/or end the collection of viewer inputs or through which the stream-transmitting computing device can select to view an input summary visualization.

As further shown in FIG. 17, the digital video interaction system 106 includes the digital stream manager 1704. In one or more embodiments, the digital stream manager 1704 receives or otherwise accesses a digital stream of video content from a stream-transmitting computing device. Further, the digital stream manager 1704 provides the digital stream of video content to a set of viewer computing devices.

Further, as shown in FIG. 17, the digital video interaction system 106 includes the configuration manager 1706. In one or more embodiments, the configuration manager 1706 generates configurations for collecting viewer inputs. For example, in some cases, the configuration manager 1706 receives, from a stream-transmitting computing device, user input that identifies visual attributes of a graphical element that are adjustable via viewer inputs. Additionally, in one or more embodiments, the configuration manager 1706 similarly generates configurations for generating input summary visualizations (e.g., by receiving user input identifying summary visualization attributes). In some instances, the configuration manager 1706 stores generated configurations for subsequent access. In some cases, however, the configuration manager 1706 provides for on-the-fly configuration.

As shown in FIG. 17, the digital video interaction system 106 also includes the viewer input collection manager 1708. In one or more embodiments, the viewer input collection manager 1708 collects, from viewer computing devices, viewer inputs that adjust a graphical element within video content provided by the digital stream manager 1704 via a digital stream. In some instances, the viewer input collection manager 1708 collects the viewer inputs in response to an input prompt, such as a user selection via the stream-transmitting computing device or upon determining that the digital stream has reached a pre-determined portion of the video content.

Additionally, as shown in FIG. 17, the digital video interaction system 106 includes the viewer input aggregation engine 1710. In one or more embodiments, the viewer input aggregation engine 1710 aggregates viewer inputs collected by the viewer input collection manager 1708 into a set of input clusters. In some embodiments, the viewer input aggregation engine 1710 aggregates the viewer inputs based on visual attributes selected by the stream-transmitting computing device, such as a subset of the visual attributes identified for adjustment by the viewer inputs. In some instances, the viewer input aggregation engine 1710 determines a number of input clusters to generate based on user input received from the stream-transmitting computing device.

As shown in FIG. 17, the digital video interaction system 106 further includes the input summary visualization generator 1712. In one or more embodiments, the input summary visualization generator 1712 generates an input summary visualization representing aggregated viewer inputs based on the set of input clusters generated by the viewer input aggregation engine 1710. In particular, in some embodiments, the input summary visualization generator 1712 generates summary graphical elements to represent the input clusters. Further, the input summary visualization generator 1712 arranges the summary graphical elements with respect to one or more axes (e.g., based on user input received from the stream-transmitting computing device). In some implementations, the input summary visualization generator 1712 provides the input summary visualization for display on the stream-transmitting computing device and/or the viewer computing devices participating in the digital stream.

As further shown, the digital video interaction system 106 includes data storage 1714. In particular, as shown, data storage 1714 includes graphical elements 1716 and configurations 1718. In one or more embodiments, the graphical elements 1716 stores graphical elements presented within video content. In particular, the graphical elements 1716 stores graphical elements that are adjustable within the video content by viewer inputs. In some implementations, the configurations 1718 stores configurations for viewer inputs, aggregation, and/or generating input summary visualizations. For example, in some cases, the configurations 1718 stores data related to visual attributes identified as adjustable by viewer inputs. In some cases, the configurations 1718 stores data related to visual attributes to be used in aggregating collected viewer inputs. In still further embodiments, the configurations 1718 stores data related to summary visualization attributes to be used in generating input summary visualizations.

Each of the components 1702-1718 of the digital video interaction system 106 can include software, hardware, or both. For example, the components 1702-1718 can include one or more instructions stored on a computer-readable storage medium and executable by processors of one or more computing devices, such as a client device or server device. When executed by the one or more processors, the computer-executable instructions of the digital video interaction system 106 can cause the computing device(s) to perform the methods described herein. Alternatively, the components 1702-1718 can include hardware, such as a special-purpose processing device to perform a certain function or group of functions. Alternatively, the components 1702-1718 of the digital video interaction system 106 can include a combination of computer-executable instructions and hardware.

Furthermore, the components 1702-1718 of the digital video interaction system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1702-1718 of the digital video interaction system 106 may be implemented as a stand-alone application, such as a desktop or mobile application. Furthermore, the components 1702-1718 of the digital video interaction system 106 may be implemented as one or more web-based applications hosted on a remote server. Alternatively, or additionally, the components 1702-1718 of the digital video interaction system 106 may be implemented in a suite of mobile device applications or "apps." For example, in one or more embodiments, the digital video interaction system 106 comprises or operate in connection with digital software applications such as ADOBE® HTTP DYNAMIC STREAMING or ADOBE® ELEARNING SUITE. "ADOBE," "HTTP DYNAMIC STREAMING," and "ELEARNING SUITE" are either registered trademarks or trademarks of Adobe Inc. in the United States and/or other countries.

FIGS. 1-17, the corresponding text and the examples provide a number of different methods, systems, devices, and non-transitory computer-readable media of the digital video interaction system 106. In addition to the foregoing, one or more embodiments can also be described in terms of flowcharts comprising acts for accomplishing the particular results as shown in FIG. 18. FIG. 18 may be performed with more or fewer acts. Further, the acts may be performed in different orders. Additionally, the acts described herein may be repeated or performed in parallel with one another or in parallel with different instances of the same or similar acts.

As mentioned, FIG. 18 illustrates a flowchart of a series of acts 1800 for generating an input summary visualization based on viewer inputs that adjust a graphical element within video content in accordance with one or more embodiments. While FIG. 18 illustrates acts according to one embodiment, alternative embodiments may omit, add to, reorder, and/or modify any of the acts shown in FIG. 18. In some implementations, the acts of FIG. 18 are performed as part of a method. For example, in some embodiments, the acts of FIG. 18 are performed, in a digital medium environment for streaming digital content, as part of a computer-implemented method for generating aggregations of viewer inputs. In some instances, a non-transitory computer-readable medium stores instructions thereon that, when executed by at least one processor, cause a computing device to perform the acts of FIG. 18. In some embodiments, a system performs the acts of FIG. 18. For example, in one or more embodiments, a system includes at least one memory device comprising graphical elements for display within digital video streams. The system further includes at least one server device configured to cause the system to perform the acts of FIG. 18.

The series of acts 1800 includes an act 1802 of receiving user input identifying visual attributes of a graphical element that are adjustable. For example, in one or more embodiments, the act 1802 involves receiving, from a stream-transmitting computing device, user input identifying visual attributes of a graphical element that are adjustable by viewer inputs.

In one or more embodiments, the digital video interaction system 106 receives the user input identifying the visual attributes of the graphical element by receiving, from the stream-transmitting computing device, a range of values for one or more of a position of the graphical element, a shape of the graphical element, a size of the graphical element, a rotation of the graphical element, or a color of the graphical element that can be provided by each viewer input for one or more visual attributes from the visual attributes of the graphical element.

In at least one implementation, the digital video interaction system 106 receives the user input identifying the visual attributes of the graphical element that are adjustable by the viewer inputs by receiving the user input identifying at least two of a position of the graphical element, a shape of the graphical element, a size of the graphical element, a rotation of the graphical element, or a color of the graphical element.

The series of acts 1800 also includes an act 1804 of providing a digital stream of video content. For example, in one or more embodiments, the act 1804 involves providing a digital stream of video content from the stream-transmitting computing device to a set of viewer computing devices. Indeed, the digital video interaction system 106 provides a digital stream of the video content (e.g., captured) from the stream-transmitting computing device to a set of viewer computing devices Additionally, the series of acts 1800 includes an act 1806 of collecting viewer inputs that adjust the graphical element in accordance with the visual attributes. For example, in one or more embodiments, the act 1806 involves collecting, from the set of viewer computing devices and while providing the digital stream of the video content, a set of viewer inputs that adjust the graphical element within the video content in accordance with the visual attributes. Indeed, the digital video interaction system 106 collects a set of viewer inputs that adjust the graphical element within the video content in accordance with the visual attributes while providing the digital stream of the video content;

Further, the series of acts 1800 includes an act 1808 of aggregating the viewer inputs. For example, in one or more embodiments, the act 1808 involves aggregating the set of viewer inputs into a set of input clusters using the visual attributes identified by the stream-transmitting computing device.

In some implementations, the digital video interaction system 106 aggregates the viewer inputs based on one or more visual attributes. For example, in some cases, the digital video interaction system 106 receives, from the stream-transmitting computing device, additional user input identifying a subset of visual attributes from the visual attributes; and aggregates the set of viewer inputs into the set of input clusters using the visual attributes identified by the stream-transmitting computing device by aggregating the set of viewer inputs into the set of input clusters based on the subset of visual attributes.

In some instances, the digital video interaction system 106 aggregates the viewer inputs based on one or more feature vectors. For example, in at least one implementation, the digital video interaction system 106 determines feature vectors for the set of viewer inputs by determining, for a viewer input, a feature vector based on values of the visual attributes represented by the viewer input; and aggregates the set of viewer inputs into the set of input clusters using the visual attributes identified by the stream-transmitting computing device by utilizing a clustering algorithm to aggregate the set of viewer inputs into the set of input clusters based on the feature vectors for the set of viewer inputs.

The series of acts 1800 further includes an act 1810 of generating an input summary visualization. For example, in one or more embodiments, the act 1810 involves generating, for display on the stream-transmitting computing device, an input summary visualization representing the aggregated set of viewer inputs according to the set of input clusters. Indeed, the digital video interaction system 106 generates an input summary visualization of the set of viewer inputs for display on the stream-transmitting computing device.

In some instances, the digital video interaction system 106 determines a cluster size for an input cluster from the set of input clusters based on a number of viewer inputs associated with the input cluster; and generates the input summary visualization representing the aggregated set of viewer inputs according to the set of input clusters by generating, for display within the input summary visualization, a summary graphical element representing the input cluster and having a size corresponding to the cluster size of the input cluster.

In at least one implementation, the digital video interaction system 106 determines similarities among particular input clusters from the set of input clusters; and generates the input summary visualization representing the aggregated set of viewer inputs according to the set of input clusters by positioning, within the input summary visualization, summary graphical elements corresponding to the set of input clusters based on the similarities among the particular input clusters.

In one or more embodiments, the digital video interaction system 106 generates the input summary visualization using one or more summary visualization attributes. For example, in at least one instance, the digital video interaction system 106 receives, from the stream-transmitting computing device, additional user input identifying one or more summary visualization attributes for visualizing the aggregated set of viewer inputs; and generates the input summary visualization representing the aggregated set of viewer inputs according to the set of input clusters by generating the input summary visualization based on the one or more summary visualization attributes. In one or more embodiments, the digital video interaction system 106 receives the additional user input identifying the one or more summary visualization attributes for visualizing the aggregated set of viewer inputs by receiving the additional user input identifying an organization of the aggregated set of viewer inputs with respect to one or more axes within the input summary visualization.

In one or more embodiments, the digital video interaction system 106 generates the input summary visualization of the set of viewer inputs by generating a multi-dimensional input summary visualization based on one or more additional selections from the stream-transmitting computing device. For example, in at least one implementation, the digital video interaction system 106 generates the input summary visualization by generating at least one of a scatter plot, a bar plot, a radar chart, or a parallel coordinates.

In some cases, the digital video interaction system 106 aggregates viewer inputs into a number of input clusters determined by the stream-transmitting computing device. For example, in at least one implementation, the digital video interaction system 106 determines a number of input clusters to associate with the set of viewer inputs based on one or more additional selections from the stream-transmitting computing device; and aggregates the set of viewer inputs into a set of input clusters having the number of input clusters determined based on the one or more additional selections. Accordingly, the digital video interaction system 106 generates the input summary visualization of the set of viewer inputs by generating the input summary visualization to reflect the set of input clusters (e.g., having the determined number of input clusters).

In one or more embodiments, the series of acts 1800 includes acts for utilizing graphical user interfaces to configure viewer inputs and input summary visualizations. For example, in some implementations, the digital video interaction system 106 provides, for display on a stream-transmitting computing device, one or more user interfaces for configuring video content to respond to viewer inputs. Based on user input received from the stream-transmitting computing device through the one or more user interfaces, the digital video interaction system 106 determines visual attributes of an interactive graphical element (e.g., from stored graphical elements) that are adjustable by the viewer inputs received in response to an input prompt; and determines one or more summary visualization attributes for displaying a summary of different viewer inputs adjusting the interactive graphical element. The digital video interaction system 106 further provides a digital stream of the video content from the stream-transmitting computing device to a set of viewer computing devices; collects, from the set of viewer computing devices and in response to the input prompt, a set of viewer inputs that adjust the interactive graphical element within the video content in accordance with the visual attributes; and generates, for display on the stream-transmitting computing device, an input summary visualization representing the set of viewer inputs arranged according to different adjustments to the interactive graphical element and according to the one or more summary visualization attributes.

In some implementations, the digital video interaction system 106 determines the visual attributes of the interactive graphical element that are adjustable by the viewer inputs by determining animations that can be applied to a dynamic graphical element by the viewer inputs; and generates the input summary visualization representing the set of viewer inputs arranged according to the different adjustments to the interactive graphical element by generating the input summary visualization representing the set of viewer inputs arranged according to different animations applied to the dynamic graphical element.

In some instances, the digital video interaction system 106 determines the visual attributes of the interactive graphical element that are adjustable by the viewer inputs by determining a distance between the interactive graphical element and an additional graphical element that are adjustable by the viewer inputs; and generates the input summary visualization representing the set of viewer inputs arranged according to the different adjustments to the interactive graphical element by generating the input summary visualization representing the set of viewer inputs arranged according to different distances between the interactive graphical element and the additional graphical element.

In at least one implementation, the digital video interaction system 106 determines the visual attributes of the interactive graphical element that are adjustable by the viewer inputs by determining an angle that is adjustable by the viewer inputs based on positions of the interactive graphical element and an additional graphical element with respect to an axis; and generates the input summary visualization representing the set of viewer inputs arranged according to the different adjustments to the interactive graphical element by generating the input summary visualization representing the set of viewer inputs arranged according to different angles.

In some implementations, the digital video interaction system 106 determines a subset of visual attributes from the visual attributes based on the user input received from the stream-transmitting computing device through the one or more user interfaces; aggregates the set of viewer inputs into a set of input clusters based on the subset of visual attributes, the set of input clusters representing the different adjustments to the interactive graphical element; and generates the input summary visualization representing the set of viewer inputs arranged according to the different adjustments to the interactive graphical element by generating the input summary visualization representing the set of input clusters arranged according to the different adjustments.

In some cases, the digital video interaction system 106 determines similarity metric values among particular input clusters from the set of input clusters utilizing a principal component analysis algorithm; and generates the input summary visualization representing the set of input clusters arranged according to the different adjustments by generating the input summary visualization representing the set of input clusters arranged based on the similarity metric values among the particular input clusters.

In some embodiments, the series of acts 1800 further includes acts for generating an additional input summary visualization based on additional viewer inputs. For example, in at least one instance, the digital video interaction system 106 receives, from the stream-transmitting computing device, additional user input identifying additional visual attributes of an additional graphical element that are adjustable by additional viewer inputs during the digital stream of the video content, the additional visual attributes differing from the visual attributes; collects, from the set of viewer computing devices and while providing the digital stream of the video content, an additional set of viewer inputs that adjust the additional graphical element within the video content in accordance with the additional visual attributes; aggregates the additional set of viewer inputs into an additional set of input clusters using the additional visual attributes identified by the stream-transmitting computing device; and generates, for display on the stream-transmitting computing device, an additional input summary visualization representing the aggregated additional set of viewer inputs according to the additional set of input clusters.

In some cases, the series of acts 1800 also includes acts for generating and utilizing a pre-set template library for collecting viewer inputs that adjust a graphical element in accordance with one or more visual attributes. For example, in some implementations, the acts include generating, before providing the digital stream of the video content, a pre-set template library comprising a plurality of configurations, each configuration identifying at least one graphical element and one or more visual attributes of the at least one graphical element that are adjustable by viewer inputs; collecting an additional set of viewer inputs that adjust an additional graphical element that corresponds to a configuration from the pre-set template library in accordance with the one or more visual attributes while providing the digital stream of the video content; and generating an additional input summary visualization of the additional set of viewer inputs for display on the stream-transmitting computing device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 19:
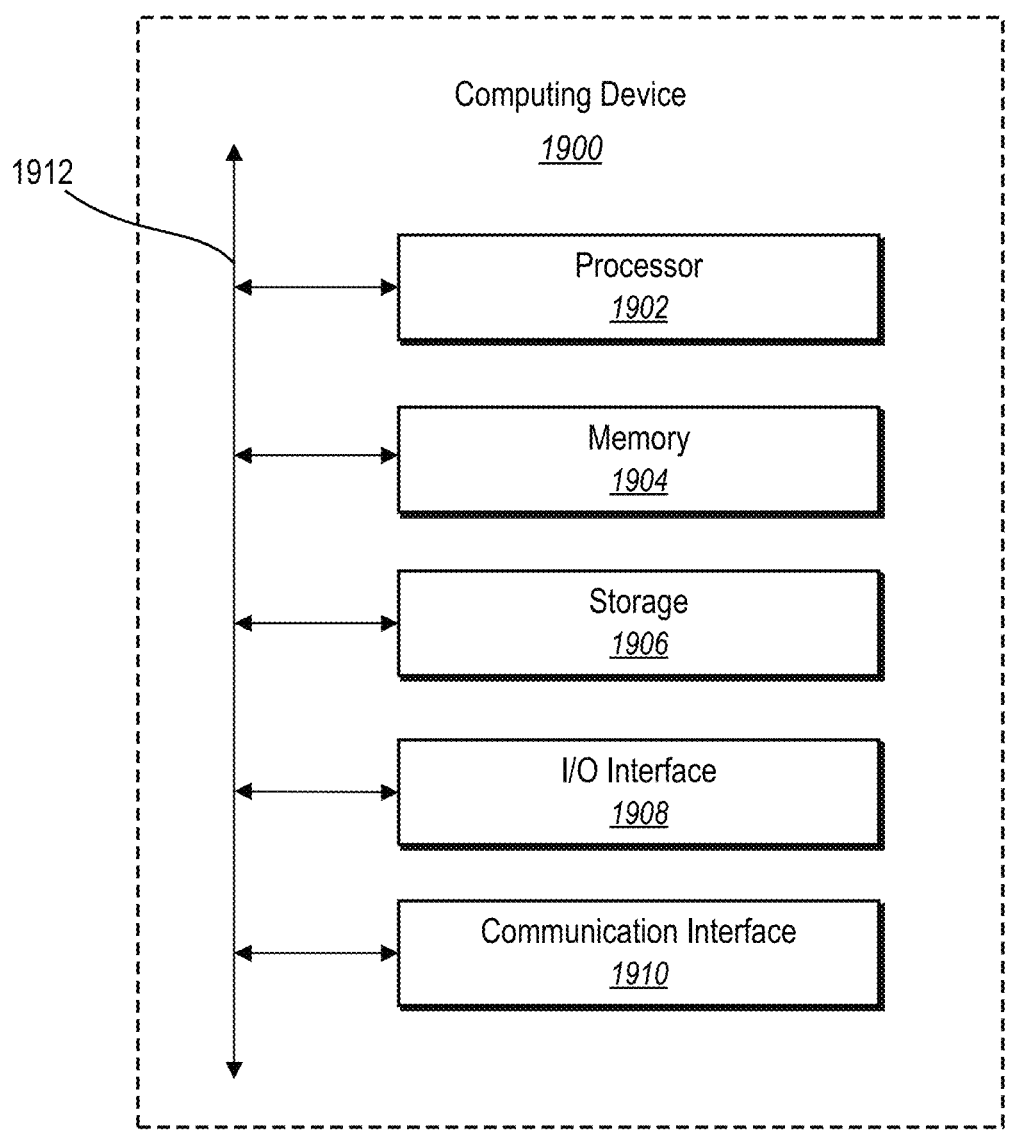
FIG. 19 illustrates a block diagram of an exemplary computing device in accordance with one or more embodiments.

FIG. 19 illustrates a block diagram of an example computing device 1900 that may be configured to perform one or more of the processes described above. One will appreciate that one or more computing devices, such as the computing device 1900 may represent the computing devices described above (e.g., the server(s) 102, the viewer computing devices 110a-110n, and/or the stream-transmitting computing device). In one or more embodiments, the computing device 1900 may be a mobile device (e.g., a mobile telephone, a smartphone, a PDA, a tablet, a laptop, a camera, a tracker, a watch, a wearable device). In some embodiments, the computing device 1900 may be a non-mobile device (e.g., a desktop computer or another type of client device). Further, the computing device 1900 may be a server device that includes cloud-based processing and storage capabilities.

As shown in FIG. 19, the computing device 1900 can include one or more processor(s) 1902, memory 1904, a storage device 1906, input/output interfaces 1908 (or "I/O interfaces 1908"), and a communication interface 1910, which may be communicatively coupled by way of a communication infrastructure (e.g., bus 1912). While the computing device 1900 is shown in FIG. 19, the components illustrated in FIG. 19 are not intended to be limiting. Additional or alternative components may be used in other embodiments. Furthermore, in certain embodiments, the computing device 1900 includes fewer components than those shown in FIG. 19. Components of the computing device 1900 shown in FIG. 19 will now be described in additional detail.

In particular embodiments, the processor(s) 1902 includes hardware for executing instructions, such as those making up a computer program. As an example, and not by way of limitation, to execute instructions, the processor(s) 1902 may retrieve (or fetch) the instructions from an internal register, an internal cache, memory 1904, or a storage device 1906 and decode and execute them.

The computing device 1900 includes memory 1904, which is coupled to the processor(s) 1902. The memory 1904 may be used for storing data, metadata, and programs for execution by the processor(s). The memory 1904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1904 may be internal or distributed memory.

The computing device 1900 includes a storage device 1906 including storage for storing data or instructions. As an example, and not by way of limitation, the storage device 1906 can include a non-transitory storage medium described above. The storage device 1906 may include a hard disk drive (HDD), flash memory, a Universal Serial Bus (USB) drive or a combination these or other storage devices.

As shown, the computing device 1900 includes one or more I/O interfaces 1908, which are provided to allow a user to provide input to (such as user strokes), receive output from, and otherwise transfer data to and from the computing device 1900. These I/O interfaces 1908 may include a mouse, keypad or a keyboard, a touch screen, camera, optical scanner, network interface, modem, other known I/O devices or a combination of such I/O interfaces 1908. The touch screen may be activated with a stylus or a finger.

The I/O interfaces 1908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1908 are configured to provide graphical data to a display for presentation to a user. The graphical data may be representative of one or more graphical user interfaces and/or any other graphical content as may serve a particular implementation.

The computing device 1900 can further include a communication interface 1910. The communication interface 1910 can include hardware, software, or both. The communication interface 1910 provides one or more interfaces for communication (such as, for example, packet-based communication) between the computing device and one or more other computing devices or one or more networks. As an example, and not by way of limitation, communication interface 1910 may include a network interface controller (NIC) or network adapter for communicating with an Ethernet or other wire-based network or a wireless NIC (WNIC) or wireless adapter for communicating with a wireless network, such as a WI-FI. The computing device 1900 can further include a bus 1912. The bus 1912 can include hardware, software, or both that connects components of computing device 1900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause a computing device to:
receive, from a stream-transmitting computing device, user input identifying visual attributes of a graphical element that are adjustable by viewer inputs from viewer computing devices;
provide a digital stream of video content from the stream-transmitting computing device to a set of viewer computing devices, the video content including the graphical element with the visual attributes that are adjustable in accordance with the user input from the stream-transmitting computing device;
collect, from the set of viewer computing devices and while providing the digital stream of the video content, a set of viewer inputs where viewer input collected from a viewer computing device comprises one or more adjustments to the graphical element within the video content displayed on the viewer computing device in accordance with the visual attributes;
aggregate the set of viewer inputs into a set of input clusters using the visual attributes identified by the stream-transmitting computing device; and
generate, for display on the stream-transmitting computing device, an input summary visualization representing the aggregated set of viewer inputs according to the set of input clusters.

2. The non-transitory computer-readable medium of claim 1, further comprising instructions that, when executed by the at least one processor, cause the computing device to:
receive, from the stream-transmitting computing device, additional user input identifying one or more summary visualization attributes for visualizing the aggregated set of viewer inputs; and
generate the input summary visualization representing the aggregated set of viewer inputs according to the set of input clusters by generating the input summary visualization based on the one or more summary visualization attributes.

3. The non-transitory computer-readable medium of claim 2, further comprising instructions that, when executed by the at least one processor, cause the computing device to receive the additional user input identifying the one or more summary visualization attributes for visualizing the aggregated set of viewer inputs by receiving the additional user input identifying an organization of the aggregated set of viewer inputs with respect to one or more axes within the input summary visualization.

4. The non-transitory computer-readable medium of claim 1, further comprising instructions that, when executed by the at least one processor, cause the computing device to:
receive, from the stream-transmitting computing device, additional user input identifying a subset of visual attributes from the visual attributes; and
aggregate the set of viewer inputs into the set of input clusters using the visual attributes identified by the stream-transmitting computing device by aggregating the set of viewer inputs into the set of input clusters based on the subset of visual attributes.

5. The non-transitory computer-readable medium of claim 1, further comprising instructions that, when executed by the at least one processor, cause the computing device to:
determine feature vectors for the set of viewer inputs by determining, for a viewer input, a feature vector based on values of the visual attributes represented by the viewer input; and
aggregate the set of viewer inputs into the set of input clusters using the visual attributes identified by the stream-transmitting computing device by utilizing a clustering algorithm to aggregate the set of viewer inputs into the set of input clusters based on the feature vectors for the set of viewer inputs.

6. The non-transitory computer-readable medium of claim 1, further comprising instructions that, when executed by the at least one processor, cause the computing device to:
determine a cluster size for an input cluster from the set of input clusters based on a number of viewer inputs associated with the input cluster; and
generate the input summary visualization representing the aggregated set of viewer inputs according to the set of input clusters by generating, for display within the input summary visualization, a summary graphical element representing the input cluster and having a size corresponding to the cluster size of the input cluster.

7. The non-transitory computer-readable medium of claim 1, further comprising instructions that, when executed by the at least one processor, cause the computing device to:
determine similarities among particular input clusters from the set of input clusters; and
generate the input summary visualization representing the aggregated set of viewer inputs according to the set of input clusters by positioning, within the input summary visualization, summary graphical elements corresponding to the set of input clusters based on the similarities among the particular input clusters.

8. The non-transitory computer-readable medium of claim 1, further comprising instructions that, when executed by the at least one processor, cause the computing device to receive the user input identifying the visual attributes of the graphical element by receiving, from the stream-transmitting computing device, a range of values for one or more of a position of the graphical element, a shape of the graphical element, a size of the graphical element, a rotation of the graphical element, or a color of the graphical element that can be provided by each viewer input for one or more visual attributes from the visual attributes of the graphical element.

9. The non-transitory computer-readable medium of claim 1, further comprising instructions that, when executed by the at least one processor, cause the computing device to receive the user input identifying the visual attributes of the graphical element that are adjustable by the viewer inputs by receiving the user input identifying at least two of a position of the graphical element, a shape of the graphical element, a size of the graphical element, a rotation of the graphical element, or a color of the graphical element.

10. The non-transitory computer-readable medium of claim 1, further comprising instructions that, when executed by the at least one processor, cause the computing device to:
receive, from the stream-transmitting computing device, additional user input identifying additional visual attributes of an additional graphical element that are adjustable by additional viewer inputs during the digital stream of the video content, the additional visual attributes differing from the visual attributes;
collect, from the set of viewer computing devices and while providing the digital stream of the video content, an additional set of viewer inputs that adjust the additional graphical element within the video content in accordance with the additional visual attributes;
aggregate the additional set of viewer inputs into an additional set of input clusters using the additional visual attributes identified by the stream-transmitting computing device; and
generate, for display on the stream-transmitting computing device, an additional input summary visualization representing the aggregated additional set of viewer inputs according to the additional set of input clusters.

11. A system comprising:
at least one memory device comprising graphical elements for display within digital video streams; and
at least one server device configured to cause the system to:
provide, for display on a stream-transmitting computing device, one or more user interfaces for configuring video content to respond to viewer inputs from viewer computing devices;
based on user input received from the stream-transmitting computing device through the one or more user interfaces:
determine visual attributes of an interactive graphical element from the graphical elements that are adjustable by the viewer inputs received from the viewer computing devices in response to an input prompt; and
determine one or more summary visualization attributes for displaying a summary of different viewer inputs adjusting the interactive graphical element;
provide a digital stream of the video content from the stream-transmitting computing device to a set of viewer computing devices, the video content including the interactive graphical element with the visual attributes that are adjustable in accordance with the user input from the stream-transmitting computing device;
collect, from the set of viewer computing devices and in response to the input prompt, a set of viewer inputs where viewer input collected from a viewer computing device comprises one or more adjustments to the interactive graphical element within the video content displayed on the viewer computing device in accordance with the visual attributes; and
generate, for display on the stream-transmitting computing device, an input summary visualization representing the set of viewer inputs arranged according to different adjustments to the interactive graphical element and according to the one or more summary visualization attributes.

12. The system of claim 11, wherein the at least one server device is further configured to cause the system to:
determine the visual attributes of the interactive graphical element that are adjustable by the viewer inputs by determining animations that can be applied to a dynamic graphical element by the viewer inputs; and
generate the input summary visualization representing the set of viewer inputs arranged according to the different adjustments to the interactive graphical element by generating the input summary visualization representing the set of viewer inputs arranged according to different animations applied to the dynamic graphical element.

13. The system of claim 11, wherein the at least one server device is further configured to cause the system to:
determine the visual attributes of the interactive graphical element that are adjustable by the viewer inputs by determining a distance between the interactive graphical element and an additional graphical element that is adjustable by the viewer inputs; and
generate the input summary visualization representing the set of viewer inputs arranged according to the different adjustments to the interactive graphical element by generating the input summary visualization representing the set of viewer inputs arranged according to different distances between the interactive graphical element and the additional graphical element.

14. The system of claim 11, wherein the at least one server device is further configured to cause the system to:
determine the visual attributes of the interactive graphical element that are adjustable by the viewer inputs by determining an angle that is adjustable by the viewer inputs based on positions of the interactive graphical element and an additional graphical element with respect to an axis; and
generate the input summary visualization representing the set of viewer inputs arranged according to the different adjustments to the interactive graphical element by generating the input summary visualization representing the set of viewer inputs arranged according to different angles.

15. The system of claim 11, wherein the at least one server device is further configured to cause the system to:
determine a subset of visual attributes from the visual attributes based on the user input received from the stream-transmitting computing device through the one or more user interfaces;
aggregate the set of viewer inputs into a set of input clusters based on the subset of visual attributes, the set of input clusters representing the different adjustments to the interactive graphical element; and
generate the input summary visualization representing the set of viewer inputs arranged according to the different adjustments to the interactive graphical element by generating the input summary visualization representing the set of input clusters arranged according to the different adjustments.

16. The system of claim 15, wherein the at least one server device is further configured to cause the system to:
determine similarity metric values among particular input clusters from the set of input clusters utilizing a principal component analysis algorithm; and
generate the input summary visualization representing the set of input clusters arranged according to the different adjustments by generating the input summary visualization representing the set of input clusters arranged based on the similarity metric values among the particular input clusters.

17. The system of claim 11, wherein the at least one server device is further configured to cause the system to generate the input summary visualization by generating at least one of a scatter plot, a bar plot, a radar chart, or a parallel coordinates chart.

18. In a digital medium environment for streaming digital content, a computer-implemented method for generating aggregations of viewer inputs comprising:
- performing a step for configuring visual attributes of a graphical element to be interactive within video content based on selections from a stream-transmitting computing device;
- providing a digital stream of the video content from the stream-transmitting computing device to a set of viewer computing devices, the video content including the graphical element with the visual attributes that are interactive in accordance with the selections from the stream-transmitting computing device;
- collecting a set of viewer inputs while providing the digital stream of video content, where viewer input collected from a viewer computing device comprises one or more adjustments to the graphical element within the video content displayed on the viewer computing device in accordance with the visual attributes; and
- generating an input summary visualization of the set of viewer inputs for display on the stream-transmitting computing device.

19. The computer-implemented method of claim 18, further comprising:
- determining a number of input clusters to associate with the set of viewer inputs based on one or more additional selections from the stream-transmitting computing device; and
- aggregating the set of viewer inputs into a set of input clusters having the number of input clusters determined based on the one or more additional selections,
- wherein generating the input summary visualization of the set of viewer inputs comprises generating the input summary visualization to reflect the set of input clusters.

20. The computer-implemented method of claim 18, further comprising:
- generating, before providing the digital stream of the video content, a pre-set template library comprising a plurality of configurations, each configuration identifying at least one graphical element and one or more visual attributes of the at least one graphical element that are adjustable by viewer inputs;
- collecting an additional set of viewer inputs that adjust an additional graphical element that corresponds to a configuration from the pre-set template library in accordance with the one or more visual attributes while providing the digital stream of the video content; and
- generating an additional input summary visualization of the additional set of viewer inputs for display on the stream-transmitting computing device.

* * * * *